US006578018B1

(12) United States Patent
Ulyanov

(10) Patent No.: US 6,578,018 B1
(45) Date of Patent: Jun. 10, 2003

(54) SYSTEM AND METHOD FOR CONTROL USING QUANTUM SOFT COMPUTING

(75) Inventor: Sergei V. Ulyanov, Crema (IT)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 112 days.

(21) Appl. No.: 09/625,609

(22) Filed: Jul. 26, 2000

Related U.S. Application Data

(60) Provisional application No. 60/146,046, filed on Jul. 27, 1999.

(51) Int. Cl.[7] .............................................. G06F 15/18
(52) U.S. Cl. .............................. 706/14; 706/15; 706/45
(58) Field of Search .............................. 706/15, 45, 14

(56) References Cited

U.S. PATENT DOCUMENTS

| | | | | |
|---|---|---|---|---|
| 5,819,242 A | * | 10/1998 | Matsuoka et al. | 706/16 |
| 5,971,579 A | | 10/1999 | Kim | |
| 6,317,766 B1 | * | 11/2001 | Grover | 708/400 |

OTHER PUBLICATIONS

Michael J. A. Berry et al; data Mining Techniques; 1997; Wiley; 335–346.*

* cited by examiner

*Primary Examiner*—John Follansbee
*Assistant Examiner*—Joseph P. Hirl
(74) *Attorney, Agent, or Firm*—Knobbe, Martens, Olson & Bear LLP

(57) ABSTRACT

A methodology and an algorithm for programming a quantum logic algorithm is described. In one embodiment, an algorithm for generating a quantum gate is described. The quantum gate describes the evolution of the quantum computing algorithm and is used to implement a desired quantum algorithm. In one embodiment, the quantum gate is used in a quantum search algorithm to search a number of local solution spaces to find a global solution to be used in a control system to control a plant. In one embodiment, the quantum search algorithm is an iterative algorithm and an entropy-based basis for stopping the iterations is described. In one embodiment, the quantum search algorithm is used to improve a genetic optimizer in the control system.

45 Claims, 48 Drawing Sheets

| Step | Classical and Quantum Entropy $S_{|\psi\rangle}(\{j\}) = -\lambda_1 \log \lambda_1 - \lambda_2 \log \lambda_2$ | States and Gate Operations |
|---|---|---|
| Input | $\lambda_{1/2} = \frac{\alpha^2}{2}\left(-1+2^n+\frac{\beta^2}{\alpha^2}\pm\sqrt{5-2^{n+2}+2^{2n}+(2^{n+2}-8)\frac{\beta}{\alpha}+2\frac{\beta^2}{\alpha^2}+\frac{\beta^4}{\alpha^4}}\right)$ $H_{Sh}(|\psi\rangle) = -(2^n-1)\alpha^2 \log\alpha^2 - \beta^2 \log\beta^2$ | $\alpha\left(\|0\ldots0\rangle+\ldots+\frac{\beta}{\alpha}\|x\rangle+\ldots+\|1\ldots1\rangle\right)\otimes\frac{\|0\rangle-\|1\rangle}{\sqrt{2}}$ |
| Entangle-ment | $\lambda_{1/2} = \frac{\alpha^2}{2}\left(-1+2^n+\frac{\beta^2}{\alpha^2}\pm\sqrt{5-2^{n+2}+2^{2n}+(2^{n+2}-8)\frac{\beta}{\alpha}+2\frac{\beta^2}{\alpha^2}+\frac{\beta^4}{\alpha^4}}\right)$ $H_{Sh}(|\psi\rangle) = -(2^n-1)\alpha^2 \log\alpha^2 - \beta^2 \log\beta^2$ | $\alpha\left(\|0\ldots0\rangle+\ldots-\frac{\beta}{\alpha}\|x\rangle+\ldots+\|1\ldots1\rangle\right)\otimes\frac{\|0\rangle-\|1\rangle}{\sqrt{2}}$ |
| Inter-ference | $\lambda_{1/2} = \frac{(\alpha-m)^2}{2}\left(-1+2^n+\frac{(\beta+m)^2}{(\alpha-m)^2}\pm\sqrt{5-2^{n+2}+2^n-(2^{n+2}-8)\frac{\beta+m}{\alpha-m}+2\frac{(\beta+m)^2}{(\alpha-m)^2}+\frac{(\beta+m)^4}{(\alpha-m)^4}}\right)$ $H_{Sh}(|\psi\rangle) = -(2^n-1)(\alpha-m)^2 \log(\alpha-m)^2 - (\beta+m)^2 \log(\beta+m)^2$ | $(\alpha-m)\left(\|0\ldots0\rangle+\ldots+\frac{\beta+m}{\alpha-m}\|x\rangle+\ldots+\|1\ldots1\rangle\right)\otimes\frac{\|0\rangle-\|1\rangle}{\sqrt{2}}$ |

FIG. 36

| Step | Classical Entropy $H_{Sh}(|\psi\rangle)$ | Quantum Entropy $S_{|\psi\rangle}(\{i j\})$ |
|---|---|---|
| Entangle-ment | $5 - \frac{25}{16} \log 5$ | $L = -\frac{1}{16}(8-\sqrt{37}) \log\left[\frac{1}{16}(8-\sqrt{37})\right] - \frac{1}{16}(8+\sqrt{37}) \log\left[\frac{1}{16}(8+\sqrt{37})\right]$ |
| Inter-ference | $6 - \frac{121}{64} \log 11$ | $L = -\frac{1}{256}(128-\sqrt{14656}) \log\left[\frac{1}{256}(128-\sqrt{14656})\right] - \frac{1}{256}(128+\sqrt{14656}) \log\left[\frac{1}{256}(128+\sqrt{14656})\right]$ |

FIG. 38

| FIG. 38A |
|---|
| FIG. 38B |

FIG. 38A

SYSTEM AND METHOD FOR CONTROL USING QUANTUM SOFT COMPUTING

REFERENCE TO RELATED APPLICATIONS

The present application claims priority benefit under U.S.C. 119(e) from U.S. Provisional Application No. 60/146,046, filed Jul. 27, 1999, and titled "SYSTEM AND METHOD FOR CONTROL USING QUANTUM SOFT COMPUTING," the contents of which is hereby included in its entirety.

BACKGROUND OF THE INVENTION

1. Field of the Invention

The present invention relates to programming of quantum computing algorithms, and use of quantum computing algorithms in connection with control systems based on quantum soft computing.

2. Descriiption of the Related Art

The interplay between mathematics and physics has always been beneficial to both fields of endeavor. The calculus was developed by Newton and Leibniz in order to understand and describe dynamical law of motion of material bodies. In general, geometry and physics have had a long and successful symbiotic relationship: classical mechanics and Newton's gravity are based on Euclidean geometry, whereas in Einstein's theory of general relativity the basis is provided by non-Euclidean, Riemannian geometry (an important insight taken from mathematics into physics). Although this link between physics and geometry is still extremely strong, one of the most striking connections today is between information theory and quantum physics. There appears to be a trend to make mathematics more "physical."

Computation, based on the laws of classical physics, leads to completely different constraints on information processing than computation based on quantum mechanics (as first realized by Feymann and Deutsch). Computation seems to be the only commodity ever to become exponentially better (e.g., faster) as it gets cheaper. In the past few decades, information handling capacity has grown at a rate ten million times faster than that of the human nervous systems during the four billion years since life began on Earth. Yet the theory and technology of computing has rested for more than 50 years on the Turing-machine model of computation, which leads to many intractable or undecidable problems.

Quantum computers hold promise for solving such intractable problems, but, unfortunately, there currently exist no algorithms for "programming" a quantum computer. Calculation in a quantum computer, like calculation in a conventional computer, can be described as a marriage of quantum hardware (the physical embodiment of the computing machine itself, such as quantum gates and the like), and quantum software (the computing algorithm implemented by the hardware to perform the calculation). To date, quantum software algorithms, such as Shor's algorithm, used to solve problems on a quantum computer have been developed on an ad hoc basis without any real structure or programming methodology.

This situation is somewhat analogous to attempting to design a conventional logic circuit without the use of a Karnough map. A logic designer, given a set of inputs and corresponding desired outputs, could design a complicated logic circuit using NAND gates without the use of a Karnough map. However, the unfortunate designer would be forced to design the logic circuit more or less by intuition, trial, and error. The Karnough map provides a structure and an algorithm for manipulating logical operations (AND, OR, etc.) in a manner that allows a designer to quickly design a logic circuit that will perform a desired logic calculation.

The lack of a programming or design methodology for quantum computers severely limits the usefulness of the quantum computer. Moreover, it limits the usefulness of the quantum principles, such as superposition, entanglement and interference, that give rise to the quantum logic used in quantum computations. These quantum principles suggest, or lend themselves, to problem-solving methods that are not used in conventional computers.

These quantum principles can be used with conventional computers in much the same way that genetic principles of evolution are used in genetic optimizers today. Nature, through the process of evolution, has devised a useful method for optimizing large-scale nonlinear systems. A genetic optimizer running on a computer efficiently solves many previously difficult optimization problems by simulating the process of natural evolution. Nature also uses the principles of quantum mechanics to solve problems, including optimization-type problems, searching-type problems, selection-type problems, etc. through the use of quantum logic. However, the quantum principles, and quantum logic, have not been used with conventional computers because no method existed for programming an algorithm using the quantum logic.

SUMMARY OF THE INVENTION

The present invention solves these and other problems by providing a methodology and an algorithm for programming an algorithm to solve a problem using quantum logic. The quantum logic program can be "run" on a quantum computer. The algorithm can also be "run" on a non-quantum computer by using the non-quantum computer to simulate a quantum computer. This allows the concepts, features, and principles of quantum computing, such as superposition, entanglement, quantum interference, and the like (and the massive parallelism enabled by these principles) to be used to advantage in non-quantum computers without the need to develop quantum computer hardware.

In one embodiment, the quantum programming method is used to with a genetic search algorithm in a control system. A conventional genetic search algorithm searches for an optimal solution in a single space. The quantum search algorithm provides global searching for an optimum solution among many spaces.

In one embodiment, an algorithm design for quantum soft computing is designed by encoding an input function $f$ into a unitary matrix operator $U_F$. The operator $U_F$ is embedded into a quantum gate G, where G is a unitary matrix. The gate G is applied to an initial canonical basis vector to produce a basis vector. The basis vector is measured. These steps are repeated several times as necessary to generate a set of measured basis vectors. The measured basis vectors are decoded and translated into an output vector.

In one embodiment, the encoding into $U_F$ includes transforming a map table of $f$ into an injective function F, transforming the map table of F into a map table for $U_F$, and transforming the map table for $U_F$ into $U_F$.

In one embodiment, the Shannon entropy of the basis vectors is minimized.

In one embodiment, an intelligent control system having a quantum search algorithm to reduce Shannon entropy includes a genetic optimizer to construct local solutions using a fitness function configured to minimize a rate of entropy production of a controlled plant. A quantum search algorithm is used to search the local solutions to find a global solution using a fitness function configured to minimize Shannon entropy.

In one embodiment, global solution includes weights for a fuzzy neural network. In one embodiment, the fuzzy neural network is configured to train a fuzzy controller, and the fuzzy controller provides control weights to a proportional-integral-differential (PID) controller. The PID controller controls a plant.

In one embodiment, a quantum search algorithm is evolved according to a fitness function selected to minimize Shannon entropy.

In one embodiment, quantum search algorithm is evolved by minimizing Heisenberg uncertainty and minimizing Shannon entropy.

In one embodiment, a quantum search evolves by applying an entanglement operator to create a plurality of correlated state vectors from a plurality of input state vectors and applying an interference operator to the correlated state vectors to generate an intelligent state vector, where the intelligent state vector has less classical entropy than the correlated state vectors.

In one embodiment, global optimization to improve a quality of a sub-optimal solution is accomplished by applying a first transformation to an initial state to produce a coherent superposition of basis states. A second transformation is applied to the coherent superposition using a reversible transformation to produce coherent output state. A third transformation is applied to the coherent output states to produce an interference of output states and a global solution is selected from the interference of output states. In one embodiment, the first transformation is a Hadamard rotation. In one embodiment, each of the basis states is represented using qubits. In one embodiment, the second transformation is a solution to Shrodinger's equation. In one embodiment, the third transformation is a quantum fast Fourier transform. In one embodiment, selecting is made to find a maximum probability. In one embodiment, the superposition of input states includes a collection of local solutions to a global fitness function.

BRIEF DESCRIPTION OF THE DRAWINGS

FIG. 36 illustrates information analysis of the Grover algorithm for a general iteration.

DETAILED DESCRIPTION

Introduction

Classical control theory is based on the assumption that all controlled plants can be approximated as linear systems. Unfortunately, this assumption is rarely true in the real world. Most plants are highly non-linear, and often have no simple control algorithm. To meet this need for nonlinear control, current control systems have been developed that use soft computing concepts such as genetic analyzer, fuzzy neural networks and the like. The control system evolves (changes) over time to adapt to changes in the plant, the operating environment, or both.

Figure 1A:
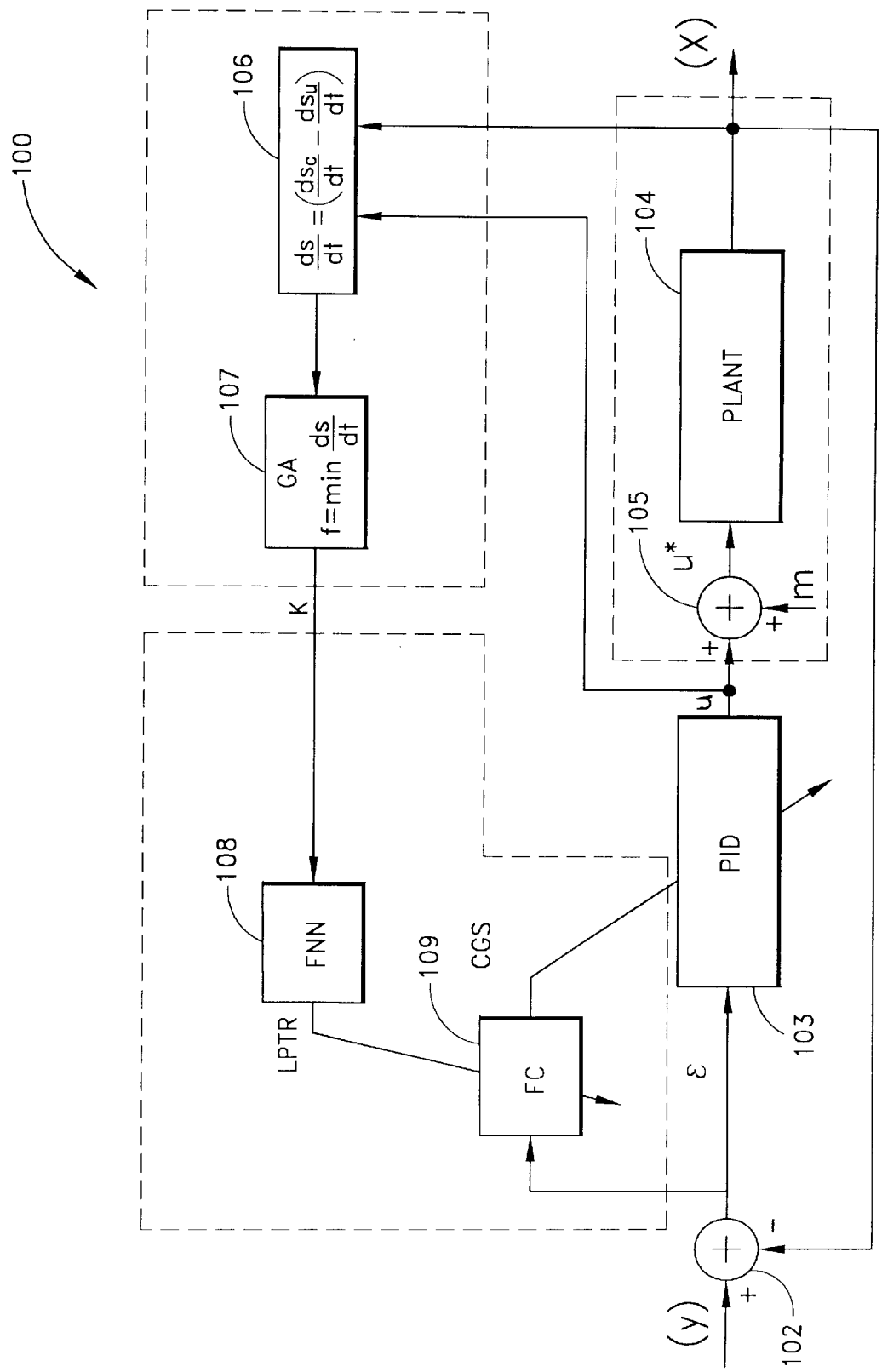
FIG. 1A is a block diagram showing a control system that uses soft computing in combination with a genetic search algorithm.

FIG. 1A shows a control system 100 based on soft computing to control a plant 104. An entropy production calculator 106 calculates an entropy production rate for the plant 104. An output from the entropy production calculator 106 is provided to an input of a Genetic Analyzer (GA) 107 (the GA can also be called a genetic optimizer). The GA 107 searches for a set of control weights that produce minimum entropy production. The weights are provided to a fuzzy neural network (FNN) 108. An output of the FNN is provided to a fuzzy controller 109. An output of the fuzzy controller 109 is a set of gain schedules for a conventional proportional-integral-differential (PID) controller 103 that controls the plant 104.

For soft computing systems based on a genetic analyzer (GA), there is very often no real control law in the classic control sense, but rather, control can be based on a physical control law such as minimum entropy production. This allows robust control because the GA 107, combined with feedback, guarantees robustness. However, robust control is not necessarily optimal control.

The GA 107 attempts to find a global optimum solution for a given solution space. Any random disturbance of the plant can "kick" the GA 107 into a different solution space. Thus for example, if the controlled plant is a suspension system of a car, a change in road conditions can force the GA into a different solution space.

Genetic algorithms are global search algorithms based on the mechanics of natural genetics and natural selection. In the genetic search, each design variable is represented by a finite length binary string and these finite binary strings are connected in a head-to-tail manner to form a single binary string. Possible solutions are coded to represented by a population of binary strings. Genetic transformations analogous to biological reproduction and evolution are subsequently used to improve and vary the coded solutions. Usually, three principal operators i.e., reproduction, crossover, and mutation are used in the genetic search.

The reproduction process is one that biases the search toward producing more fit members in the population and eliminating the less fit ones. Hence, a fitness value is first assigned to each string in the population. One simple approach to select members from a initial population to participate in the reproduction is to assign each member a probability of selection on the basis of its fitness value. A new population pool of the same size as the original is then created with a higher average fitness value.

The process of reproduction simply results in more copies of the dominant design to be present in the population. The crossover process allows for an exchange of design characteristics among members of the population pool with the intent of improving the fitness of the next generation. Crossover is executed by selecting strings of two mating parents, randomly choosing two sites on the strings, and swapping strings of 0's and 1's between these chosen sites.

Mutation safeguards the genetic search process from a premature loss of valuable genetic material during reproduction and crossover. The process of mutation is simply to choose a few members from the population pool according to the probability of mutation and to switch a 0 to 1 or vice versa at a randomly selected mutation site on the selected string.

Figure 1B:
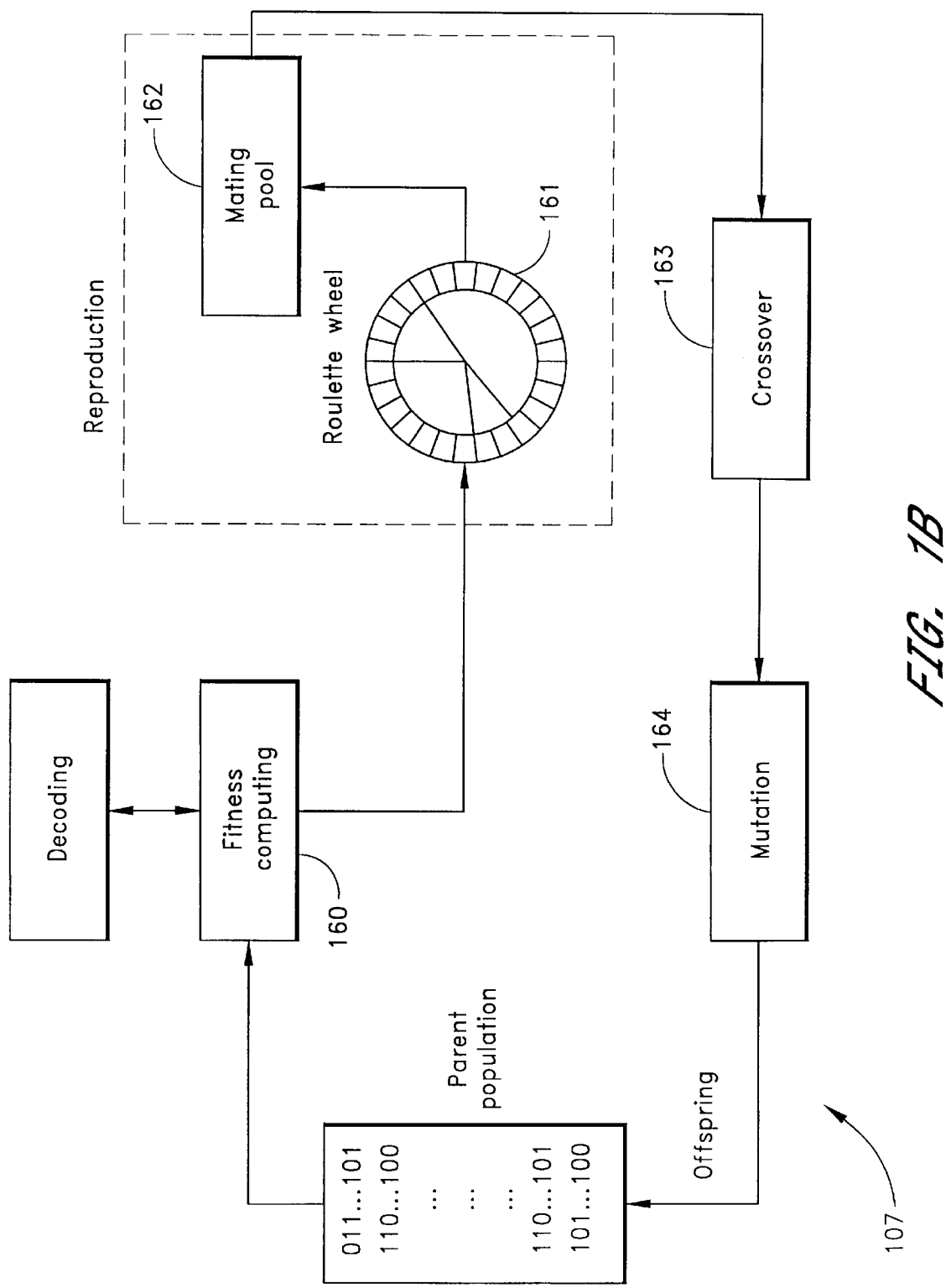
FIG. 1B is a block diagram showing the process of the genetic search.

A simple schematic illustration of the process of genetic search (as used by the GA 107) is shown in FIG. 1B. A population of strings is first transformed into decimal codes and then sent into the fitness process 160 for computing the fitness of all strings. A biased roulette wheel 106 where each string has roulette wheel slot sized in proportion to its fitness is created. A spinning of the weighted roulette wheel yields the reproduction candidate. In this way, a higher fitness of strings has a higher number of offspring in the succeeding generation. Once a string has been selected for reproduction, a replica of the string based on its fitness is created and then entered into a mating pool 162 for waiting the further genetic operations. After reproduction, a new population of stings is generated trough the evolution processes of crossover 163 and mutation 164. Finally, the whole genetic process, as mentioned above, is repeated again and again until an optimal solution is found.

In the foregoing discussion, the mechanics of the genetic search are simple, however, there are some key differences from traditional methods which contribute to the strengths of the approach. Genetic algorithms work on function evaluations alone and do not require function derivatives. While derivatives contribute to a faster convergence towards the optimum, they may also direct the search towards a local optimum. Furthermore, since the search proceeds from several points in the design space to another such set of design points, the method has a better probability of locating a global minimum as opposed to those schemes that proceed from one point to another. In addition, genetic algorithms work on a coding design variables rather than the variables themselves. This allows for an extension of these algorithms to design space consisting of a mix of continuous, discrete, and integer variables.

Figure 2:
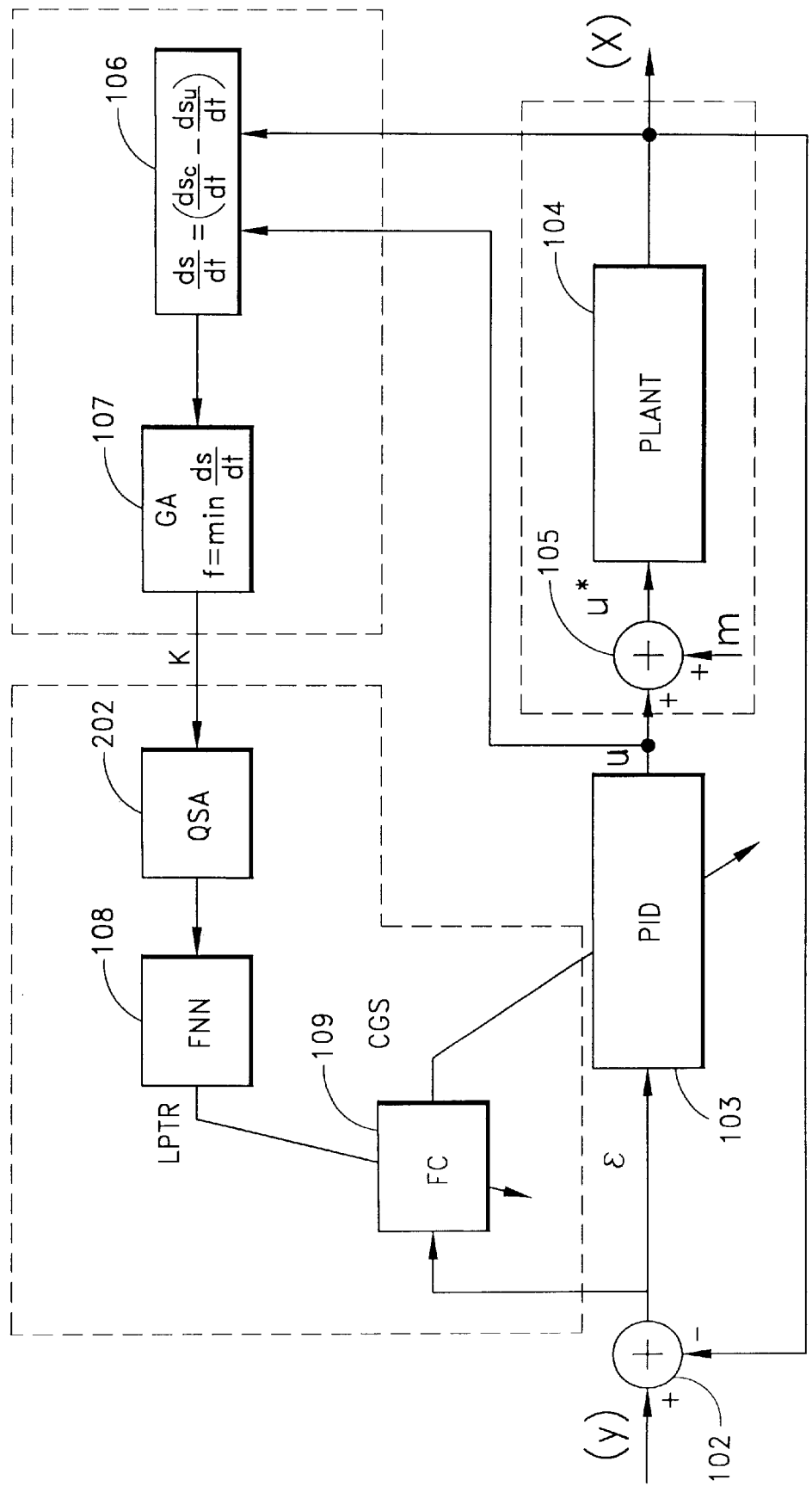
FIG. 2 is a block diagram showing a control system that uses soft computing in combination with a quantum search algorithm.

As stated above the GA 107 searches for a global optimum in a single solution space. It is desirable, however, to search for a global optimum in multiple solution spaces to find a "universal" optimum. A quantum search algorithm provides the ability to search multiple spaces simultaneously (as described below). FIG. 2 shows a modified version of the control system wherein a Quantum Search Algorithm (QSA) 202 is interposed between the GA 107 and the FNN 108. The QSA 108 searches several solution spaces, simultaneously, to find a universal optimum, that is, a solution that is optimal considering all solution spaces.

Quantum Algorithms are global random searching algorithms based on the quantum mechanics principles, laws, and quantum effects. In the quantum search, each design variable is represented by a finite linear superposition of classical initial states, with a sequence of elementary unitary steps manipulate the initial quantum state |i> (for the input) such that a measurement of the final state of the system yields the correct output. It begins with elementary classical preprocessing, and then it applies the following quantum experiment: starting in a initial superposition of all possible states, it computes a classical function, applies a quantum Fourier transform, and finally, performs a measurement. Depending on the outcome, it may carry out one or more similar quantum experiments, or complete the computation with some classical post-processing. Usually, three principal operators are used in the quantum searching algorithm.

These operators are linear superposition (coherent states), entanglement, and interference.

Linear superposition is closely related to the familiar mathematical principle of linear combinations of vectors. Quantum systems are described by a wave function ψ that exists in a Hilbert space. The Hilbert space has a set of states $|\phi_i\rangle$, that form a basis, and the system is described by a quantum state:

$$|\psi\rangle = \sum_i c_i |\phi_i\rangle$$

$|\psi\rangle$ is said to be in a linear superposition of the basis states $|\phi_i\rangle$, and in the general case, the coefficients $c_i$ may be complex. Use made here of the Dirac bracket notation, where the ket $|\ \rangle$ is analogous to a column vector, and the bra $\langle\ |$ is analogous to the complex conjugate transpose of the ket.

In quantum mechanics, the Hilbert space and its basis have a physical interpretation, and this leads directly to perhaps the most counterintuitive aspect of the theory. The counter intuition is that (at the microscopic level), the state of the system is described by the wave function, that is, as a linear superposition of all basis states (i.e., in some sense, the system is in all basis states at once). However, at the macroscopic or classical level, the system can be in only a single basis state. For example, at the quantum level, an electron can be in a superposition of many different energies; however, in the classical realm, this cannot be. This is similar to saying that during a coin toss, while the coin is in the air, the coin is in a superposition of both of its basis states (heads and tails). When the coin lands, the wave function "collapses" into one of the classical states, either heads or tails. While the coin is in the air, one cannot say how it will land, one can only assign probabilities. The quantum mechanical wave function ψ does the same thing. The wave function ψ assigns probabilities that the system will "land" in each of its basis states.

Coherence and decoherence are closely related to the idea of a linear superposition. A quantum system is said to be coherent if it is in a linear superposition of its basis states. A result of quantum mechanics is that if a system is in a linear superposition of states interacts with its environment, the superposition is destroyed. This loss of coherence is called decoherence and is governed by the wave function. The coefficients $c_i$ are called probability amplitudes and $|c_i|^2$ gives the probability of $|\psi\rangle$ collapsing into the state $|\phi_i\rangle$ upon the occurrence of an interaction with the environment that causes decoherence (i.e. a measurement). The wave function describes a real physical system that must collapse into exactly one basis state. Therefore, the probabilities governed by the amplitudes $c_i$ must sum to unity. This necessary constraint is expressed as the unitary condition $$\Sigma |c_i|^2 = 1$$

In the Dirac notation, the probability that a quantum state will collapse into an eigenstate (basis state) is written $|\langle\phi_i|\psi\rangle|^2$ and is analogous to the dot product (projection) of two vectors. Consider, for example, a discrete physical variable, called spin. The simplest spin systems is a two-state system called a spin-1/2 system, whose basis states are represented as spin-up and spin-down. In this simple system the wave function is a distribution over two values (up and down) and a coherent state is a linear superposition of spin up and spin down. As long as the system maintains its quantum coherence, it cannot be said to be either spin up or spin down. It is in some sense both at once. Classically, of course, it must be one or the other, and when this system undergoes decoherence, the result is either sin up or spin down.

Operators on a Hilbert space describe how one wave function is changed into another. They will typically be denoted as matrices acting on vectors. Using operators, an eigenvalue equation can be written $$A|\phi_i\rangle = a_i|\phi_i\rangle$$

where $a_i$ are the eigenvalues of the operator A. The solutions to such an equation are called eigenstates and can be used to construct the basis of a Hilbert space. In the quantum formalism, all properties are represented as operators whose eigenstates are the basis for the Hilbert space associated with that property and whose eigenvalues are the quantum allowed values for the at property. It is important to note that operators in quantum mechanics are linear operators and further that they are unitary so that $A^*A=AA^*=I$, where I is the identity operator, and $A^*$ is the complex conjugate transpose, (also known as the adjoint) of A.

Interference is a familiar wave phenomenon. Wave peaks that are in phase will constructively add, while those that are out of phase interfere destructively. This is a phenomenon common to all kinds of wave mechanics from water waves to light. The well known double slit experiment demonstrates empirically that at the quantum level, interference also applies to the probability waves of quantum mechanics.

Entanglement is the potential for quantum states to exhibit correlations that cannot be accounted for classically. Form a computational standpoint, entanglement seems intuitive enough, it is simply the fact that correlations can exist between different quantum systems (e.g. different particles). For example, if one quantum particle is the in spin-up state, then another will be in the spin-down state. What makes it so powerful is the fact that since quantum states exist as superpositions, these correlations exist in the superposition as well. When the superposition is destroyed, the proper correlation is instantly communicated between the particles, and it is this communication that is the crux of entanglement. The communication occurs instantaneously, even if the particles are separated by a large distance. Einstein called this "spooky action at a distance."

From a computational standpoint, quantum states that are superpositions of only basis states that are maximally far apart in terms of Hamming distance are those states with the greatest entanglement. Moreover, while interference is a quantum property that has a classical cousin, entanglement is a completely quantum phenomenon for which there is no classical analog.

Quantum networks are one of the several models of quantum computation. Others include quantum Turing machines, and quantum cellular automa. In the quantum networks model, each unitary operator is modeled as a quantum logic gate that affects one, two, or more quantum bits (qubits). Qubits exist in a superposition of states, thus, quantum logic gates operate on qubits by operating on all states in the superposition simultaneously. This results in quantum parallelism. (The term quantum logic gate is simply a schematic way to represent the time evolution of a quantum system. The term "gates" is not meant to imply that quantum computation can be physically realized in a manner similar to classical logic networks.)

Because of the entanglement (quantum correlations) between the quantum particles, the state of the system cannot be specified simply by describing the state of each particle. Instead, the state of the particles is a complicated superposition of all $2^n$ basis states, so $2^n$ complex coefficients are needed in order to describe it. The exponentially large size of a Hilbert space is an ingredient in quantum computations. It is tempting to think that exponential parallelism implies exponential computational power, but this is not the case. In fact, classical computations can be viewed as having exponential parallelism as well, the problem lies in the question of how to extract the exponential information out of the system. In quantum computation, in order to extract quantum information, one has to observe the system. The measurement process causes the famous collapse of the wave function. In a nutshell, the means that after the measurement, the state is projected onto one of the exponentially many possible states, so that the exponential amount of information which has been computed is lost.

In order to take advantage of exponential parallelism, one needs to combine it with interference. Interference allows the exponentially many computations done in parallel to cancel each other, just like destructive interference of waves or light. The goal is to arrange the cancellation such that only the computations which are of interest remain, and all the rest cancel out. The combination of exponential parallelism and interference is what makes quantum computations powerful and plays an important role in quantum algorithms. The Fourier transform indeed manifests interference and exponentiality.

In classical computations and in digital electronics, one deals with sequences of elementary operations (operations such as ANDS, OR, and NOT). These sequences are used to manipulate an array of classical bits. The operations are elementary in the sense that they act on only a few bits (one or two) at a time. It is sometimes convenient to refer to sequences as products and the operations as operators, matrices, instructions, steps, or gates. In quantum computation, one also deals with sequences of elementary operations (such as controlled-NOT and qubit rotations), but for manipulating qubits instead of classical bits. Quantum sequences of elementary operations are often represented graphically by qubit circuits. In quantum computations, one often knows the unitary operator U that describes the evolution of an array of qubits.

Figure 3A:
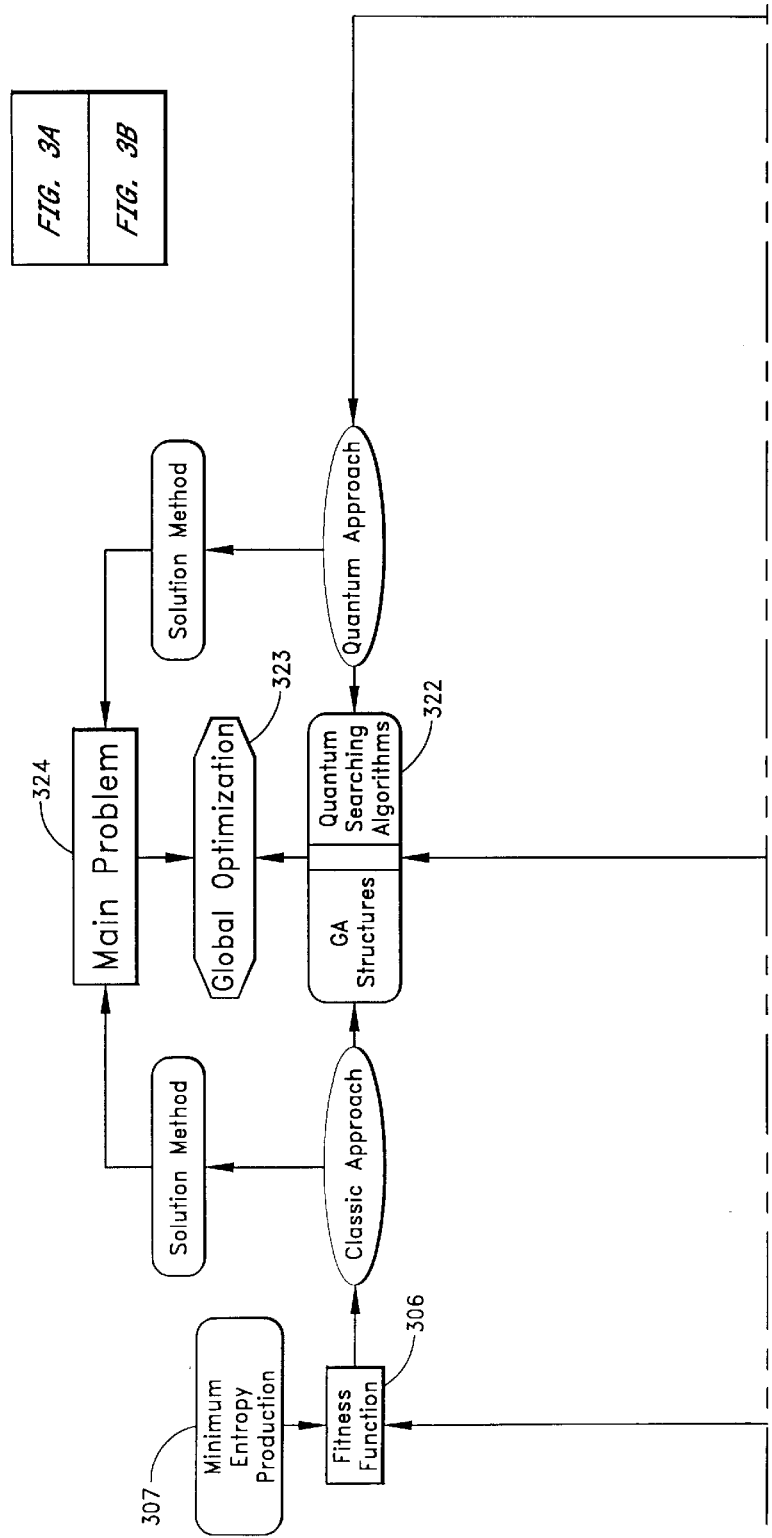
FIG. 3, consisting of FIGS. 3A and 3B, is a block diagram showing the structure of a classical genetic algorithm and a quantum searching algorithms for global optimization.
Figure 3B:
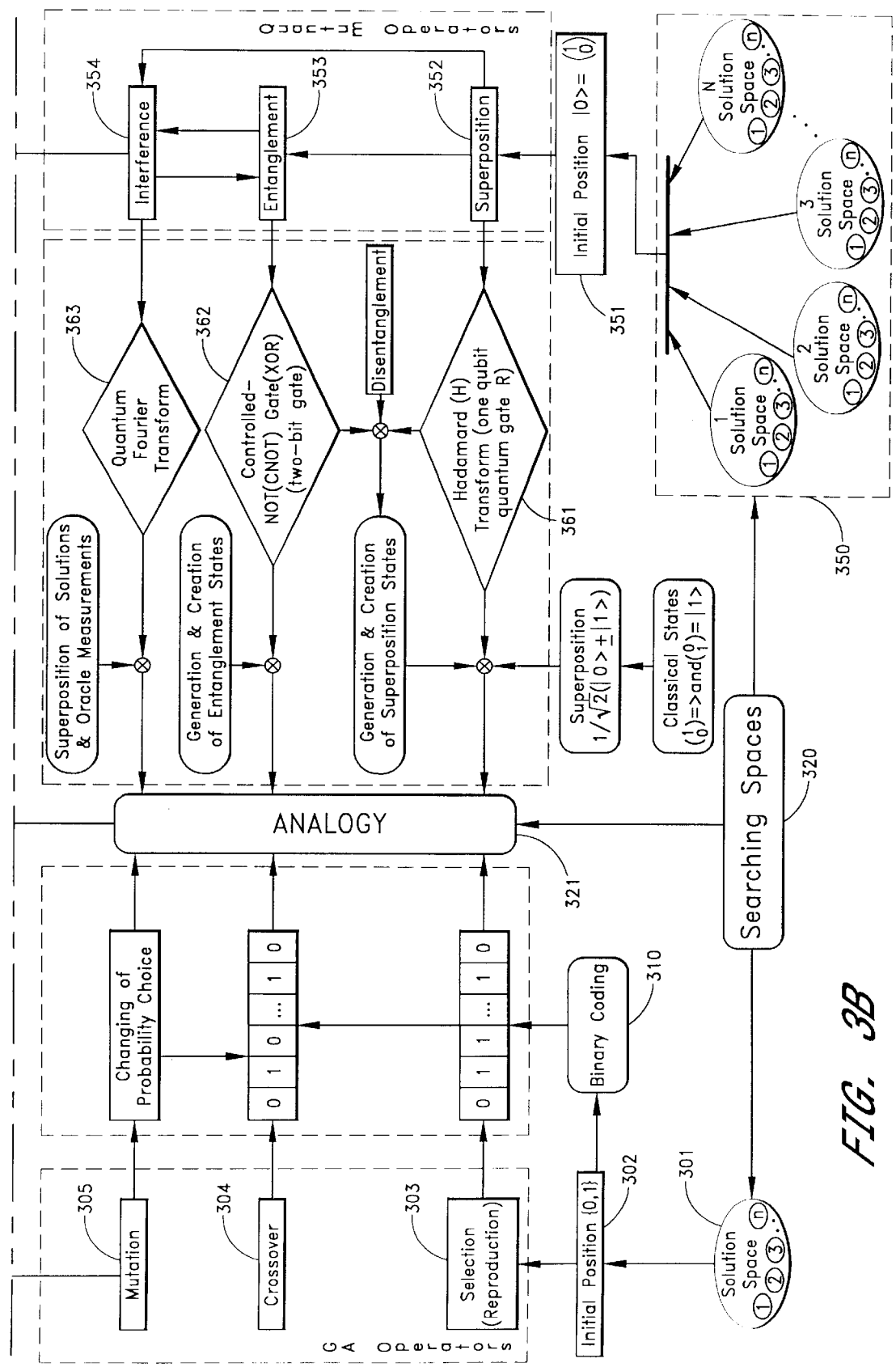

The exponential parallelism inherent in quantum systems allows quantum searching algorithms to provide for the support of decision-making process in control systems. FIG. 3 compares the structures of the GA and QSA algorithms. As shown in FIG. 3, in the GA search, a solution space 301 leads to an initial position (input) 302. The initial position 302 is coded into binary strings using a binary coding scheme 310. GA operators such as selection 303, crossover 304, and mutation 305 are applied to the coded strings to generate a population. Through a fitness function 306 (such as a fitness function based on minimum entropy production or some other desirable property) a global optimum for the space 301 is found.

By contrast, in the QSA shown in FIG. 3, a group of N solution spaces 350 are used to create an initial position (input) 351. Quantum operators such as superposition 352, entanglement 353, and interference 354 operate on the initial position to produce a measurement. Superposition is created using a Hadamard transformation 361 (a one-bit operation). Entanglement is created through a Controlled-NOT operation 362 (a two-bit operation). Interference is created through a Quantum Fourier Transform (QFT) 363. Using the quantum operators, a universal optimum for covering all the spaces in the group 350 is found.

Thus, the classical process of selection is loosely analogous to the quantum process of creating a superposition. The classical process of crossover is loosely analogous to the quantum process of entanglement. The classical process of mutation is loosely analogous to the quantum process of interference.

Figure 4A:
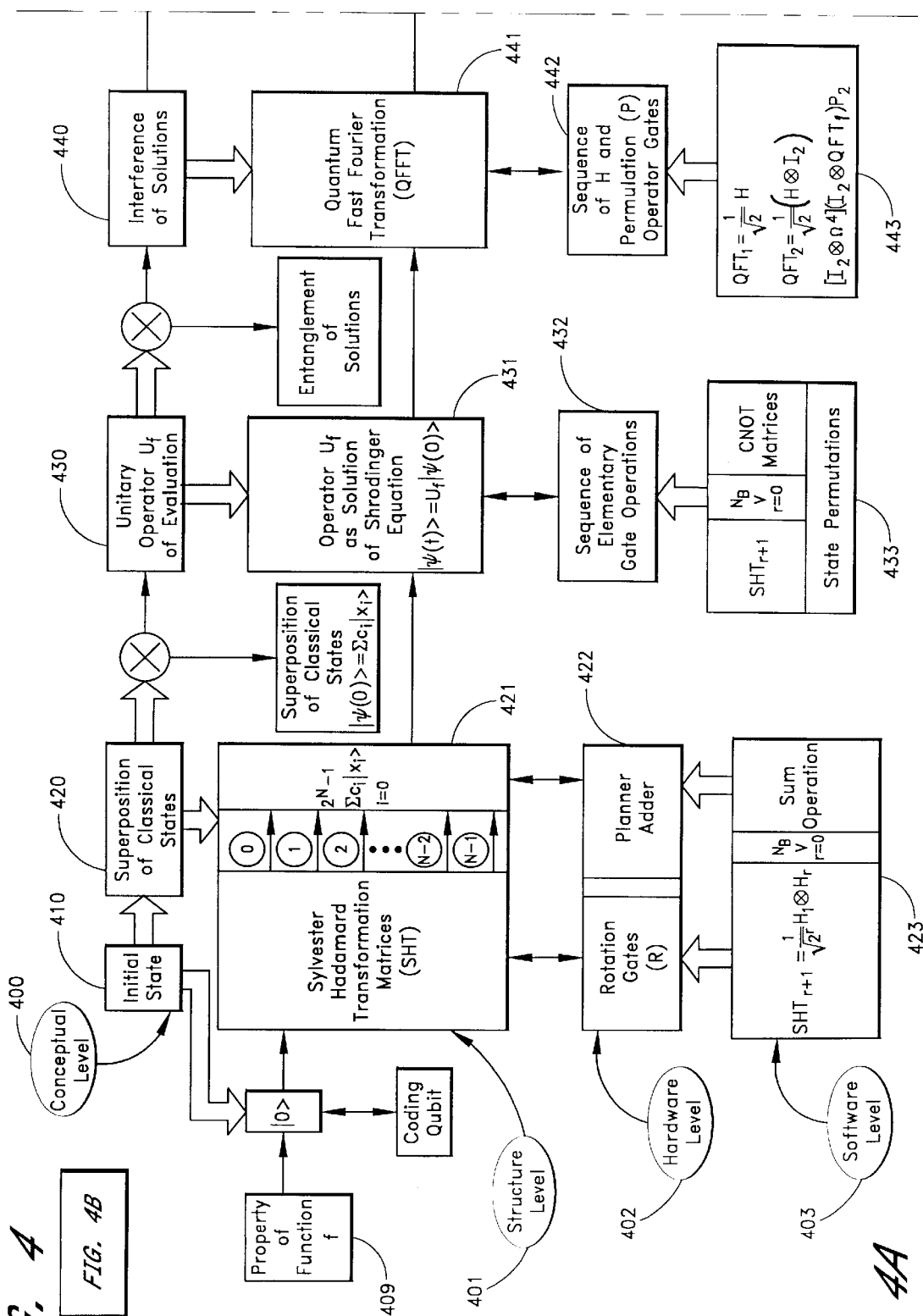
FIG. 4, consisting of FIGS. 4A and 4B, is a block diagram showing a general structure of a quantum search algorithm.
Figure 4B:
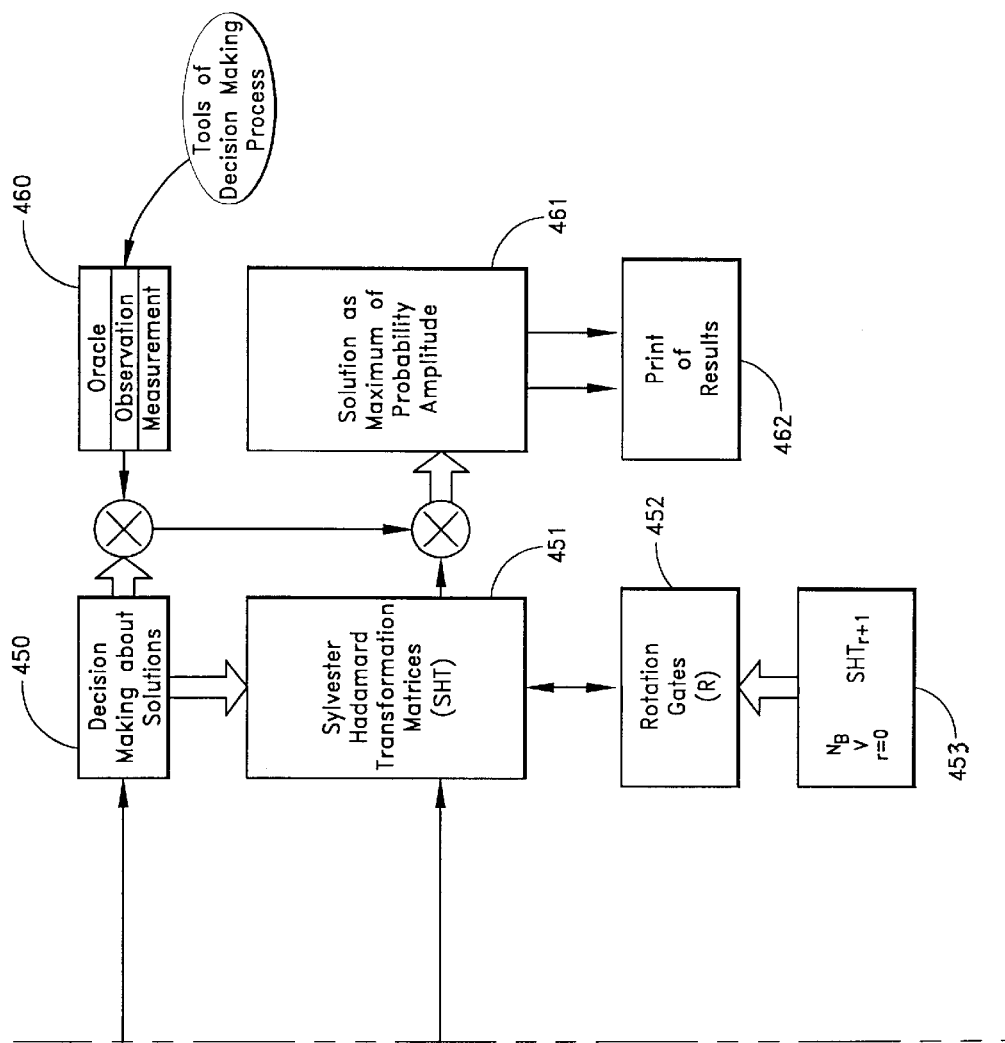

FIG. 4 shows a general structure of a QSA (such as the QSA 202) having a conceptual level 400, a structure level 401, a hardware level 402, and a software level 403. At the conceptual level 400, an initial state 410 is provided to a process block 420 that creates a superposition of states. The superposition of states is provided to a process block 430 that provides a unitaary operator $U_f$ to the superposition. An output of the process block 430 is provided to a solution block 440 that computes an interference of solutions. An output of the solution block 440 is provided to a observation/measurement block 460.

At the structure level, an input is coded as a series of quantum bits (qubits) that are prepared in an initial state (e.g., a logical zero state) and provided to a Hadamard Transformation Matrix 421 to produce the superposition. The superposition from the matrix 421 is provided to the operator $U_f$ where $U_f$ is a solution to the Schrodinger Equation in a process block 431. An output from the process block, being a solution to the Schrodinger equation, is provided to a Quantum Fast Fourier Transform (QFFT) 441 to provide the interference. The output of the QFFT 441 is provided to a Transformation Matrix 451. An output of the Transformation matrix 451 is provided as a solution of maximum probability amplitude 461.

At the hardware level, the superposition 420 is produced by rotation gates 422, the operator $U_f$ is implemented as a sequence of elementary gate operations 432, the QFFT 441 is implemented as a sequence of Hadmarad and Permutation (P) operator gates, and the Transformation Matrix 451 is implemented using rotation gates 452.

Figure 5:
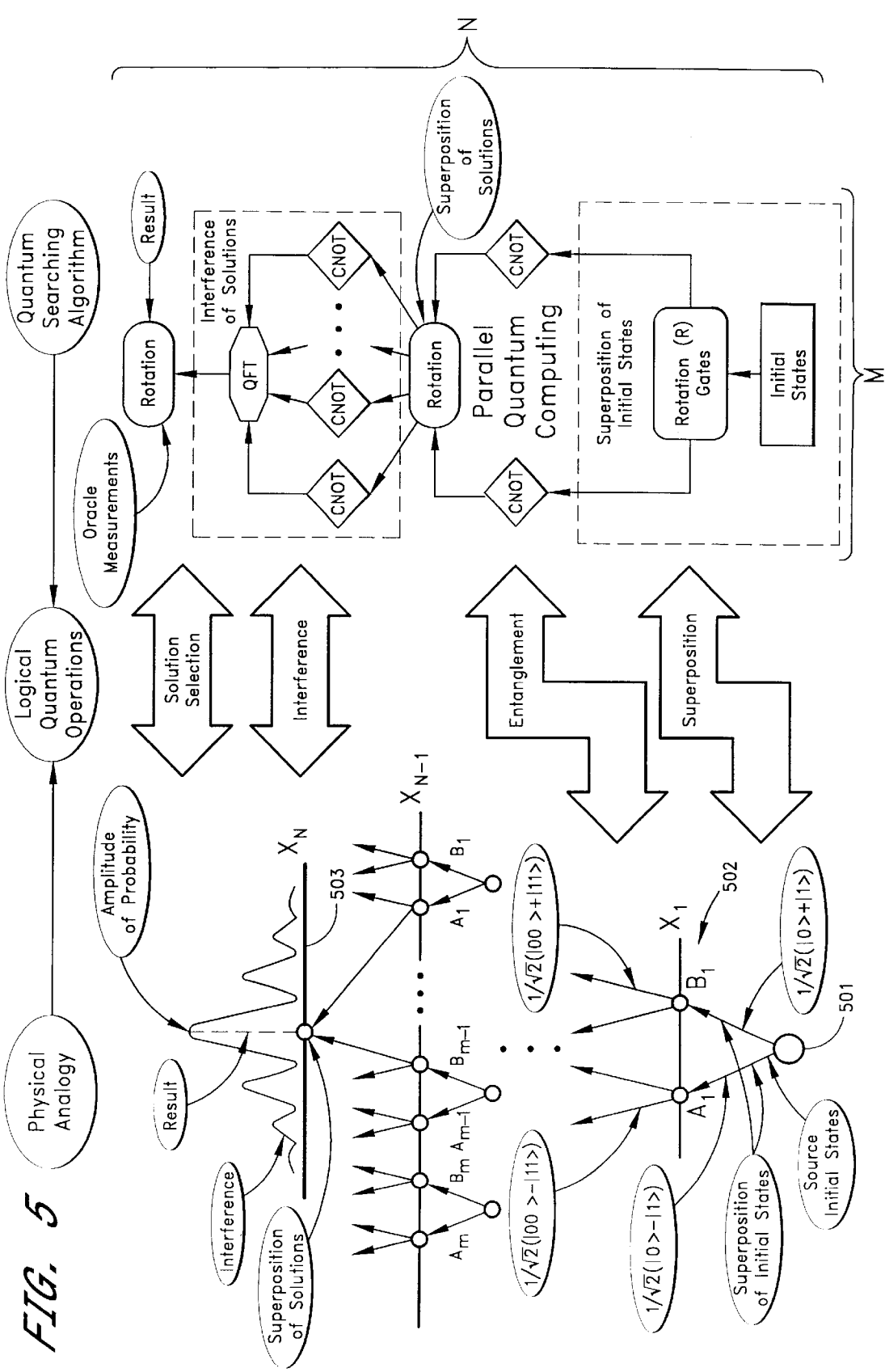
FIG. 5 is a block diagram showing a quantum network for a quantum search algorithm.

FIG. 5 illustrates the QSA as an architecture involving the sequence from an initial state, through the creation of a superposition. Entanglement is applied to the superposition using quantum parallelism inherent in a coherent quantum system with entangled states. The parallelism collapses when interference is introduced to produce a superposition of solutions through the QFFT. FIG. 5 illustrates these processes by comparing the classical double slit experiment to logical quantum operations and to the quantum search operations.

In the classical double slit, a source 501 creates a particle having an initial superposition of states. This is analogous to the quantum algorithm operation of applying a Hadamard (rotation gates) to a qubit initial to an eigenstate.

Returning to the double slit, entanglement is produced with the particle passes through slits 502. This corresponds to the process of operating on the superposition using the unitary operator $U_f$.

Again returning to the double slit, interference is produced when the entangled particles strike a photographic film placed behind the slits to produce an interference pattern (a superposition of solutions). This corresponds to the QFFT.

Finally, selection of the desired solution corresponds to choosing the larges probability from the QFFT (that is, the brightest line produced on the film).

Figure 6:
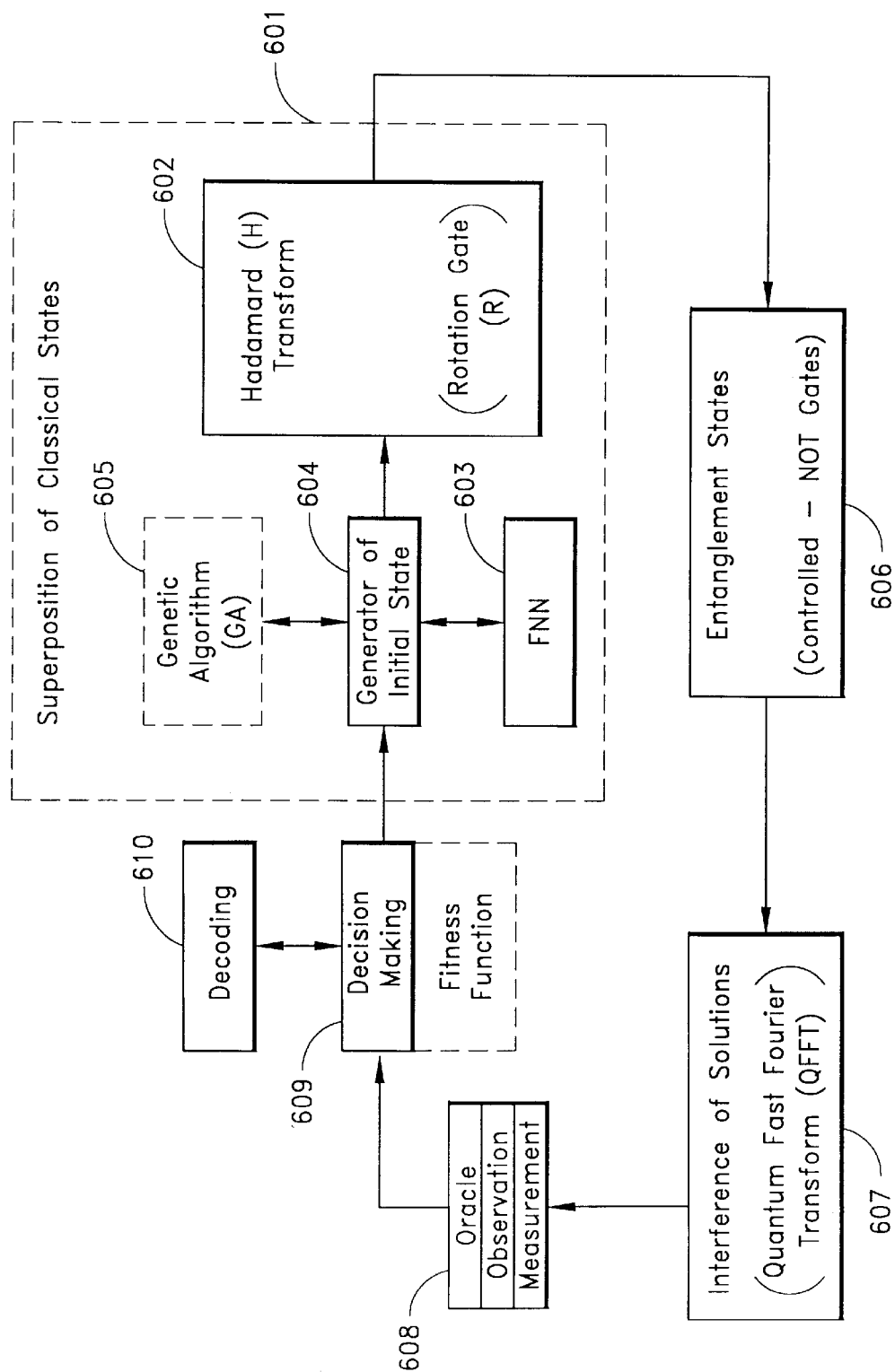
FIG. 6 is a block diagram of the quantum searching algorithm.

FIG. 6 shows use of the QSA in connection with a GA 605. In FIG. 6, a generator of initial states 604 works in connection with the GA 605 and, optionally a fuzzy neural network 603, to produce a set of initial states. The initial states are provided to a Hadamard transform 602 to produce a superposition of classical states 601. The superposition of classical states is provided to a process block 606 that introduces entanglement through the use of operators such as a controlled NOT. An output from the process block 606 is provided to an interference block 607 that computes an interference of the entangled states using a QFFT. An output from the interference block 607 is provided to a measurement/observation block 608 which selects a desired solution from the superposition of solutions computed by the block 607.

An output from the observation/measurement block 608 is provided to a decision block 609. The decision block 609 makes decisions such as inputs for the generator of initial states 604 and, optionally, a new fitness function for the GA 605. The decision block 609 can also provide data to, and receive data from a decoding block 610. The decoding block 610 can communicate with sensors, other control systems, users, etc.

The basis of quantum computation is obtained from the laws of quantum information theory wherein information is something that encoded in the state of a physical system, and a computation is something that can be carried out on an actual physical realizable device.

Two examples can help demonstrate the effects of quantum constrained approach to develop a correctness model of physical objects. First, comparing a classical Shannon data transmission channel $C_c$ to quantum data transmission channel $C_q$ shows that:

$$C_c = \ln\frac{P}{N};$$

whereas $$C_q = \ln\frac{P}{N+1},$$

where P is an input signal of a channel with the power P and N is a power of a noise. For $N \to 0$, $\lim C_c \to \infty$, $\lim C_q \to \ln P$ and we have the correctness model of information transmission channel with noise.

Second, consider identification of a mathematical model of a control object with a quantum constraint. For a classical object, $[x,y]=0$ (commutative case), $$y(t) = \int_0^t x(\tau)k(t-\tau)d\tau \qquad (2.1)$$

Whereas, for an object based on quantum correction of model identification, $[x,y]=i\hbar$ (non-commutative case)

$$y(t) = \frac{\hbar}{2}x(t) + \int_0^t x(\tau)k(t-\tau)d\tau. \qquad (2.2)$$

In the quantum case, non-correctness of a Fredholm integral equation of 1st order maps into correctness of a Fredholm integral equation of 2nd order. This means that it is possible with the small error in measurements of an output signal y(t) in (2.2) to do the correctness identification of the input signal x(t) or a structure of dynamical system k(t) also with small error. In the classical case (2.1), a non-correctness model identification and a small error in measurement output signal gives a large error in the identification signal.

Quantum computing is based on the principles of quantum superposition, quantum interference and quantum entanglement. The quantum state at all times has components corresponding to some or all of the possible classical states. This quantum effect is known as a superposition state. A computer built upon quantum rules can process different inputs using massive parallelism and produce a superposition of outputs. In this case a quantum computer is a physical machine that can accept input states which represent a coherent superposition of many different possible inputs and subsequently evolve them into a corresponding superposition of outputs. Quantum entanglement allows one to encode data into non-trivial multi-particle superpositions of some pre-selected basis states, and quantum interference (which is a dynamic process) allows one to evolve initial quantum states (as inputs) into final states (as outputs) modifying intermediate multi-particle superpositions in some prescribed way. Quantum computers use the quantum interference of different computational paths to enhance correct outcomes and suppress erroneous outcomes of computations. A common pattern underpinning quantum algorithms can be identified when quantum computation is viewed as multi-particle interference. The multi-particle interference (unlike single-particle interference) does not any classical analogue and can be viewed as inherently quantum process.

Classical computers, although based on quantum physics, are not fully quantum, they do not use "quantumness" of matter at the information-theoretic level, where it really matters. Namely, in a classical computer information is recorded in macroscopic, two level systems. Wires conducting electrical current in computers can be in two basic states: when there is no current flowing through, representing a logical "0", or else when there is some current flowing through, representing a logical "1". These two states form a bit of information. All computation is based on logical manipulation of bits through logical gates acting on wires representing these bits. However, as described herein, a quantum computer can be simulated on a classical computer.

Instead of wires and currents, a quantum computer uses, for example, two electronic states of an atom to record information. The two quantum states can be, for example, the ground state, $|0\rangle$, and the excited state, $|1\rangle$ (using Dirac notation). Since an atom obeys the laws of quantum mechanics, the most general electronic state is a superposition of the two basic states given by $|\psi_1\rangle = c_1|0\rangle + c_2|1\rangle$, and called the quantum-bit or qubit, for short. In addition to 0 and 1 states, a qubit has, so to speak, all the states "in between". With two classical bits, there are four possibilities: 00, 01, 10, 11. This should be contrasted with two qubits which are in general in a state of the form: $|\psi_1\rangle = c_1|00\rangle + c_2|01\rangle + c_3|10\rangle + c_4|11\rangle$. If for example $c_1 = c_4 = 0$ and $$c_2 = c_3 = \frac{1}{\sqrt{2}},$$

then one has the famous Einstein-Podolski-Rosen (EPR) state:

$$|\psi_{EPR}\rangle = \frac{(|01\rangle + |10\rangle)}{\sqrt{2}}.$$

Two qubits in this state display a degree of correlation impossible in classical physics and hence violate the Bell inequality, which is satisfied by all local (i.e. classical) states. This phenomenon is called entanglement and is at the root of the success of quantum computing. The exploitation of a number of entangled qubits can lead to a considerable computational speed-up in a quantum computer over its classical counterpart. Thus, what distinguishes classical and quantum computing is how the information is encoded and manipulated, i.e. what plays a crucial role is whether the logical basis is the classical (Boolean logic) or the quantum logic.

A quantum computer can solve problems such as factoring and database search very efficiently. Quantum searching algorithms (QSA) can be used to solve problems that are not resolvable using classical algorithms. In one embodiment, quantum mechanical algorithms are combined efficient database algorithms that make use of specific properties of the database.

General Structure of Quantum Algorithms

Figure 7:
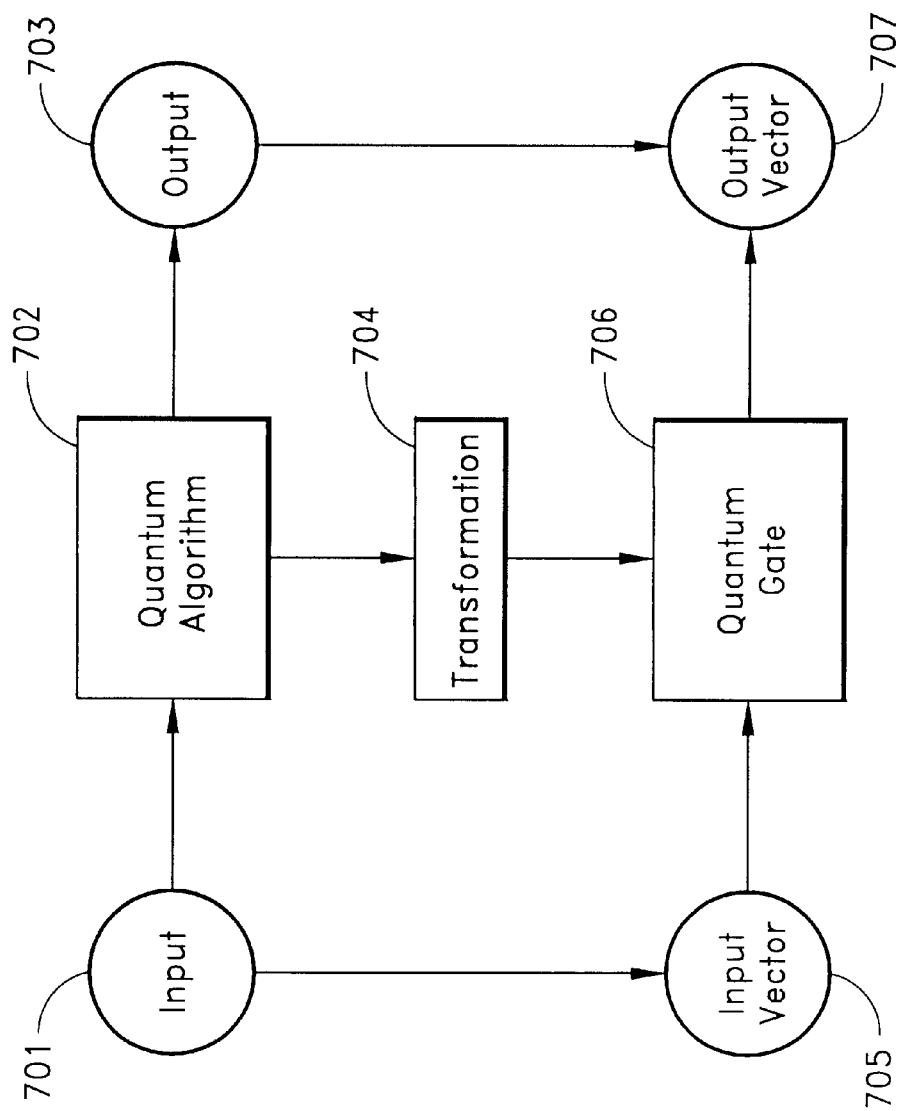
FIG. 7 illustrates a gate approach for simulation of quantum algorithms using classical computers.

In one embodiment, a Quantum Algorithm, written as a Quantum Circuit, is translated into the corresponding Programmable Quantum Gate. This gate is represented as a matrix operator such that, when it is applied to the vector representation of the quantum register input state, the produced result is the vector representation of the a register output state, as shown in FIG. 7

Quantum computation is based on three operators that act on quantum coherent states. The operators are: superposition, entanglement and interference. The coherent states are described as those solutions of the corresponding Schrödinger equation that represent the evolution states with minimum uncertainty (according to Heisenberg, they are those quantum states with "maximum classical properties"). The Hadamard Transform creates the superposition from classical states, and quantum operators as CNOT create robust entangled states. The Quantum Fast Fourier Transform provides interference. The efficient implementation of a number of operations for quantum computation include controlled phase adjustment of the amplitudes in superposition, permutation, approximation of the transformations, and generalizations of the phase adjustments to block-matrix transformations. These operations generalize those used in quantum search algorithms that are realized on a classical computer. The following sections demonstrate the application of this approach to the general case of simulation on classical computers, followed by examples based on the Deutsch-Jozsa algorithm and the Grover algorithm.

The problems solved by a quantum algorithms can be so stated as:

given a function $f:\{0,1\}^n \to \{0,1\}^m$ find a certain property of $f$.

Figure 8:
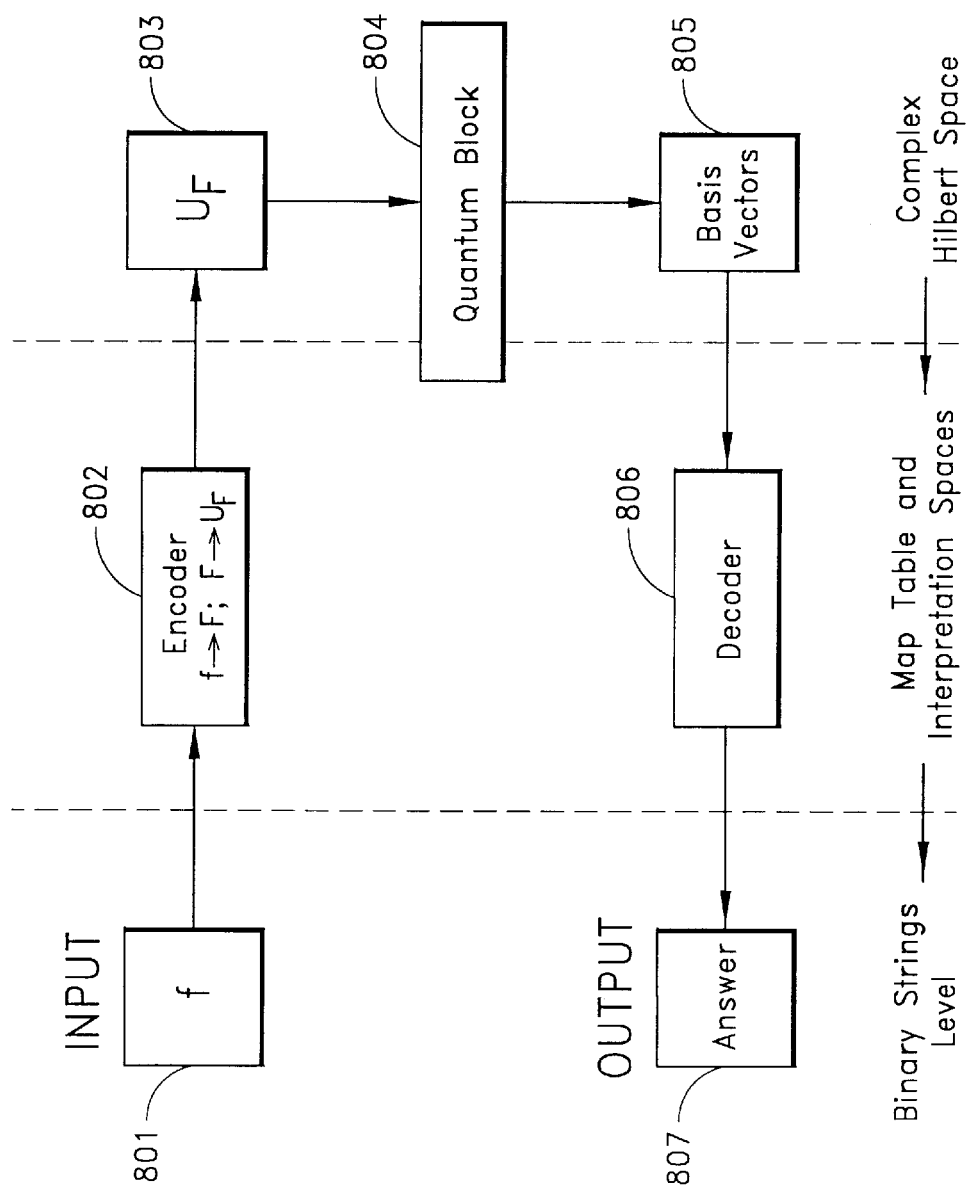
FIG. 8 illustrates a programming diagram for quantum algorithms.

The structure of a quantum algorithm is outlined, with a high level representation, in FIG. 8. In FIG. 8, an input 801, describing the function $f$, is provided to an encoder 802. An output of the encoder 802 is an operator $U_f$ 803. The operator 803 is provided to a quantum block 804. An output of the quantum block 804 is a set of basis vectors 805. The basis vectors 805 are provided to a decoder 806. An answer 807 is provided as an output of the decoder 806. The input 801 and output 807 make up a binary string layer. The encoder 802 and decoder 806 make up a map table and interpretation space level. The operator 803, the quantum block 804, and the basis vectors 805 exist in a complex Hilbert space.

The input of a quantum algorithm is a function $f$ that maps binary strings into binary strings. This function is represented as a map table, defining a mapping for every string its image. The function $f$ is firstly encoded into a unitary matrix operator $U_F$ that depends on the properties of $f$. In some sense, the unitary operator $U_F$ calculates $f$ when its input and output strings are encoded into canonical basis vectors of a complex Hilbert Space. $U_F$ maps the vector code of every string into the vector code of its image by $f$. A squared matrix $U_F$ on the complex field is unitary if and only if its inverse matrix coincides with its conjugate transpose: $U_F^{-1}=U_F^*$. A unitary matrix is always reversible and preserves the norm of vectors.

Once the matrix operator $U_F$ has been generated, it is embedded into a quantum gate G, a unitary matrix whose structure depends on the form of matrix $U_F$ and on the problem to be solved. The quantum gate is the heart of a quantum algorithm. The quantum gate acts on an initial canonical basis vector to generate a complex linear combination (a superposition) of basis vectors as an output. This superposition contains all of the information needed to answer the initial problem.

After this superposition has been created, measurement takes place in order to extract the information. In quantum mechanics, measurement is a non-deterministic operation that produces as output only one of the basis vectors in the entering superposition. The probability of every basis vector of being the output of measurement depends on its complex coefficient (probability amplitude) in the entering complex linear combination.

The segmental action of the quantum gate and of measurement is provided by the quantum block 804. The quantum block 804 is repeated k times in order to produce a collection of k basis vectors. Since measurement is a non-deterministic operation, these basic vectors will not necessarily be identical, and each one will encode a piece of the information needed to solve the problem.

The last part of the algorithm includes the interpretation of the collected basis vectors in order to get the answer to the initial problem with a certain probability.

Figure 9:
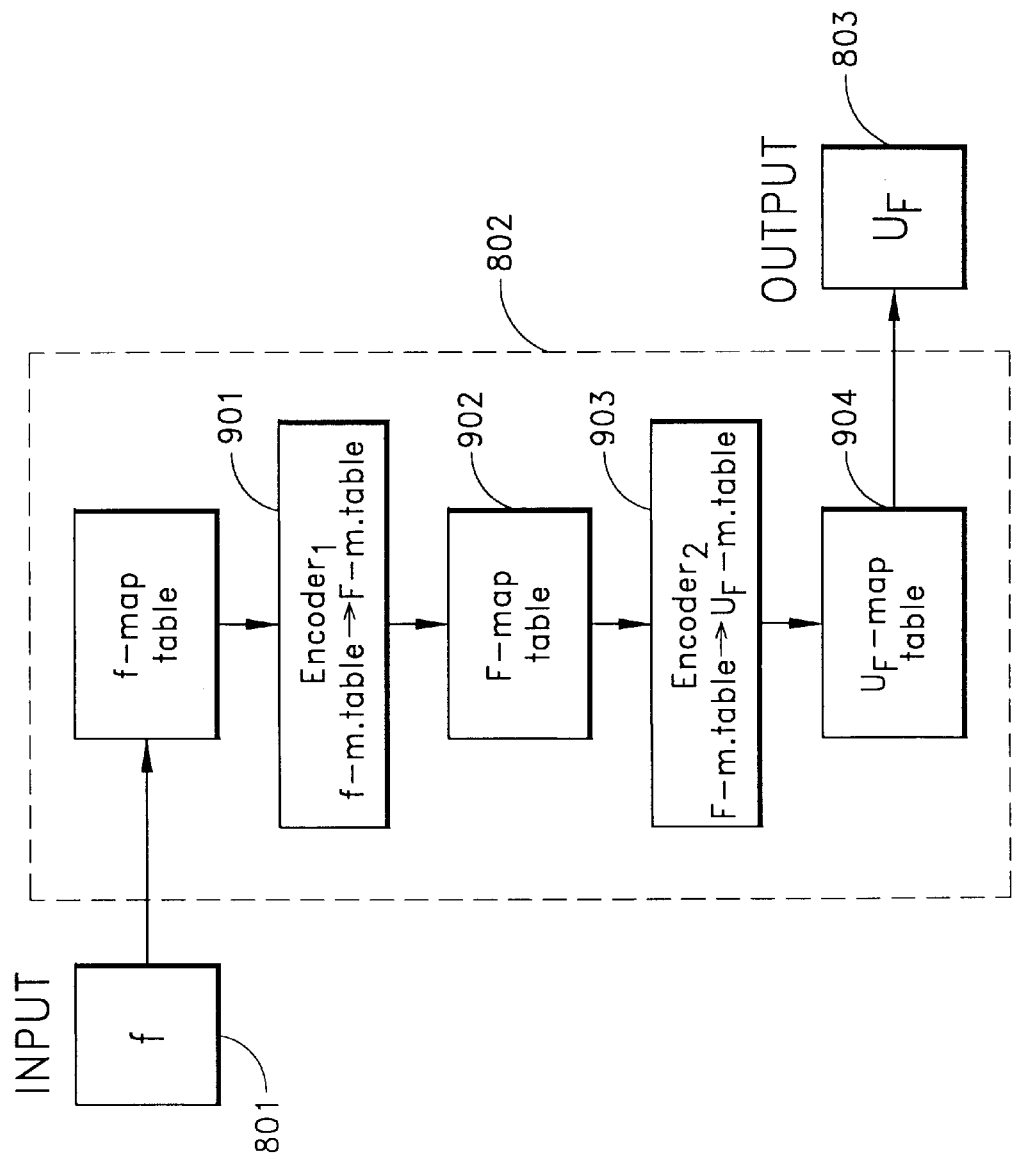
FIG. 9 illustrates the structure of the quantum encoder shown in FIG. 8.

The behaviour of the encoder block 802 is illustrated in FIG. 9. As shown in FIG. 9, the function $f$ is encoded into matrix $U_F$ in three steps. First, the map table of function $f:\{0,1\}^n \to \{0,1\}^m$ is transformed into the map table of the injective function $F:\{0,1\}^{n+m} \to \{0,1\}^{n+m}$ such that:

$$F(x_0, \ldots, x_{n-1}, y_0, \ldots, y_{m-1}) = (x_0, \ldots, x_{n-1}, f(x_0, \ldots, x_{n-1}) \oplus (y_0, \ldots, y_{m-1}))$$

The injective function comes from the requirement that $U_F$ is unitary. A unitary operator is reversible, so it cannot map two different inputs in the same output. Since $U_F$ is the matrix representation of F, F is supposed to be injective. To directly use the matrix representation of function $f$, would give a non-unitary matrix, since $f$ could be non-injective. So, injectivity is fulfilled by increasing the number of bits and considering the function F instead of the function $f$. The function $f$ can always be calculated from F by putting $(y_0, \ldots, y_{m-1})=(0, \ldots,)$ in the input string and reading the last m values of the output string.

In the second step in FIG. 9, the function F map table is transformed into a $U_F$ map table, according to the following constraint:

$$\forall s \in \{0,1\}^{n+m} : U_F[\tau(s)] = \tau[F(s)]$$

The code map $\tau:\{0,1\}^{n+m} \to C^{2n+m}$ ($C_{2n+m}$ is the target Complex Hilbert Space) is such that:

$$\tau(0) = \begin{pmatrix} 1 \\ 0 \end{pmatrix} = |0\rangle \qquad \tau(1) = \begin{pmatrix} 0 \\ 1 \end{pmatrix} = |1\rangle$$

$$\tau(x_0, \ldots, x_{n+m-1}) = \tau(x_0) \otimes \ldots \otimes \tau(x_{n+m-1}) = |x_0 \ldots x_{n+m-1}\rangle$$

The code $\tau$ maps bit values into complex vectors of dimension two belonging to the canonical basis of $C^2$. Using the tensor product, τ maps the general state of a binary string of dimension n into a vector of dimension $2^n$, reducing this state to the joint state of the n bits composing the register. Every bit state is transformed into the corresponding 2-dimesional basis vector, and then the string state is mapped into the corresponding $2^n$-dimesional basis vector by composing all bit-vectors through the tensor product. In this sense tensor product is the vector counterpart of state conjunction.

Finally, in step three of FIG. 9, the $U_F$ map table is transformed into $U_F$ using the following transformation rule:

$$[U_F]_{ij}=1 \Leftrightarrow U_F|j\rangle=|i\rangle$$

This rule can be understood by considering vectors $|i\rangle$ and $|j\rangle$ as column vectors. Associating these vectors to the canonical basis, $U_F$ defines a permutation map of the identity matrix rows. In general, row $|j\rangle$ is mapped into row $|i\rangle$.

Figure 10:
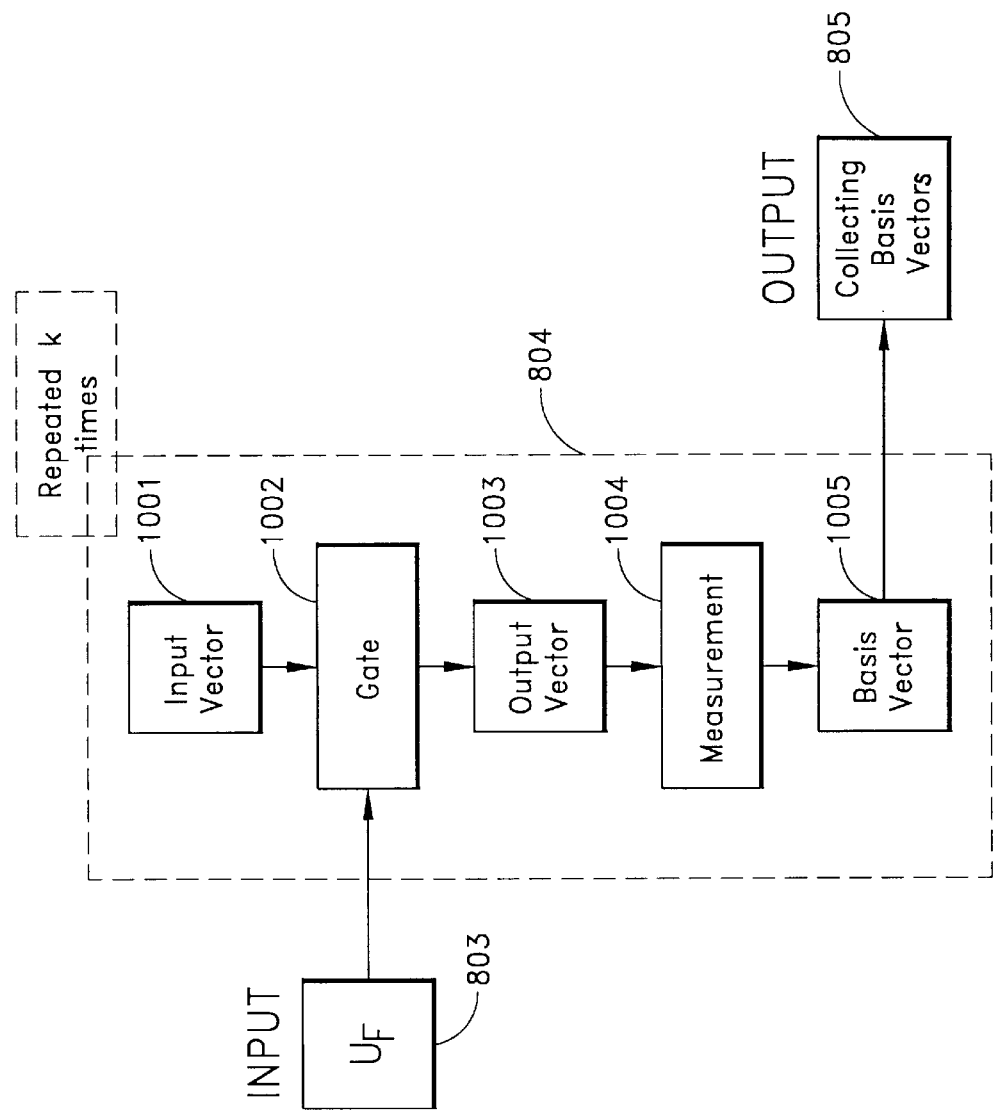
FIG. 10 illustrates the structure of the quantum block shown in FIG. 8.

FIG. 10 illustrates the operation of the quantum block 804. The heart of the quantum block 804 is the quantum gate 1002, which depends on the properties of matrix $U_F$.

The matrix operator $U_F$ is the output of the encoder block 802, and it is the input for the quantum block 804. In the quantum block 804, the matrix operator $U_F$ is first embedded into a more complex gate: the quantum gate G. The unitary matrix G is applied k times to an initial canonical basis vector $|i\rangle$ of dimension $2^{n+m}$. Every time, the resulting complex superposition $G|0 \ldots 01 \ldots 1\rangle$ of basis vectors is measured, producing one basis vector $|x_i\rangle$ as a result. The measured basis vectors $\{|x_i\rangle, \ldots, |x_k\rangle\}$ are collected together. This collection is the output of the quantum block 804. The "intelligence" of this algorithm lies in the ability to build a quantum gate that is able to extract the information necessary to find the required property of $f$ and to store it into the output vector collection.

Figure 11:
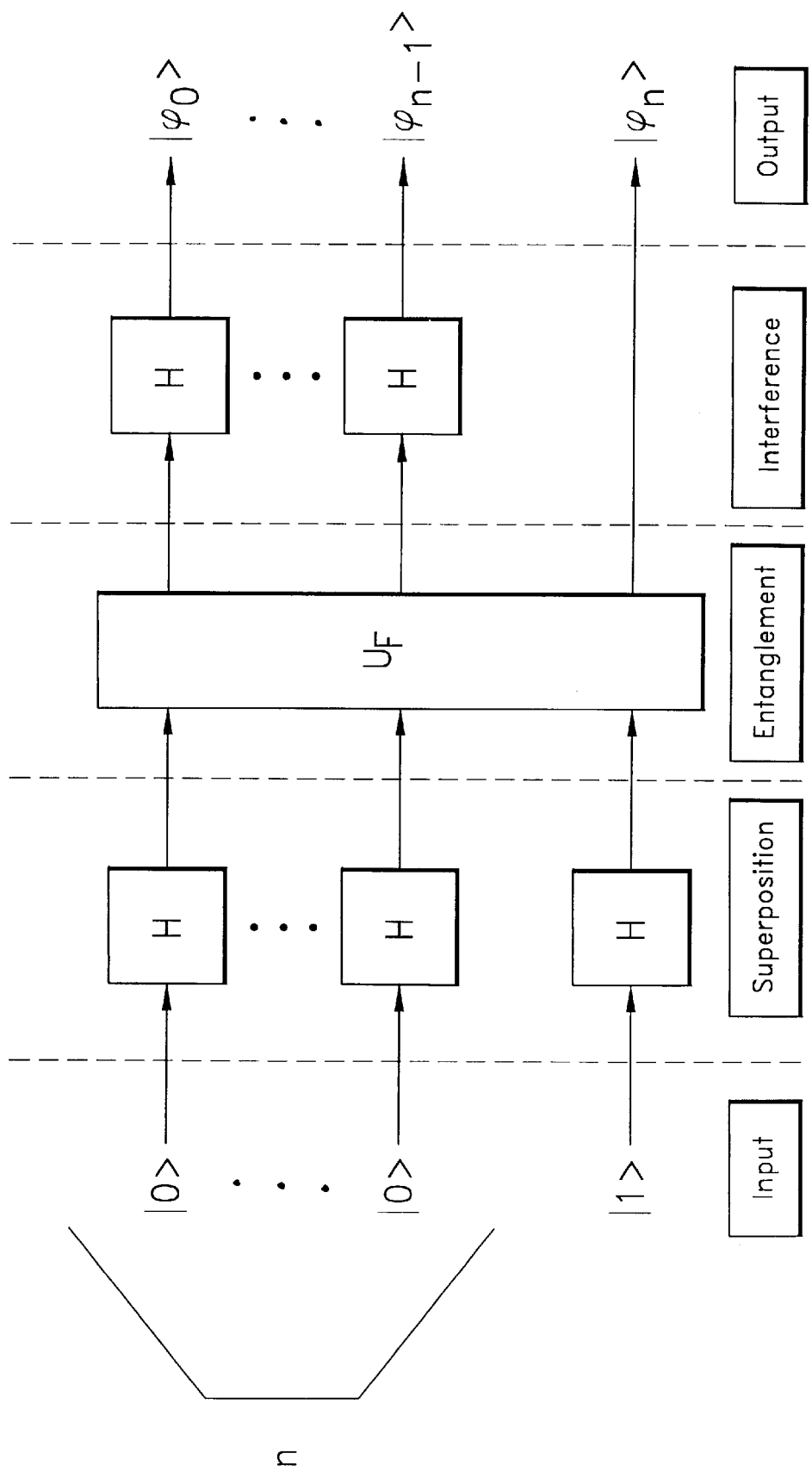
FIG. 11 illustrates an example of a quantum circuit.

In order to represent quantum gates, it is convenient to employ diagrams called quantum circuits. An example of quantum circuit is shown in FIG. 11. Each rectangle is associated with a matrix n×n, where n is the number of lines entering and leaving the rectangle. For example, the rectangle marked $U_F$ is associated to matrix $U_F$. Quantum circuits provide a high-level description of the gate. Using some transformation rules, one can compile them into the corresponding gate-matrix. These rules are illustrated in FIGS. 12A–12F The decoder block 806 interprets the basis vectors collected after the iterated execution of the quantum block 804. Decoding these vectors means to retranslate them into binary strings and interpreting them directly if they already contain the answer to the starting problem or using them, for instance, as coefficients vectors for some equation system, in order to get the searched solution.

As an example of the above algorithm, it is instructive to develop a quantum gate representation of the Deutsch-Jozsa's (DJ) algorithm. This gate is implemented according to the technique developed in connection with FIG. 8 to show the structure of matrix operator $U_F$.

The DJ algorithm is stated as: given a constant or balanced function $f:\{0,1\}^n \rightarrow \{0,1\}$, decide if $f$ is constant or balanced. (This problem is very similar to Deutsch's problem, but it has been generalised to n>1.)

A. First consider the encoder for the DJ algorithm for the special case where n=2. Thus:

$$n=2$$

$$\forall x \in \{0,1\}^n : f(x)=1$$

In this case the $f$ map table is given by: F

| x | f(x) |
|---|------|
| 00 | 1 |
| 01 | 1 |
| 10 | 1 |
| 11 | 1 |

The encoder block takes $f$ map table as input and encodes it into matrix operator $U_F$, which acts inside of a complex Hilbert space.

Function $f$ is encoded into the infective function F, built according to the following statement:

$$F:\{0,1\}^{n+1} \rightarrow \{0,1\}^{n+1}: F(x_0,x_1,y_0)=(x_0,x_1,f(x_0,x_1) \oplus y_0)$$

Then the F map table is:

| $(x_0, x_1, y_0)$ | $F(x_0, x_1, y_0)$ |
|---|---|
| 000 | 001 |
| 010 | 011 |
| 100 | 101 |
| 110 | 111 |
| 001 | 000 |
| 011 | 010 |
| 101 | 100 |
| 111 | 110 |

F is encoded into $U_F$ map table using the rule:

$$\forall t \in \{0,1\}^{n+1}: U_F[\tau(t)]=\tau[F(t)]$$

where τ is the code map defined above. This means:

| $|x_0\, x_1\, y_0\rangle$ | $U_F|x_0\, x_1\, y_0\rangle$ |
|---|---|
| $|000\rangle$ | $|001\rangle$ |
| $|010\rangle$ | $|011\rangle$ |
| $|100\rangle$ | $|101\rangle$ |
| $|110\rangle$ | $|111\rangle$ |
| $|001\rangle$ | $|000\rangle$ |
| $|011\rangle$ | $|010\rangle$ |
| $|101\rangle$ | $|100\rangle$ |
| $|111\rangle$ | $|110\rangle$ |

Starting from the map table of $U_F$, calculate the corresponding matrix operator. This matrix is obtained using the rule:

$$[U_F]_{ij}=1 \Leftrightarrow U_F|j\rangle=|i\rangle$$

So, $U_F$ is the following matrix:

| $U_F$ | $|000\rangle$ | $|001\rangle$ | $|010\rangle$ | $|011\rangle$ | $|100\rangle$ | $|101\rangle$ | $|110\rangle$ | $|111\rangle$ |
|---|---|---|---|---|---|---|---|---|
| $|000\rangle$ | 0 | 1 | 0 | 0 | 0 | 0 | 0 | 0 |
| $|001\rangle$ | 1 | 0 | 0 | 0 | 0 | 0 | 0 | 0 |
| $|010\rangle$ | 0 | 0 | 0 | 1 | 0 | 0 | 0 | 0 |
| $|011\rangle$ | 0 | 0 | 1 | 0 | 0 | 0 | 0 | 0 |
| $|100\rangle$ | 0 | 0 | 0 | 0 | 0 | 1 | 0 | 0 |
| $|101\rangle$ | 0 | 0 | 0 | 0 | 1 | 0 | 0 | 0 |
| $|110\rangle$ | 0 | 0 | 0 | 0 | 0 | 0 | 0 | 1 |
| $|111\rangle$ | 0 | 0 | 0 | 0 | 0 | 0 | 1 | 0 |

Using the matrix tensor product, $U_F$ can be written as:

$$U_F = I \otimes I \otimes C$$

where $\otimes$ is the tensor product, I is the identity matrix of order 2 and C is the NOT-matrix so defined:

$$C = \begin{bmatrix} 0 & 1 \\ 1 & 0 \end{bmatrix}$$

The matrix C flips a basis vector. In fact it transforms vector $|0\rangle$ into $|1\rangle$ and $|1\rangle$ into $|0\rangle$. If the matrix $U_F$ is applied to the tensor product of three vectors of dimension 2, the resulting vector is the tensor product of the three vectors obtained applying matrix I to the first two input vectors and matrix C to the third. The structure of $U_F$ is such that the first two vectors in the input tensor product are preserved, whereas the third is flipped (action of C). This action corresponds to the constraints stated by $U_F$ map table.

B. Now consider the case:

$$n=2$$

$$\forall x \in \{0,1\}^n : f(x)=0$$

In this case $f$ map table is given by:

| x | f(x) |
|---|------|
| 00 | 0 |
| 01 | 0 |
| 10 | 0 |
| 11 | 0 |

The F map table is:

| $(x_0, x_1, y_0)$ | $F(x_0, x_1, y_0)$ |
|-------------------|--------------------|
| 000 | 000 |
| 010 | 010 |
| 100 | 100 |
| 110 | 110 |
| 001 | 001 |
| 011 | 011 |
| 101 | 101 |
| 111 | 111 |

The F map table is encoded into the $U_F$ map table:

| $|x_0 x_1 y_0\rangle$ | $U_F|x_0 x_1 y_0\rangle$ |
|------------------------|---------------------------|
| $|000\rangle$ | $|000\rangle$ |
| $|010\rangle$ | $|010\rangle$ |
| $|100\rangle$ | $|100\rangle$ |
| $|110\rangle$ | $|110\rangle$ |
| $|001\rangle$ | $|001\rangle$ |
| $|011\rangle$ | $|011\rangle$ |
| $|101\rangle$ | $|101\rangle$ |
| $|111\rangle$ | $|111\rangle$ |

It is easy to transform this map table into a matrix. Every vector is preserved. Therefore the corresponding matrix is the identity matrix of order $2^3$.

| $U_F$ | $|000\rangle$ | $|001\rangle$ | $|010\rangle$ | $|011\rangle$ | $|100\rangle$ | $|101\rangle$ | $|110\rangle$ | $|111\rangle$ |
|---|---|---|---|---|---|---|---|---|
| $|000\rangle$ | 1 | 0 | 0 | 0 | 0 | 0 | 0 | 0 |
| $|001\rangle$ | 0 | 1 | 0 | 0 | 0 | 0 | 0 | 0 |
| $|010\rangle$ | 0 | 0 | 1 | 0 | 0 | 0 | 0 | 0 |
| $|011\rangle$ | 0 | 0 | 0 | 1 | 0 | 0 | 0 | 0 |
| $|100\rangle$ | 0 | 0 | 0 | 0 | 1 | 0 | 0 | 0 |
| $|101\rangle$ | 0 | 0 | 0 | 0 | 0 | 1 | 0 | 0 |
| $|110\rangle$ | 0 | 0 | 0 | 0 | 0 | 0 | 1 | 0 |
| $|111\rangle$ | 0 | 0 | 0 | 0 | 0 | 0 | 0 | 1 |

Using matrix tensor product, this matrix can be written as:

$$U_F = I \otimes I \otimes I$$

The structure of $U_F$ is such that all basis vectors of dimension 2 in the input tensor product evolve independently. No vector controls any other vector.

For example, consider the balanced function:

$$n=2$$

$$\forall (x_1, \ldots, x_n) \in \{0,1\}^n : f(x_1, \ldots, x_n) = x_1 \oplus \ldots \oplus x_n$$

In this case $f$ map table is the following:

| x | f(x) |
|---|------|
| 00 | 0 |
| 01 | 1 |
| 10 | 1 |
| 11 | 0 |

The following map table, calculated as described above, represents the injective function F (where $f$ is encoded into):

| $(x_0, x_1, y_0)$ | $F(x_0, x_1, y_0)$ |
|-------------------|--------------------|
| 000 | 000 |
| 010 | 011 |
| 100 | 101 |
| 110 | 110 |
| 001 | 001 |
| 011 | 010 |
| 101 | 100 |
| 111 | 111 |

Now encode F into $U_F$ map table:

| $|x_0 x_1 y_0\rangle$ | $U_F|x_0 x_1 y_0\rangle$ |
|------------------------|---------------------------|
| $|000\rangle$ | $|000\rangle$ |
| $|010\rangle$ | $|011\rangle$ |
| $|100\rangle$ | $|101\rangle$ |
| $|110\rangle$ | $|110\rangle$ |
| $|001\rangle$ | $|001\rangle$ |
| $|011\rangle$ | $|010\rangle$ |
| $|101\rangle$ | $|100\rangle$ |
| $|111\rangle$ | $|111\rangle$ |

The matrix corresponding to $U_F$ is:

| $U_F$ | $|000\rangle$ | $|001\rangle$ | $|010\rangle$ | $|011\rangle$ | $|100\rangle$ | $|101\rangle$ | $|110\rangle$ | $|111\rangle$ |
|---|---|---|---|---|---|---|---|---|
| $|000\rangle$ | 1 | 0 | 0 | 0 | 0 | 0 | 0 | 0 |
| $|001\rangle$ | 0 | 1 | 0 | 0 | 0 | 0 | 0 | 0 |
| $|010\rangle$ | 0 | 0 | 0 | 1 | 0 | 0 | 0 | 0 |
| $|011\rangle$ | 0 | 0 | 1 | 0 | 0 | 0 | 0 | 0 |
| $|100\rangle$ | 0 | 0 | 0 | 0 | 0 | 1 | 0 | 0 |
| $|101\rangle$ | 0 | 0 | 0 | 0 | 1 | 0 | 0 | 0 |
| $|110\rangle$ | 0 | 0 | 0 | 0 | 0 | 0 | 1 | 0 |
| $|111\rangle$ | 0 | 0 | 0 | 0 | 0 | 0 | 0 | 1 |

This matrix cannot be written as the tensor product of smaller matrices. In fact, if written write it as a block matrix, it becomes:

| $U_F$ | $|00\rangle$ | $|01\rangle$ | $|10\rangle$ | $|11\rangle$ |
|---|---|---|---|---|
| $|00\rangle$ | I | 0 | 0 | 0 |
| $|01\rangle$ | 0 | C | 0 | 0 |
| $|10\rangle$ | 0 | 0 | C | 0 |
| $|11\rangle$ | 0 | 0 | 0 | I |

This means that the matrix operator acting on the third vector in the input tensor product depends on the values of the first two vectors. If these vectors are $|0\rangle$ and $|0\rangle$, for instance, the operator acting on the third vector is the identity matrix, if the first two vectors are $|0\rangle$ and $|1\rangle$ then the evolution of the third is determined by matrix C. So, this operator creates entanglement, namely correlation among the vectors in the tensor product.

C. Consider now a general function with n=2. In this general case, the $f$ map table is the following:

| x | f(x) |
|---|---|
| 00 | $f_{00}$ |
| 01 | $f_{01}$ |
| 10 | $f_{10}$ |
| 11 | $f_{11}$ | with $f_i \in \{0,1\}$, i=00,01,10,11. If $f$ is constant, then $\exists y \in \{0,1\} \forall x \in \{0,1\}^2 : f(x) = y$. If $f$ is balanced then $|\{f_i : f_i = 0\}| = |\{f_i : f_i = 1\}|$ The injective function F (where $f$ is encoded) is represented by the following map table:

| $|x_0 x_1 y_0\rangle$ | $U_F|x_0 x_1 y_0\rangle$ |
|---|---|
| 000 | 0 0 $f_{00}$ |
| 010 | 0 1 $f_{01}$ |
| 100 | 1 0 $f_{10}$ |
| 110 | 1 1 $f_{11}$ |
| 001 | 0 0 ¬$f_{00}$ |
| 011 | 0 1 ¬$f_{01}$ |
| 101 | 1 0 ¬$f_{10}$ |
| 111 | 1 1 ¬$f_{11}$ |

Now encode F into the $U_F$ map table:

| $|x_0 x_1 y_0\rangle$ | $U_F|x_0 x_1 y_0\rangle$ |
|---|---|
| $|000\rangle$ | $|0\ 0\ f_{00}\rangle$ |
| $|010\rangle$ | $|0\ 1\ f_{01}\rangle$ |
| $|100\rangle$ | $|1\ 0\ f_{10}\rangle$ |
| $|110\rangle$ | $|1\ 1\ f_{11}\rangle$ |
| $|001\rangle$ | $|0\ 0\ \neg f_{00}\rangle$ |
| $|011\rangle$ | $|0\ 1\ \neg f_{01}\rangle$ |
| $|101\rangle$ | $|1\ 0\ \neg f_{10}\rangle$ |
| $|111\rangle$ | $|1\ 1\ \neg f_{11}\rangle$ |

The matrix corresponding to $U_F$ can be written as a block matrix with the following general form:

| $U_F$ | $|00\rangle$ | $|01\rangle$ | $|10\rangle$ | $|11\rangle$ |
|---|---|---|---|---|
| $|00\rangle$ | $M_{00}$ | 0 | 0 | 0 |
| $|01\rangle$ | 0 | $M_{01}$ | 0 | 0 |
| $|10\rangle$ | 0 | 0 | $M_{10}$ | 0 |
| $|11\rangle$ | 0 | 0 | 0 | $M_{11}$ | where $M_i = I$ if $f_i = 0$ and $M_i = C$ if $f_i = 1$, i=00,01,10,11. The structure of this matrix is such that, when the first two vectors are mapped into some other vectors, the null operator is applied to the third vector, generating a null probability amplitude for this transition. This means that the first two vectors are always left unchanged. On the contrary, operators $M_i \in \{I, C\}$ and they are applied to the third vector when the first two are mapped into themselves. If all $M_i$ coincide, operator $U_F$ encodes a constant function. Otherwise it encodes a non-constant function. If $|\{M_i : M_i = I\}| = |\{M_i : M_i = C\}|$ then $f$ is balanced.

D. For the general case n>0, the input function $f$ map table is the following:

| $x \in \{0,1\}^n$ | f(x) |
|---|---|
| 0 . . 0 | $f_{0...0}$ |
| 0 . . 1 | $f_{0...1}$ |
| . . . | . . . |
| 1 . . 1 | $f_{1...1}$ | with $f_i \in \{0,1\}$, $i \in \{0,1\}^n$. If $f$ is constant then $\exists y \in \{0,1\} \forall x \in \{0,1\}^n : f(x) = y$. If $f$ is balanced then $|\{f_i : f_i = 0\}| = |\{f_i : f_i = 1\}|$. The map table of the corresponding injective function F is:

| $x \in \{0,1\}^{n+1}$ | F(x) |
|---|---|
| 0 . . 00 | 0 . . 0$f_{0...0}$ |
| . . . | . . . |
| 1 . . 10 | 1 . . 1$f_{0...1}$ |
| 0 . . 01 | 0 . . 0¬$f_{0...0}$ |
| . . . | . . . |
| 1 . . 11 | 1 . . 1¬$f_{1...1}$ |

Now encode F into $U_F$ the map table:

| $|x\rangle$ | $U_F|x\rangle$ |
|---|---|
| $|0..00\rangle$ | $|0..0f_{0...0}\rangle$ |
| . . . | . . . |
| $|1..10\rangle$ | $|1..1f_{0...1}\rangle$ |
| $|0..01\rangle$ | $|0..0\neg f_{0...0}\rangle$ |
| . . . | . . . |
| $|1..11\rangle$ | $|1..1\neg f_{1...1}\rangle$ |

The matrix corresponding to $U_F$ can be written as a block matrix with the following general form:

| $U_F$ | $\|0..0\rangle$ | $\|0..1\rangle$ | $\|1..0\rangle$ | $\|1..1\rangle$ |
|---|---|---|---|---|
| $\|0..0\rangle$ | $M_{0..0}$ | 0 | 0 | 0 |
| $\|0..1\rangle$ | 0 | $M_{0..1}$ | 0 | 0 |
| ... | ... | ... | ... | ... |
| $\|1..1\rangle$ | 0 | 0 | 0 | $M_{1..1}$ | where $M_i = I$ if $f_i = 0$ and $M_i = C$ if $f_i = 1$, $i \in \{0,1\}^n$.

This matrix leaves the first n vectors unchanged and applies operator $M_i \in \{I, C\}$ to the last vector. If all $M_i$ coincide with I or C, the matrix encodes a constant function and it can be written as ${}^n I \otimes I$ or ${}^n I \otimes C$. In this case no entanglement is generated. Otherwise, if the condition $|\{M_i: M_i = I\}| = |\{M_i: M_i = C\}|$ is fulfilled, then $f$ is balanced and the operator creates correlation among vectors.

The matrix $U_F$, the output of the encoder, is now embedded into the quantum gate of the DJ algorithm. This gate is described using a quantum circuit shown in FIG. 13. Using the identity rule of FIG. 12C, the previous circuit compiles into the circuit shown in FIG. 14.

Figure 12A:
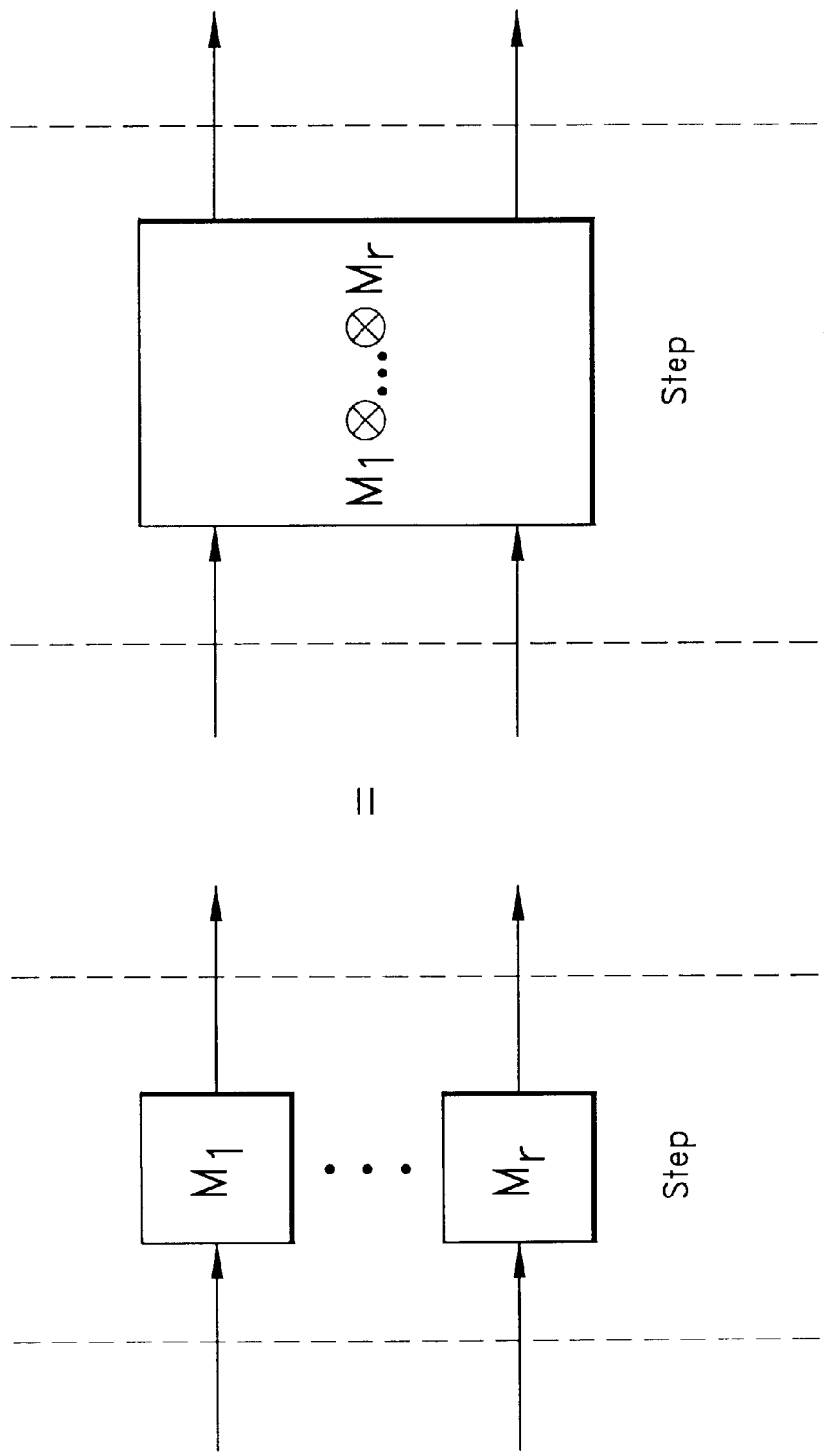
FIG. 12A illustrates a quantum circuit for a tensor product transformation.
Figure 12B:
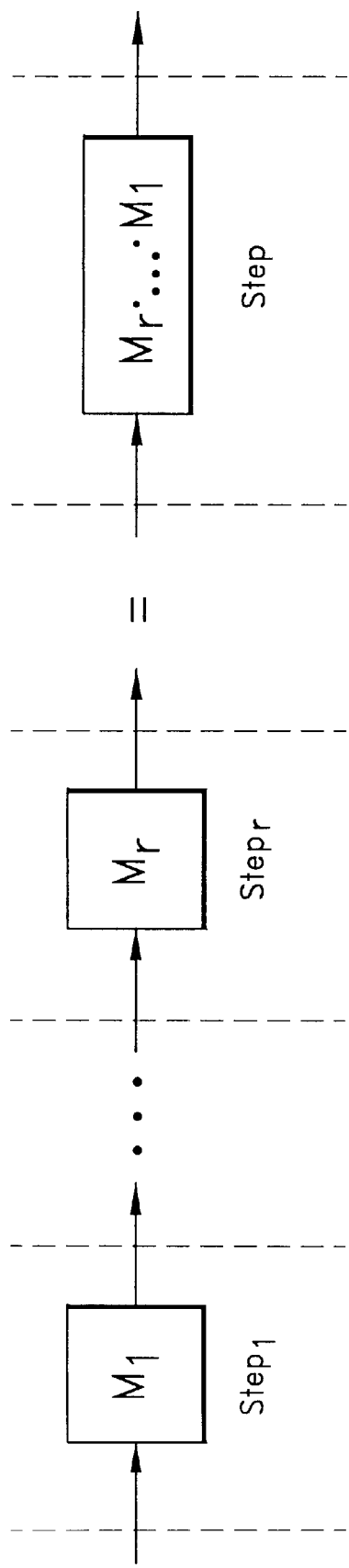
FIG. 12B illustrates a quantum circuit for a dot product transformation.
Figure 15:
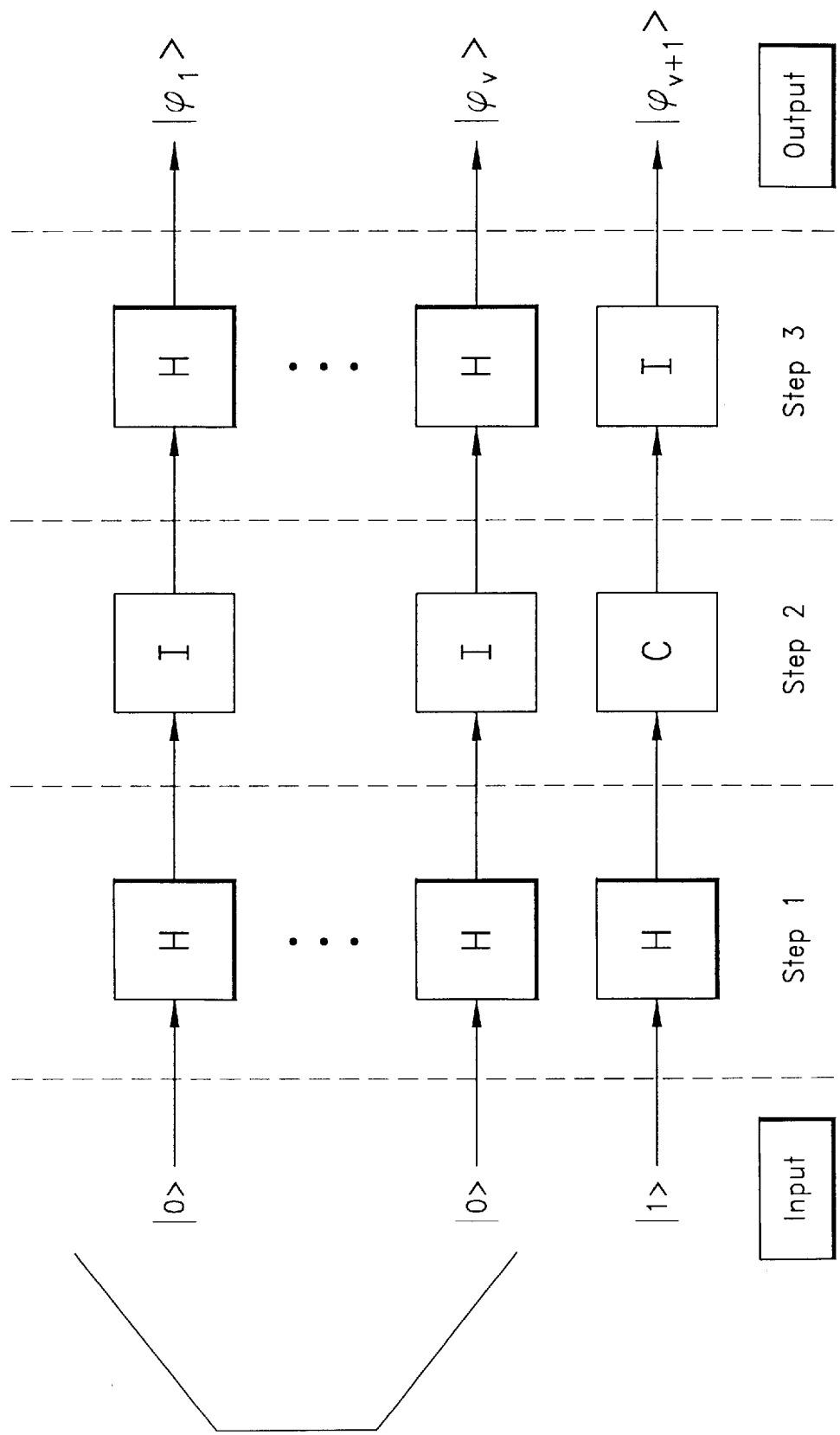
FIG. 15 illustrates a circuit for the Constant Function with Value 1—first circuit.
Figure 16:
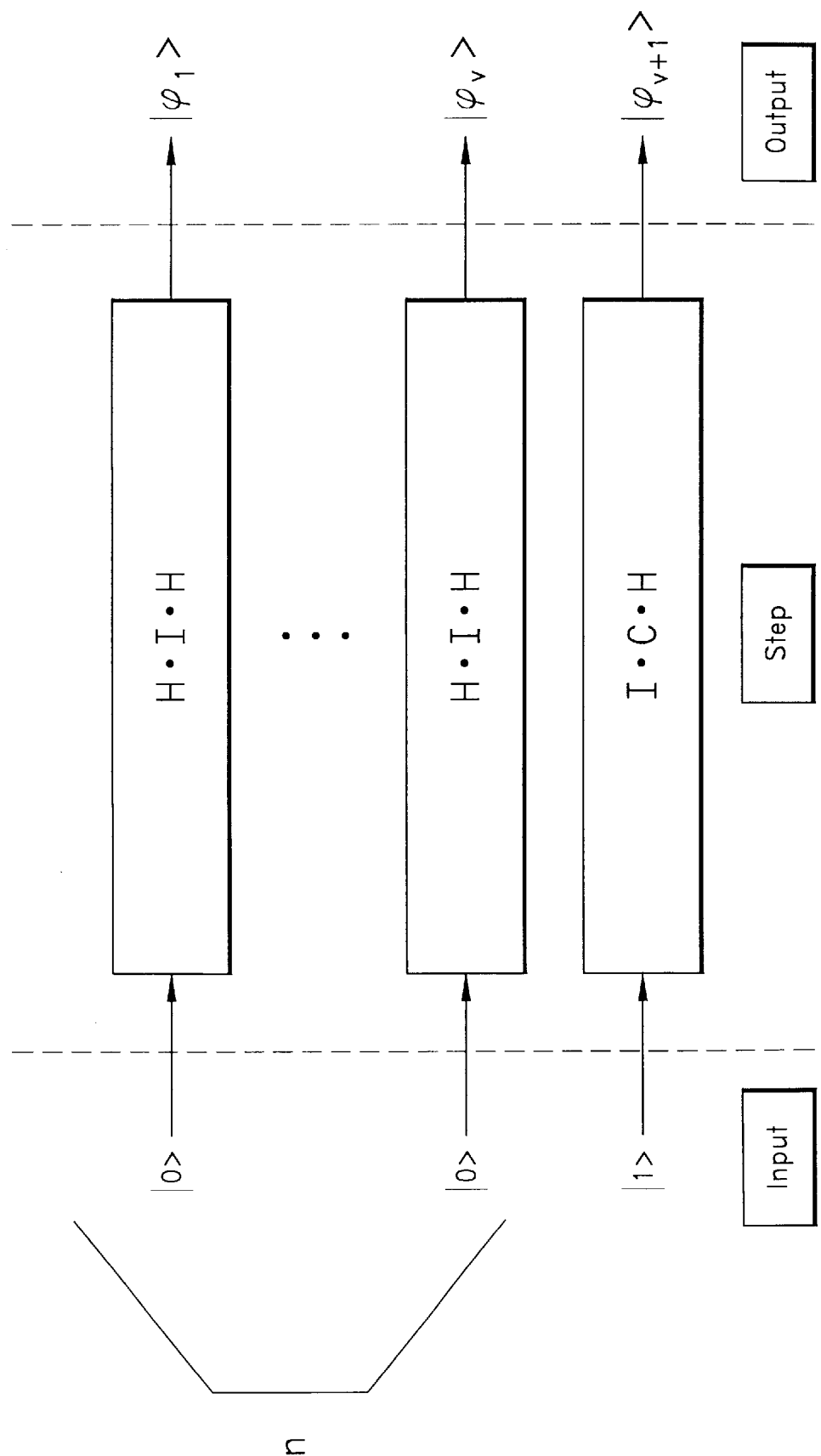
FIG. 16 illustrates a circuit for the Constant Function with Value 1—second circuit.
Figure 17:
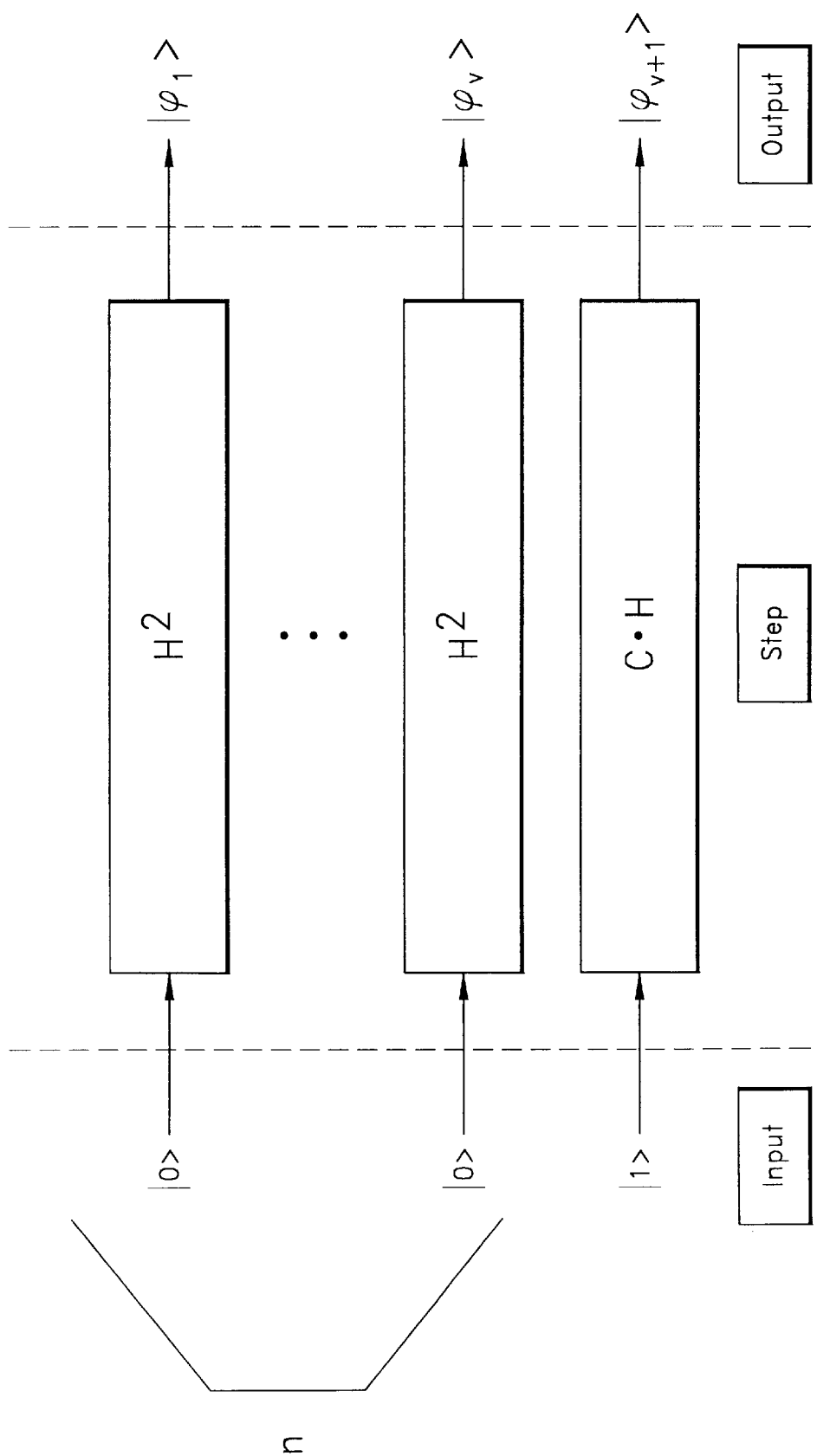
FIG. 17 illustrates a circuit for the Constant Function with Value 1—third circuit.
Figure 18:
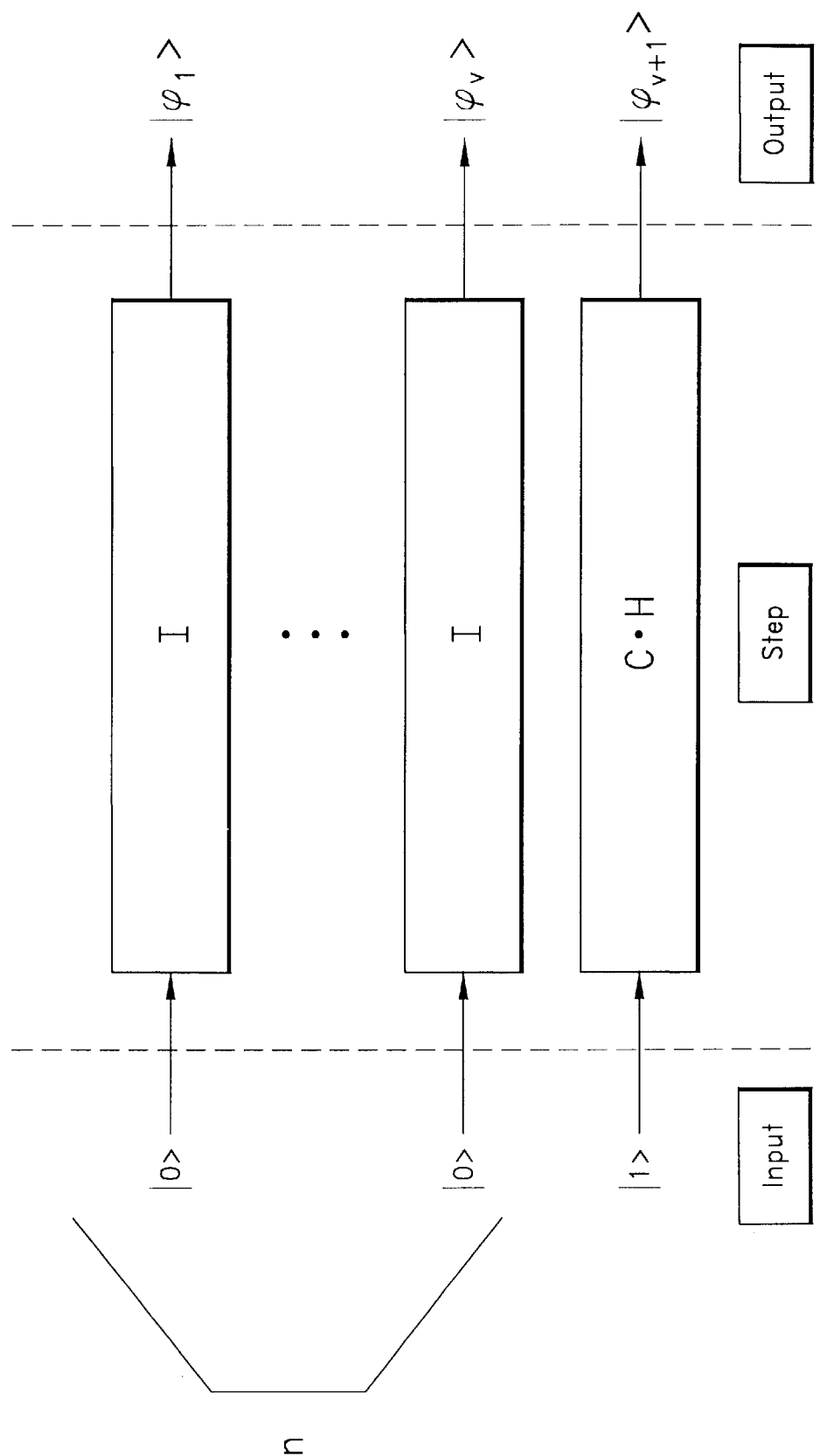
FIG. 18 illustrates a circuit for the Constant Function with Value 1—fourth circuit.

If $f$ is constant and its value is 1, the matrix operator $U_F$ can be written as ${}^n I \otimes C$. This means (as shown in FIG. 12A) that $U_F$ can be decomposed into n+1 smaller operators acting concurrently on the n+1 vectors of dimension 2 in the input tensor product. The resulting circuit representation is shown FIG. 15. Using FIG. 12B the sub-gate acting on every vector of dimension 2 in input, as shown in FIG. 16. Every vector in input evolves independently from other vectors. This is because the operator $U_F$ does not create any correlation. So, the evolution of every input vector can be analysed separately. This circuit can be written in a simpler way, observing that M·I=M as illustrated in FIG. 17. It can be shown that $H^2 = I$, thus, the circuit can be redrawn as shown in FIG. 18.

Consider now the effect of the operators acting on every vector:

$$I|0\rangle = |0\rangle \quad C \cdot H|1\rangle = -\frac{|0\rangle - |1\rangle}{\sqrt{2}}$$

Figure 12C:
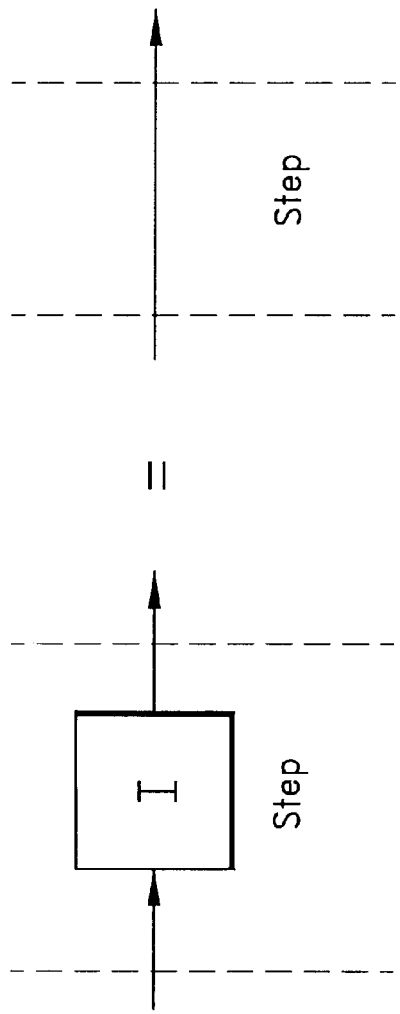
FIG. 12C illustrates a quantum circuit for an identity transformation.
Figure 12D:
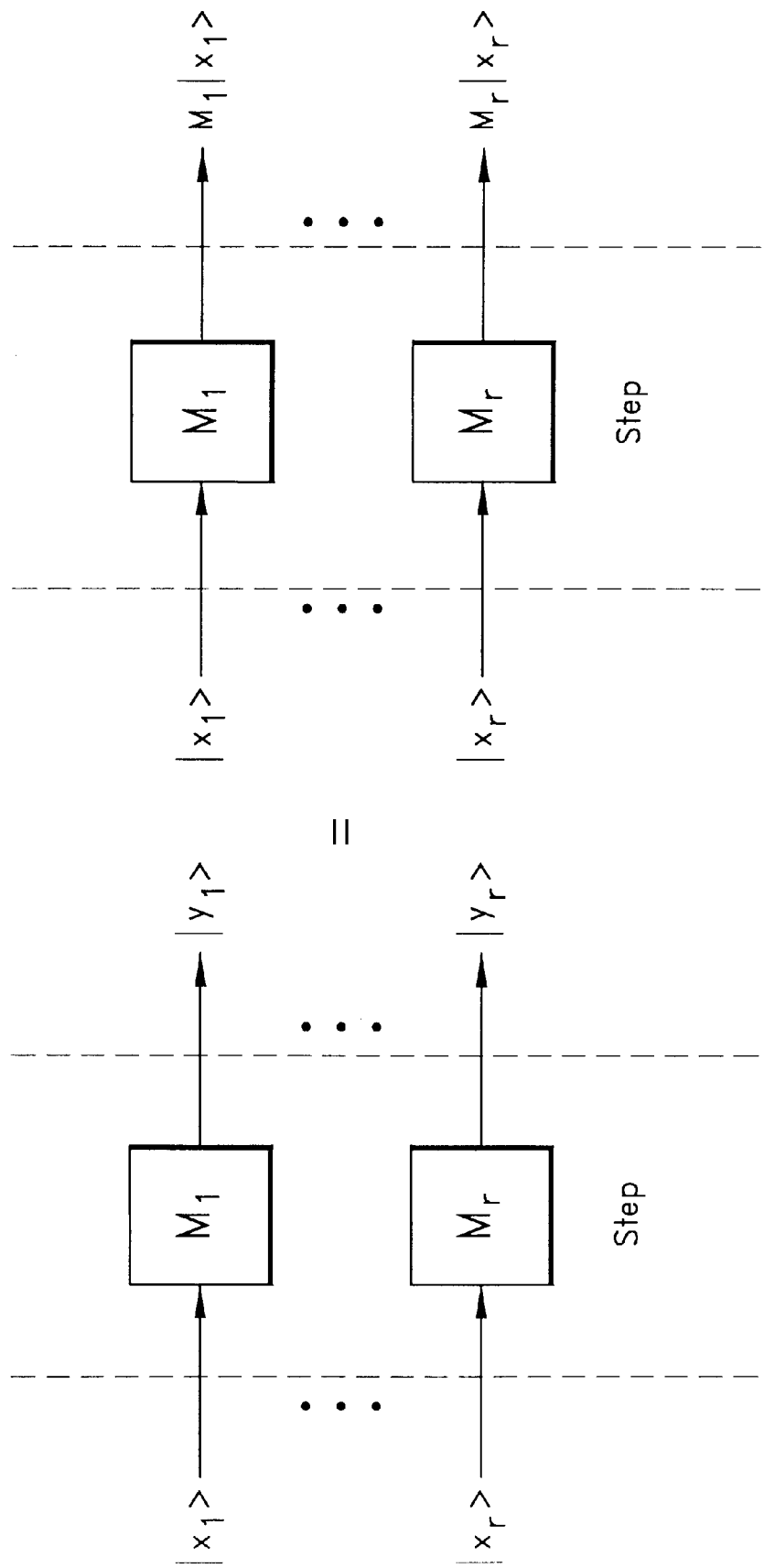
FIG. 12D illustrates a quantum circuit for propagation.
Figure 12E:
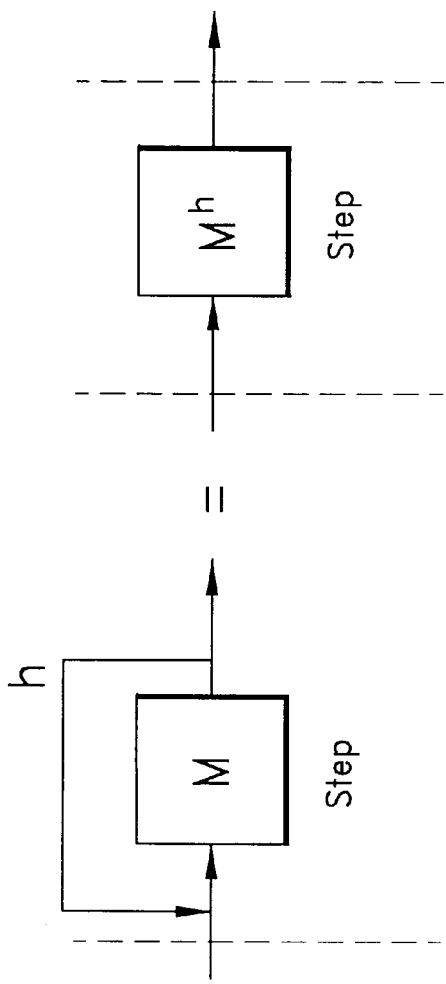
FIG. 12E illustrates a quantum circuit for iteration.
Figure 12F:
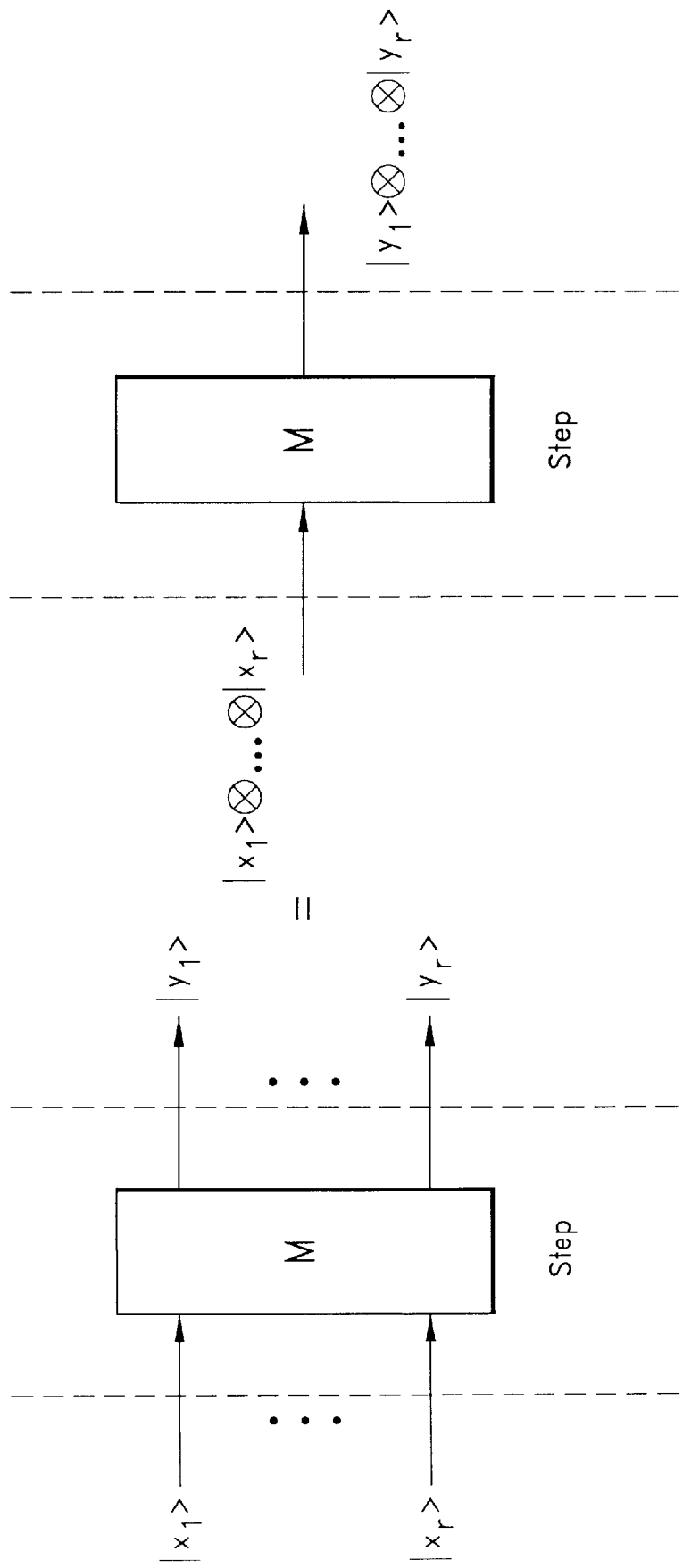
FIG. 12F illustrates a quantum circuit for input/output.
Figure 13:
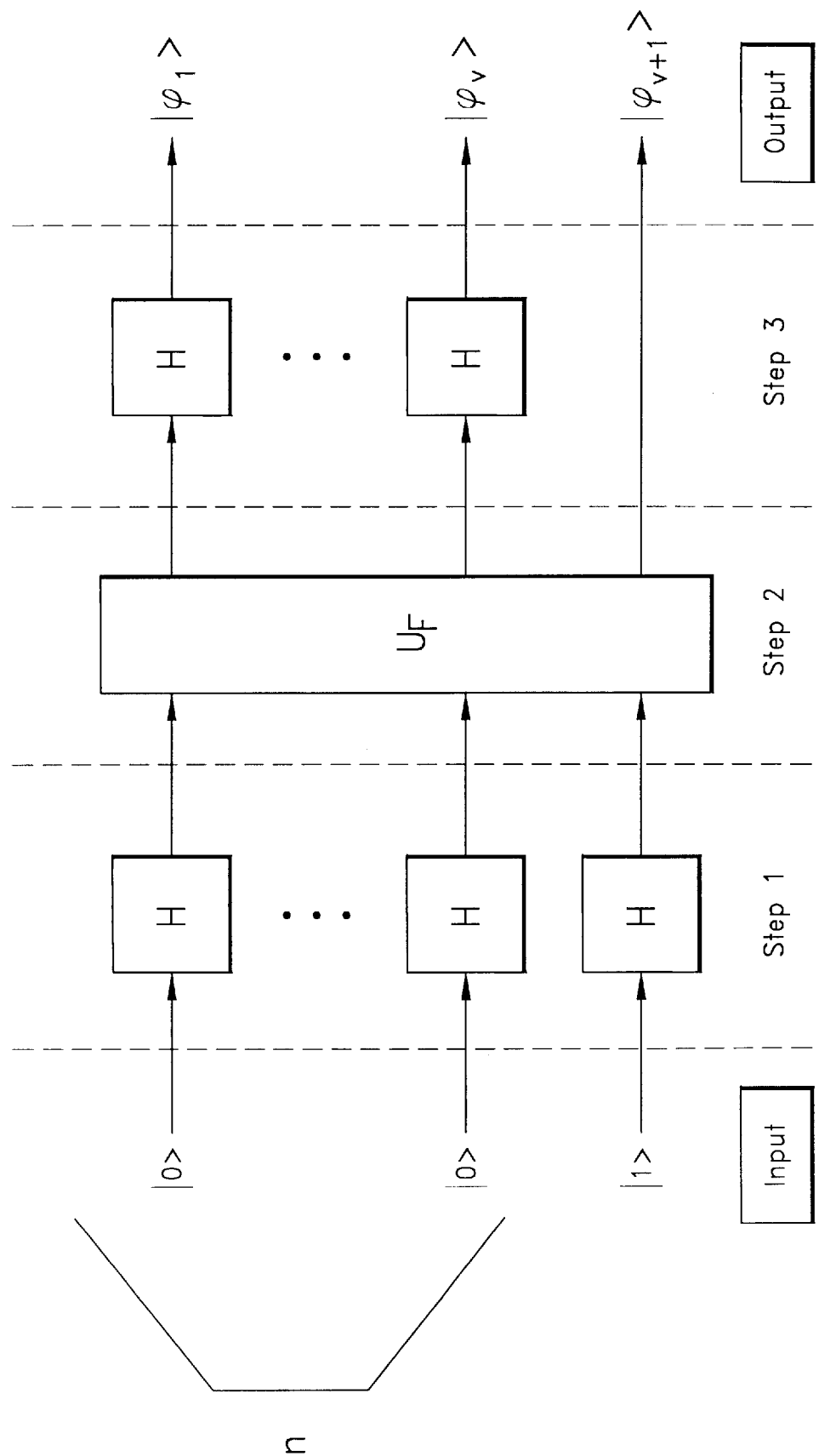
FIG. 13 illustrates a first representation of a quantum circuit for the Deutsch-Jozsa's Quantum Gate.
Figure 19:
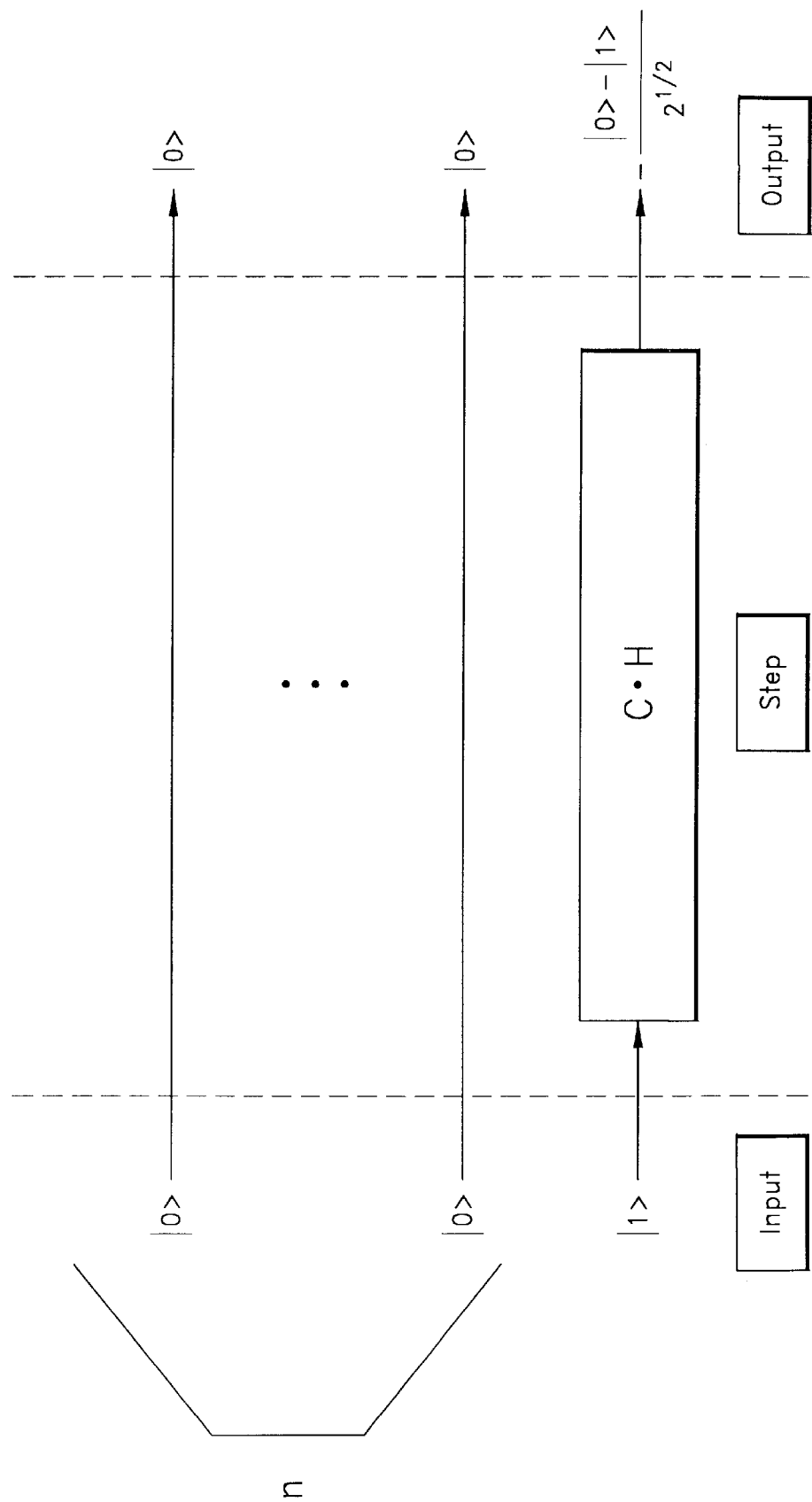
FIG. 19 illustrates a circuif for the Constant Function with Value 1—fifth circuit.

Using these results in connection with the operations shown in FIGS. 12D and 12C, gives the circuit representation shown in FIG. 19. Thus, if $f$ is constant with value 1, the first n vectors are preserved.

Figure 20:
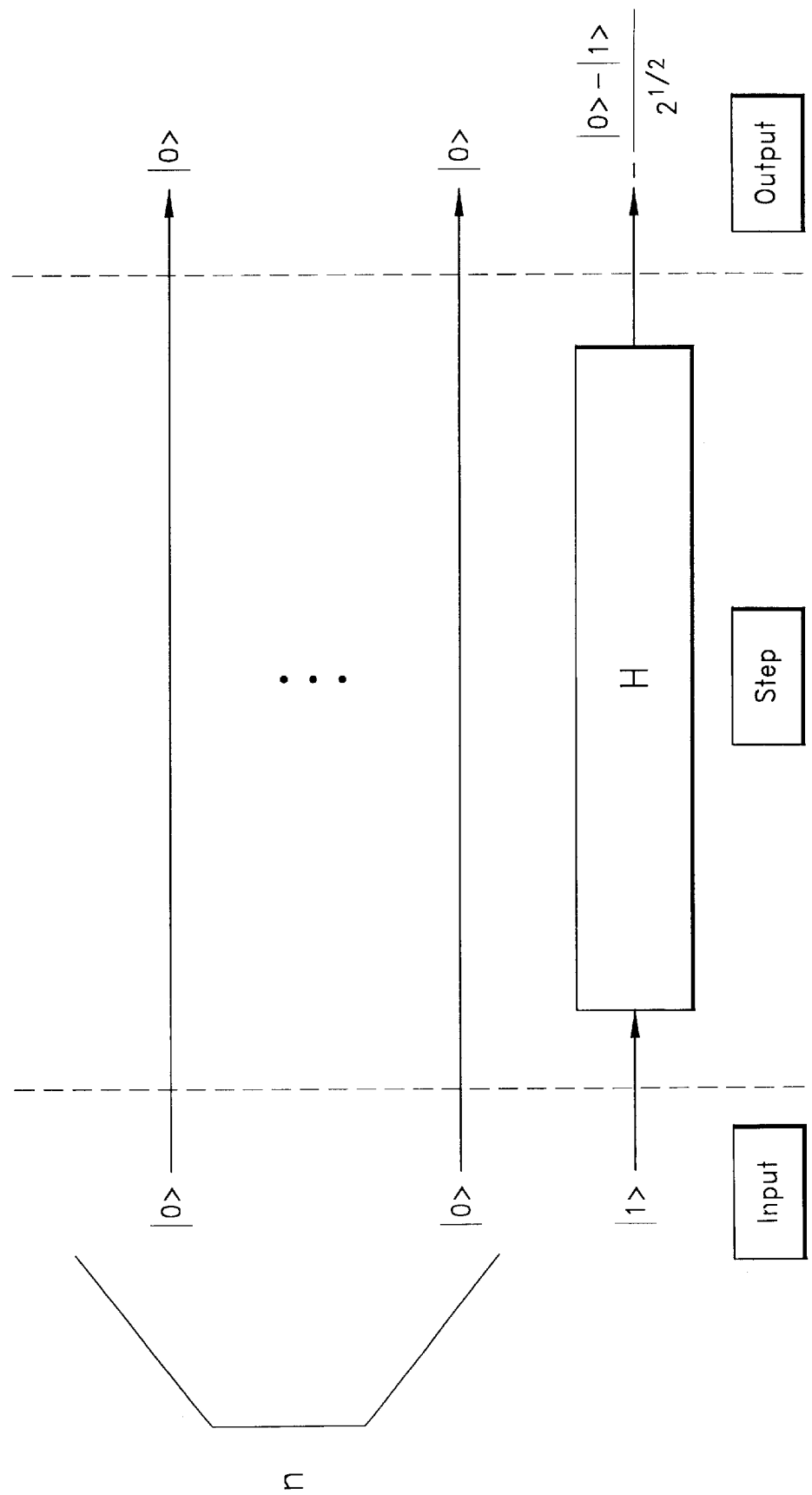
FIG. 20 illustrates a constant Function with value 0.

A similar analysis can be repeated for a constant function with value 0. In this situation $U_F$ can be written as ${}^n I \otimes I$ and the final circuit is shown in FIG. 20. In this case too, the first n input vectors are preserved. So, their output values after the quantum gate has acted are still $|0\rangle$.

Figure 14:
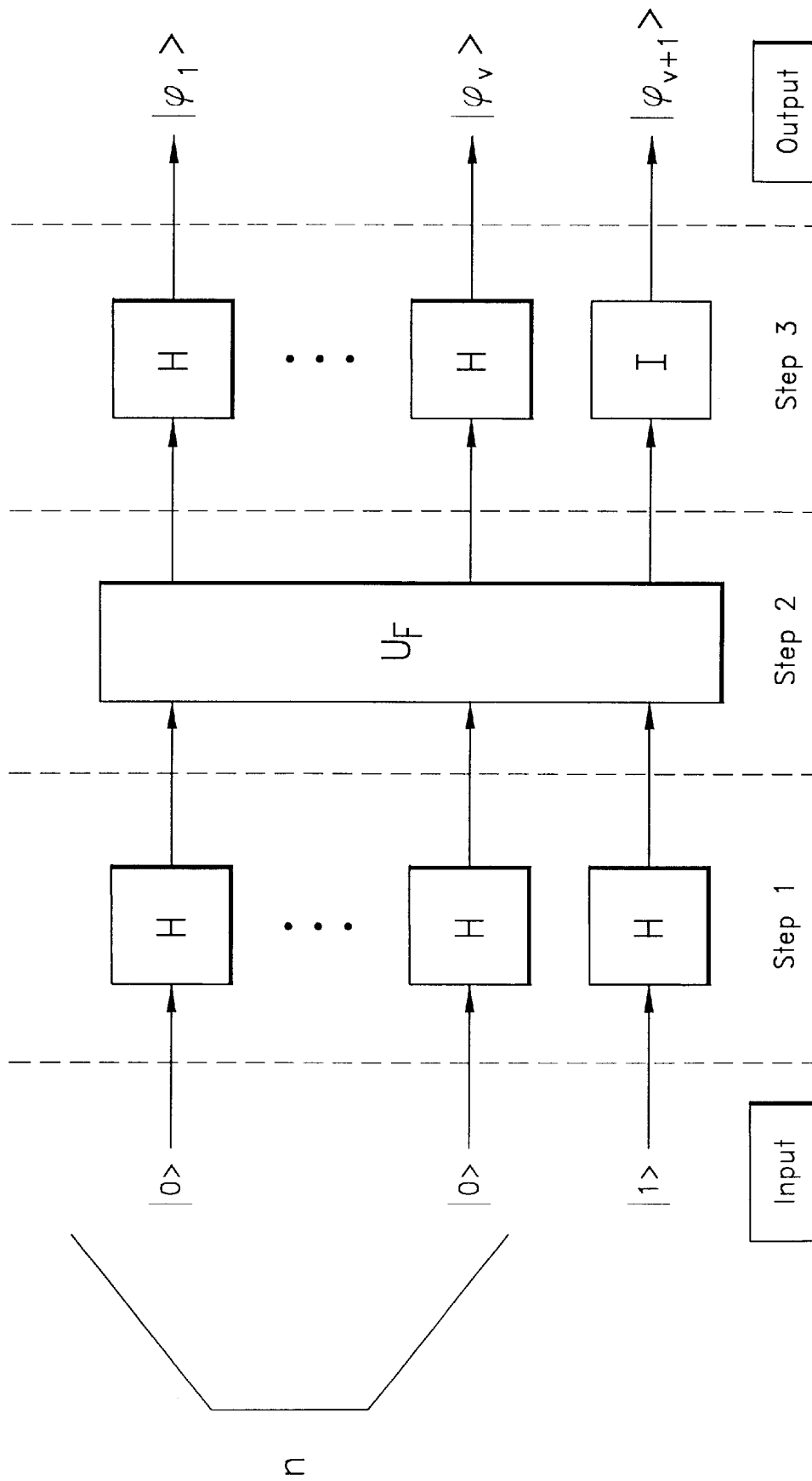
FIG. 14 illustrates a second representation of a quantum circuit for the Deutsch-Jozsa's Quantum Gate.
Figure 21:
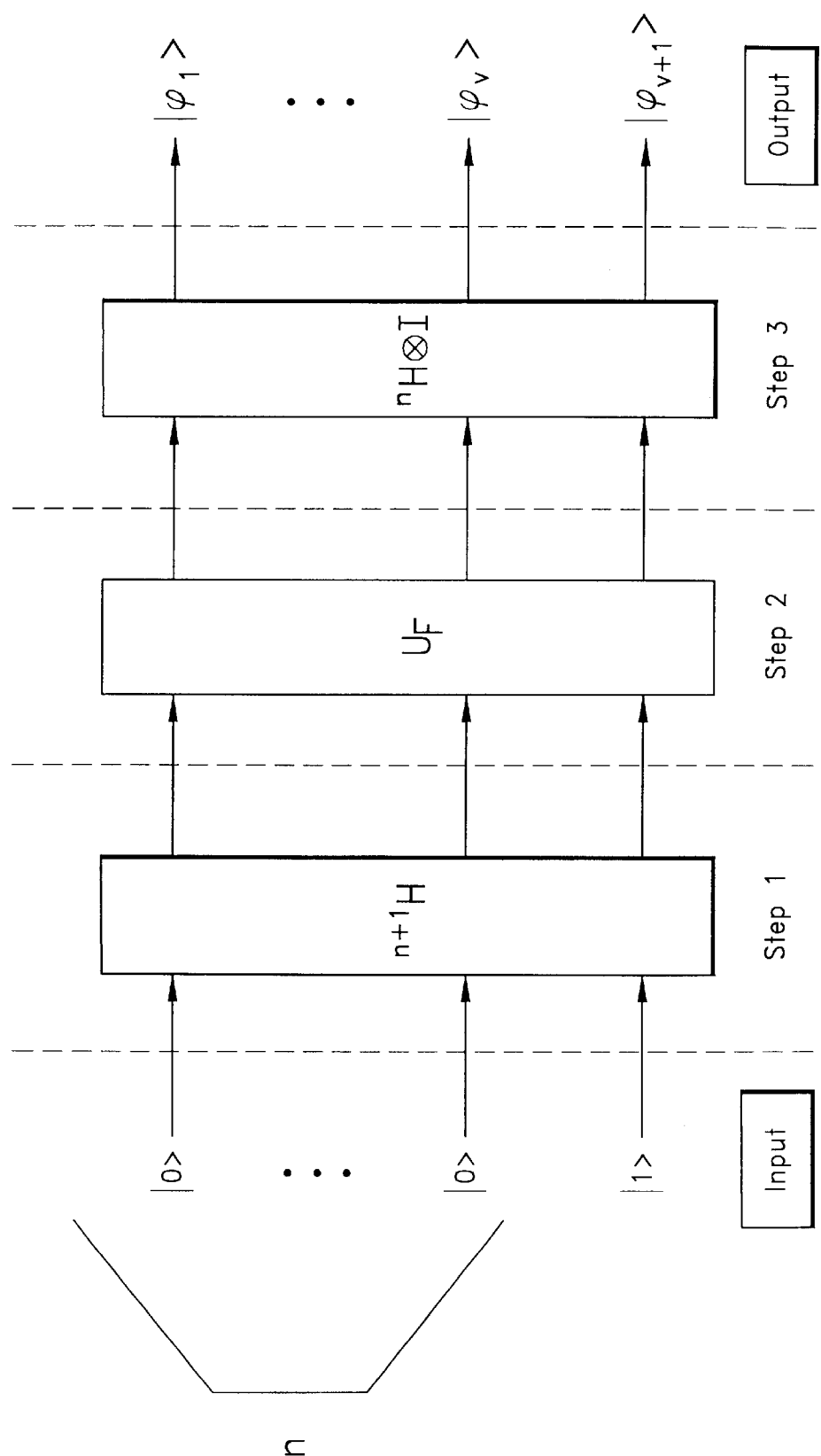
FIG. 21 illustrates the evolution of the DJ quantum gate.
Figure 22:
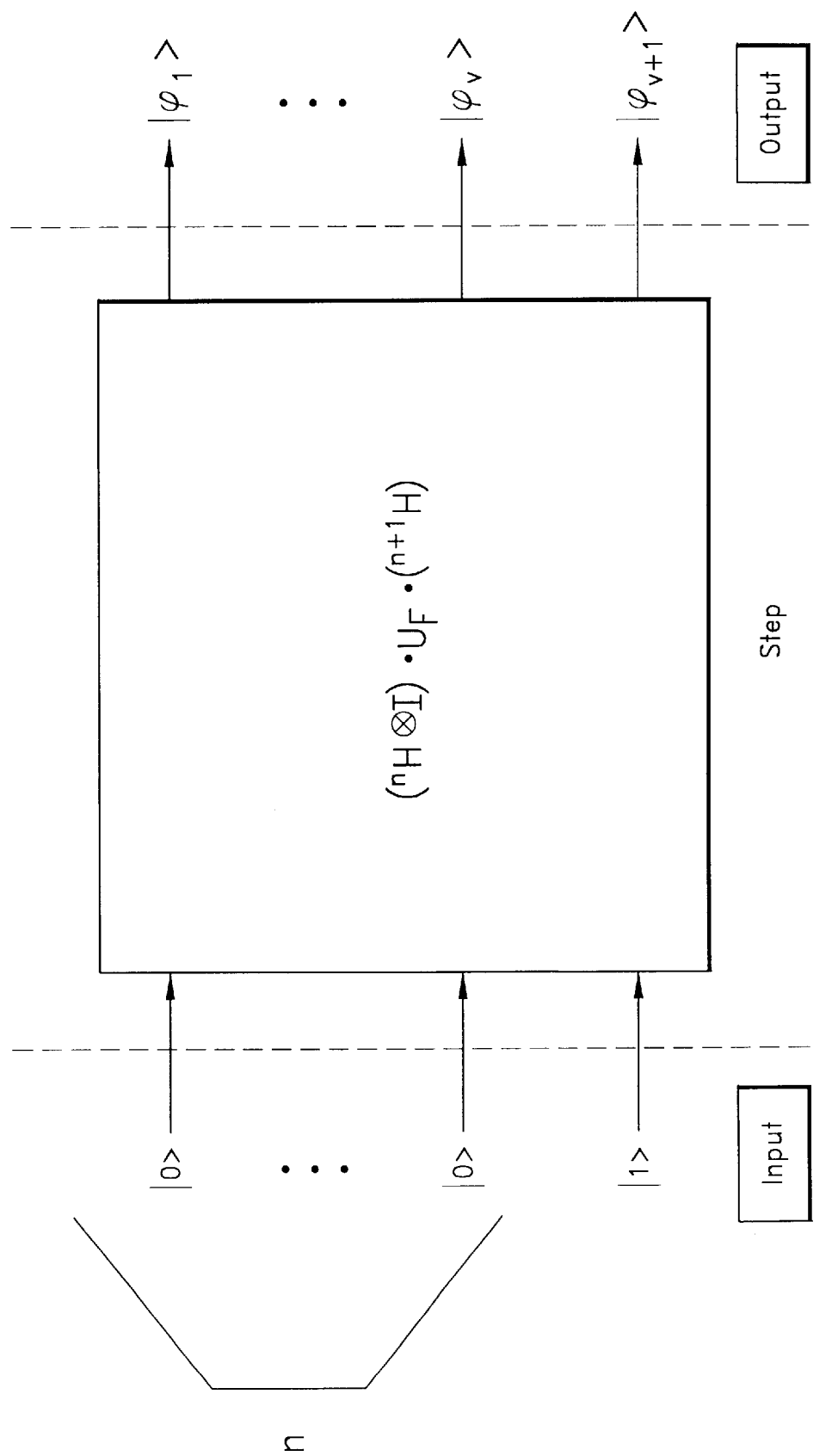
FIG. 22 illustrates the final DJ quantum gate.

The gate implementing the DJ algorithm in the general case is obtained operating on the circuit of FIG. 14 to yield the circuit shown in FIG. 21, which is then evolved to the final circuit shown in FIG. 22.

If n=2, $U_F$ has the following form:

| $U_F$ | $\|00\rangle$ | $\|01\rangle$ | $\|10\rangle$ | $\|11\rangle$ |
|---|---|---|---|---|
| $\|00\rangle$ | $M_{00}$ | 0 | 0 | 0 |
| $\|01\rangle$ | 0 | $M_{01}$ | 0 | 0 |
| $\|10\rangle$ | 0 | 0 | $M_{10}$ | 0 |
| $\|11\rangle$ | 0 | 0 | 0 | $M_{11}$ | where $M_i \in \{I, C\}$, i=00,01,10,11.

Given the quantum gate $G = ({}^2H \otimes I) \cdot U_F \cdot ({}^{2+1}H)$, then:

| ${}^3H$ | $\|00\rangle$ | $\|01\rangle$ | $\|10\rangle$ | $\|11\rangle$ |
|---|---|---|---|---|
| $\|00\rangle$ | $H/2$ | $H/2$ | $H/2$ | $H/2$ |
| $\|01\rangle$ | $H/2$ | $-H/2$ | $H/2$ | $-H/2$ |
| $\|10\rangle$ | $H/2$ | $H/2$ | $-H/2$ | $-H/2$ |
| $\|11\rangle$ | $H/2$ | $-H/2$ | $-H/2$ | $H/2$ |

| ${}^2H \otimes I$ | $\|00\rangle$ | $\|01\rangle$ | $\|10\rangle$ | $\|11\rangle$ |
|---|---|---|---|---|
| $\|00\rangle$ | $1/2$ | $1/2$ | $1/2$ | $1/2$ |
| $\|01\rangle$ | $1/2$ | $-1/2$ | $1/2$ | $-1/2$ |
| $\|10\rangle$ | $1/2$ | $1/2$ | $-1/2$ | $-1/2$ |
| $\|11\rangle$ | $1/2$ | $-1/2$ | $-1/2$ | $1/2$ |

| $U_F \cdot {}^3H$ | $\|00\rangle$ | $\|01\rangle$ | $\|10\rangle$ | $\|11\rangle$ |
|---|---|---|---|---|
| $\|00\rangle$ | $M_{00}H/2$ | $M_{00}H/2$ | $M_{00}H/2$ | $M_{00}H/2$ |
| $\|01\rangle$ | $M_{01}H/2$ | $-M_{01}H/2$ | $M_{01}H/2$ | $-M_{01}H/2$ |
| $\|10\rangle$ | $M_{10}H/2$ | $M_{10}H/2$ | $-M_{10}H/2$ | $-M_{10}H/2$ |
| $\|11\rangle$ | $M_{11}H/2$ | $-M_{11}H/2$ | $-M_{11}H/2$ | $M_{11}H/2$ |

| G | $\|00>$ | $\|01>$ | $\|10>$ | $\|11>$ |
|---|---|---|---|---|
| $\|00>$ | $(M_{00}+M_{01}+M_{10}+M_{11})H/4$ | $(M_{00}-M_{01}+M_{10}-M_{11})H/4$ | $(M_{00}+M_{01}-M_{10}-M_{11})H/4$ | $(M_{00}-M_{01}-M_{10}+M_{11})H/4$ |
| $\|01>$ | $(M_{00}-M_{01}+M_{10}-M_{11})H/4$ | $(M_{00}+M_{01}+M_{10}+M_{11})H/4$ | $(M_{00}-M_{01}-M_{10}+M_{11})H/4$ | $(M_{00}+M_{01}-M_{10}-M_{11})H/4$ |
| $\|10>$ | $(M_{00}+M_{01}-M_{10}-M_{11})H/4$ | $(M_{00}-M_{01}-M_{10}+M_{11})H/4$ | $(M_{00}+M_{01}+M_{10}+M_{11})H/4$ | $(M_{00}-M_{01}+M_{10}-M_{11})H/4$ |
| $\|11>$ | $(M_{00}-M_{01}-M_{10}+M_{11})H/4$ | $(M_{00}+M_{01}-M_{10}-M_{11})H/4$ | $(M_{00}-M_{01}+M_{10}-M_{11})H/4$ | $(M_{00}+M_{01}+M_{10}+M_{11})H/4$ |

In the general case n>0, $U_F$ has the following form:

| $U_F$ | $\|0..0>$ | $\|0..1>$ | ... | $\|1..1>$ |
|---|---|---|---|---|
| $\|0..0>$ | $M_{0,0}$ | 0 | 0 | 0 |
| $\|0..1>$ | 0 | $M_{0,1}$ | 0 | 0 |
| ... | ... | ... | ... | ... |
| $\|1..1>$ | 0 | 0 | 0 | $M_{1,1}$ | where $M_i \epsilon \{I, C\}$, $i \epsilon \{0,1\}^n$. Given the quantum gate $G = (^nH \otimes I) \cdot U_F \cdot (^{n+1}H)$, then:

| $^{n+1}H$ | $\|0...0>$ | ... | $\|j>$ | ... | $\|1...1>$ |
|---|---|---|---|---|---|
| $\|0...0>$ | $H/2^{n/2}$ | ... | $H/2^{n/2}$ | ... | $H/2^{n/2}$ |
| ... | ... | ... | ... | ... | ... |
| $\|i>$ | $H/2^{n/2}$ | ... | $(-1)^{i \cdot j} H/2^{n/2}$ | ... | $(-1)^{i \cdot (1...1)} H/2^{n/2}$ |
| ... | ... | ... | ... | ... | ... |
| $\|11>$ | $H/2^{n/2}$ | | $(-1)^{(1...1) \cdot j} H/2^{n/2}$ | | $(-1)^{(1...1) \cdot (1...1)} H/2^{n/2}$ |

The above uses the binary string operator "·", which represents the parity of the AND bit per bit between two strings. Given two binary strings x and y of length n, define:

$$x \cdot y = x_1 \cdot y_1 \oplus x_2 \cdot y_2 \oplus \ldots \oplus x_n \cdot y_n$$

where the symbol · used between two bits is interpreted as the logical AND operator.

To prove that the matrix $^{n+1}H$ really has the described form, it is useful to show that:

$$[^nH]_{ij} = \frac{(-1)^{i \cdot j}}{2^{n/2}}$$

The proof is by induction:

For $n=1$: $[^1H]_{0,0} = \frac{1}{2^{1/2}} = \frac{(-1)^{(0) \cdot (0)}}{2^{1/2}}$ $[^1H]_{0,1} = \frac{1}{2^{1/2}} = \frac{(-1)^{(0) \cdot (1)}}{2^{1/2}}$ $[^1H]_{1,0} = \frac{1}{2^{1/2}} = \frac{(-1)^{(1) \cdot (0)}}{2^{1/2}}$ $[^1H]_{1,1} = \frac{-1}{2^{1/2}} = \frac{(-1)^{(1) \cdot (1)}}{2^{1/2}}$ For $n>1$: $[^nH]_{i0,j0} = \frac{1}{2^{1/2}} [^{n-1}H]_{i,j} = \frac{1}{2^{1/2}} \frac{(-1)^{i \cdot j}}{2^{(n-1)/2}} = \frac{(-1)^{(i0) \cdot (j0)}}{2^{n/2}}$ $[^nH]_{i0,j1} = \frac{1}{2^{1/2}} [^{n-1}H]_{i,j} = \frac{1}{2^{1/2}} \frac{(-1)^{i \cdot j}}{2^{(n-1)/2}} = \frac{(-1)^{(i0) \cdot (j1)}}{2^{n/2}}$ $[^nH]_{i1,j0} = \frac{1}{2^{1/2}} [^{n-1}H]_{i,j} = \frac{1}{2^{1/2}} \frac{(-1)^{i \cdot j}}{2^{(n-1)/2}} = \frac{(-1)^{(i1) \cdot (j0)}}{2^{n/2}}$ $[^nH]_{i1,j1} = -\frac{1}{2^{1/2}} [^{n-1}H]_{i,j} = -\frac{1}{2^{1/2}} \frac{(-1)^{i \cdot j}}{2^{(n-1)/2}} = \frac{(-1)^{(i1) \cdot (j1)}}{2^{n/2}}$ The matrix $^{n+1}H$ is obtained from $^nH$ by tensor product. Similarly, matrix $^nH \otimes I$ is calculated:

| $^nH \otimes I$ | $\|0...0>$ | ... | $\|j>$ | ... | $\|1...1>$ |
|---|---|---|---|---|---|
| $\|0...0>$ | $I/2^{n/2}$ | ... | $I/2^{n/2}$ | ... | $I/2^{n/2}$ |
| ... | ... | ... | ... | ... | ... |
| $\|i>$ | $I/2^{n/2}$ | ... | $(-1)^{i \cdot j} I/2^{n/2}$ | ... | $(-1)^{i \cdot (1...1)} I/2^{n/2}$ |
| ... | ... | ... | ... | ... | ... |
| $\|11>$ | $I/2^{n/2}$ | ... | $(-1)^{(1...1) \cdot j} I/2^{n/2}$ | ... | $(-1)^{(1...1) \cdot (1...1)} I/2^{n/2}$ |

| $U_F \cdot {}^{n+1}H$ | $\|0...0>$ | ... | $\|j>$ | ... | $\|1...1>$ |
|---|---|---|---|---|---|
| $\|0...0>$ | $M_{0...0}H/2^{n/2}$ | ... | $M_{0...0}H/2^{n/2}$ | ... | $M_{0...0}H/2^{n/2}$ |
| ... | ... | ... | ... | ... | ... |
| $\|i>$ | $M_iH/2^{n/2}$ | ... | $(-1)^{i \cdot j} M_iH/2^{n/2}$ | ... | $(-1)^{i \cdot (1...1)} M_iH/2^{n/2}$ |
| ... | ... | ... | ... | ... | ... |
| $\|1...1>$ | $M_{1...1}H/2^{n/2}$ | ... | $(-1)^{(1...1) \cdot j} M_{1...1}H/2^{n/2}$ | ... | $(-1)^{(1...1) \cdot (1...1)} M_{1...1}H/2^{n/2}$ |

This is calculated only the first column of gate G since this operator is applied exclusively to input vector $|0\ldots01\rangle$ and so only the first column is involved.

| G | $|0\ldots0\rangle$ | ... |
|---|---|---|
| $|0\ldots0\rangle$ | $(M_{0\ldots0}+\ldots+M_i+\ldots+M_{1\ldots1})H/2^n$ | ... |
| ... | ... | ... |
| $|i\rangle$ | $\left(\sum_{j\in\{0,1\}} n(-1)^{i\cdot j}M_j\right)H/2^n$ | ... |
| ... | ... | ... |
| $|1\ldots1\rangle$ | $\left(\sum_{j\in\{0,1\}} n(-1)^{(1\ldots1)\cdot j}M_j\right)H/2^n$ | ... |

In the case of $f$ constant, this means that all matrices $M_j$ are identical. This implies:

$$\frac{1}{2^n}\left(\sum_j (-1)^{i\cdot j}M_j\right)H = 0$$

since in this summation the number of +1 equals the number of −1. Therefore, the input vector $|0\ldots01\rangle$ is mapped into a superposition of vectors $|0\ldots00\rangle$ and $|0\ldots01\rangle$. If $f$ is balanced, the number of $M_j=I$ equals the number of $M_j=C$. This implies:

$$\frac{1}{2^n}\left(\sum_j M_j\right)H = \frac{1}{2^n}(2^{n-1}I + 2^{n-1}C)H$$

$$= \frac{1}{2}\begin{bmatrix}1 & 1\\ 1 & 1\end{bmatrix}H = \frac{1}{2\sqrt{2}}\begin{bmatrix}1 & 1\\ 1 & 1\end{bmatrix}\begin{bmatrix}1 & 1\\ 1 & -1\end{bmatrix}$$

$$= \frac{1}{\sqrt{2}}\begin{bmatrix}1 & 0\\ 1 & 0\end{bmatrix}$$

And therefore:

$$\frac{1}{2^n}\left(\sum_j M_j\right)H\,|1\rangle = 0$$

This means that input vector $|0\ldots01\rangle$, in the case of balanced functions, can't be mapped by the quantum gate into a superposition containing vectors $|0\ldots00\rangle$ or $|0\ldots01\rangle$.

The quantum block terminates with measurement. It is possible to determine the possible outputs of measurement and their probabilities:

The set A–B is given by all elements of A, unless those elements belonging to B too. This set is sometimes denoted as A/B. The quantum block is repeated only one time in Deutsch-Jozsa's algorithm. So, the final collection is made only by one vector.

As in Deutsch's algorithm, when the final basis vector has been measured, it is desirable to interpret it in order to decide if $f$ is constant or balanced. If the resulting vector is $|0\ldots00\rangle$ the function is constant, otherwise it is balanced. In fact, the gate G produces a vector such that, when it is measured, only basis vectors $|0\ldots00\rangle$ and $|0\ldots01\rangle$ have a non-null probability amplitude exclusively in the case $f$ is constant. Besides, if $f$ is balanced, these two vectors have null coefficients in the linear combination of basis vectors generated by G. In this way, the resulting vector is decoded in order to answer Deutsch-Jozsa's problem:

| Resulting Vector after Measurement | Answer |
|---|---|
| $|0\ldots00\rangle$ | f is constant |
| $|0\ldots01\rangle$ | f is constant |
| otherwise | f is balanced |

Grover's algorithm, is described here, is a variation on the Deutsch-Jozsa's algorithm. Grover's algorithm is stated as follows:

| Input | given a function f: $\{0,1\}^n \rightarrow \{0,1\}$ such that $\exists x\in\{0,1\}^n$: $(f(x)=1 \land \forall y\in\{0,1\}^n; x\neq y \Rightarrow f(y)=0)$ |
|---|---|
| Problem | Find x |

In the Deutsch-Jozsa algorithm describes two classes of input functions and the problem is to decide what class the input function belonged to. In Grover's algorithm the problem is similar in form, even if it is harder because now one is dealing with $2^n$ classes of input functions (each function of the kind described is considered as a class). In order to make the discussion more straightforward, the treatment that follows first considers a special function with n=2. Then the general case with n=2 is described, and finally the general case with n>0 is described.

First consider the case where:

n=2 $f(01)=1$

In this case the $f$ map table is defined as:

| x | f(x) |
|---|---|
| 00 | 0 |
| 01 | 1 |

| Superposition of Basis Vectors Before Measurement | Result of Measurement | |
|---|---|---|
| | Vector | Probability |
| Constant functions: | | |
| $G|0\ldots01\rangle=|0\ldots0\rangle\otimes(a_0|0\rangle+a_1|1\rangle)$ | $|0\ldots00\rangle$ | $\|a_0\|^2$ |
| | $|0\ldots01\rangle$ | $\|a_1\|^2$ |
| Balanced functions: | | |
| $G|0\ldots01\rangle=\Sigma_{i\in\{0,1\}^n-\{0\ldots00,0\ldots01\}}a_i|i\rangle$ | $\forall i\in\{0,1\}^n-\{0\ldots00,0\ldots01\}:|i\rangle$ | $\|a_i\|^2$ |

-continued

| x | f(x) |
|---|------|
| 10 | 0 |
| 11 | 0 |

The function $f$ is encoded into injective function F, built as described in connection with FIG. 8:

$$F:\{0,1\}^{n+1} \to \{0,1\}^{n+1}: F(x_0,x_1,y_0)=(x_0,x_1,f(x_0,x_1) \oplus y_0)$$

Then F map table is:

| $(x_0, x_1, y_0)$ | $F(x_0, x_1, y_0)$ |
|---|---|
| 000 | 000 |
| 010 | 011 |
| 100 | 100 |
| 110 | 110 |
| 001 | 001 |
| 011 | 010 |
| 101 | 101 |
| 111 | 111 |

Now encode F into the map table of $U_F$:

$$\forall s \in \{0,1\}^{n+1} U_F[\tau(s)] = \tau[F(s)]$$

where $\tau$ is the code map described in connection with FIG. 8.

| $|x_0 \, x_1 \, y_0 \rangle$ | $U_F |x_0 \, x_1 \, y_0 \rangle$ |
|---|---|
| $|000\rangle$ | $|000\rangle$ |
| $|010\rangle$ | $|011\rangle$ |
| $|100\rangle$ | $|100\rangle$ |
| $|110\rangle$ | $|110\rangle$ |
| $|001\rangle$ | $|001\rangle$ |
| $|011\rangle$ | $|011\rangle$ |
| $|101\rangle$ | $|101\rangle$ |
| $|111\rangle$ | $|111\rangle$ |

From the map table of $U_F$ calculate the corresponding matrix operator. This matrix is obtained using the rule:

$$[U_F]_{ij}=1 \Leftrightarrow U_F|j\rangle=|i\rangle$$

to give:

| $U_F$ | $|00\rangle$ | $|01\rangle$ | $|10\rangle$ | $|11\rangle$ |
|---|---|---|---|---|
| $|00\rangle$ | I | 0 | 0 | 0 |
| $|01\rangle$ | 0 | C | 0 | 0 |
| $|10\rangle$ | 0 | 0 | I | 0 |
| $|11\rangle$ | 0 | 0 | 0 | I |

The effect of this matrix is to leave unchanged the first and the second input basis vectors of the input tensor product, flipping the third one when the first vector is $|0\rangle$ and the second is $|1\rangle$. This agrees with the constraints on $U_F$ stated above.

Now take into consideration the more general case:

$$n=2 \quad f(\underline{x})=1$$

The corresponding matrix operator is:

| $U_F$ | $|00\rangle$ | $|01\rangle$ | $|10\rangle$ | $|11\rangle$ |
|---|---|---|---|---|
| $|00\rangle$ | $M_{00}$ | 0 | 0 | 0 |
| $|01\rangle$ | 0 | $M_{01}$ | 0 | 0 |
| $|10\rangle$ | 0 | 0 | $M_{10}$ | 0 |
| $|11\rangle$ | 0 | 0 | 0 | $M_{11}$ | with $M_{\underline{x}}=C \wedge \forall i \neq \underline{x}: M_i=I$.

It is straightforward to generalize operator $U_F$ from the case n=2 to the case n>1. The operator C on the main diagonal of the block matrix, is based on correspondence of the cell labeled by vector $|x\rangle$, where x is the binary string having image one by $f$. Therefore:

| $U_F$ | $|00\rangle$ | $|01\rangle$ | ... | $|11\rangle$ |
|---|---|---|---|---|
| $|00\rangle$ | $M_{00}$ | 0 | ... | 0 |
| $|01\rangle$ | 0 | $M_{01}$ | ... | 0 |
| ... | ... | ... | ... | ... |
| $|11\rangle$ | 0 | 0 | ... | $M_{11}$ | with $M_{\underline{x}}=C \wedge \forall i \neq \underline{x}: M_i=I$.

The matrix $U_F$, the output of the encoder, is embedded into the quantum gate. This gate is illustrated by the quantum circuit shown in FIG. 23. The operator $D_n$ is called a diffusion matrix of order n and it is responsible for interference in this algorithm. It plays the same role as $QFT_n$ in Shor's algorithm and of $^nH$ in Deutsch-Jozsa's and Simon's algorithms. This matrix is defined as:

| $D_n$ | $|0...0\rangle$ | $|0...1\rangle$ | ... | $|i\rangle$ | ... | $|1...0\rangle$ | $|1...1\rangle$ |
|---|---|---|---|---|---|---|---|
| $|0...0\rangle$ | $-1+1/2^{n-1}$ | $1/2^{n-1}$ | ... | $1/2^{n-1}$ | ... | $1/2^{n-1}$ | $1/2^{n-1}$ |
| $|0...1\rangle$ | $1/2^{n-1}$ | $-1+1/2^{n-1}$ | ... | $1/2^{n-1}$ | ... | $1/2^{n-1}$ | $1/2^{n-1}$ |
| ... | ... | ... | ... | ... | ... | ... | ... |
| $|i\rangle$ | $1/2^{n-1}$ | $1/2^{n-1}$ | ... | $-1+1/2^{n-1}$ | ... | $1/2^{n-1}$ | $1/2^{n-1}$ |
| ... | ... | ... | ... | ... | ... | ... | ... |
| $|1...0\rangle$ | $1/2^{n-1}$ | $1/2^{n-1}$ | ... | $1/2^{n-1}$ | ... | $-1+1/2^{n-1}$ | $1/2^{n-1}$ |
| $|1...1\rangle$ | $1/2^{n-1}$ | $1/2^{n-1}$ | ... | $1/2^{n-1}$ | ... | $1/2^{n-1}$ | $-1+1/2^{n-1}$ |

Figure 23:
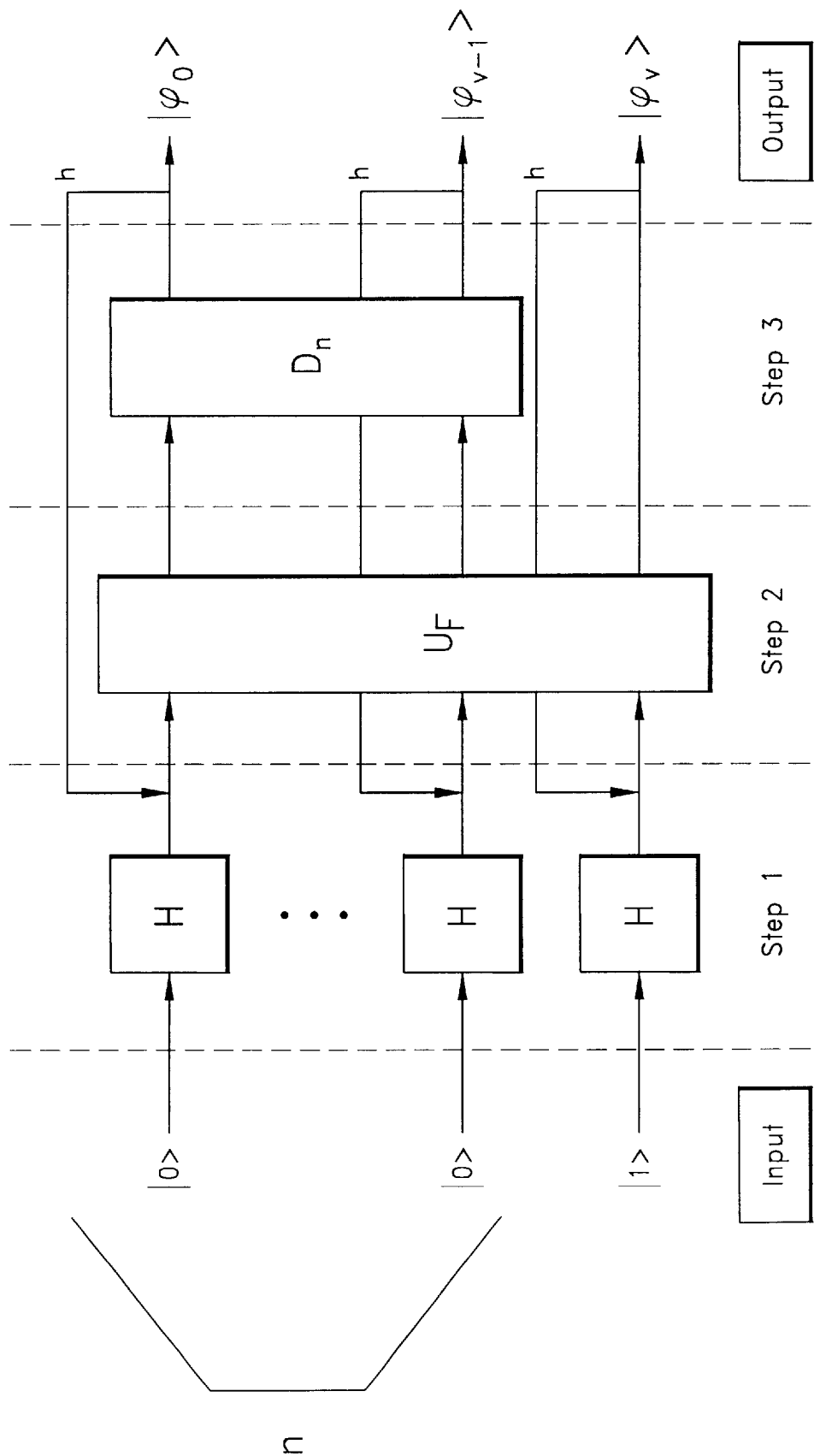
FIG. 23 illustrates the quantum circuit of Grover's Quantum Gate.
Figure 24:
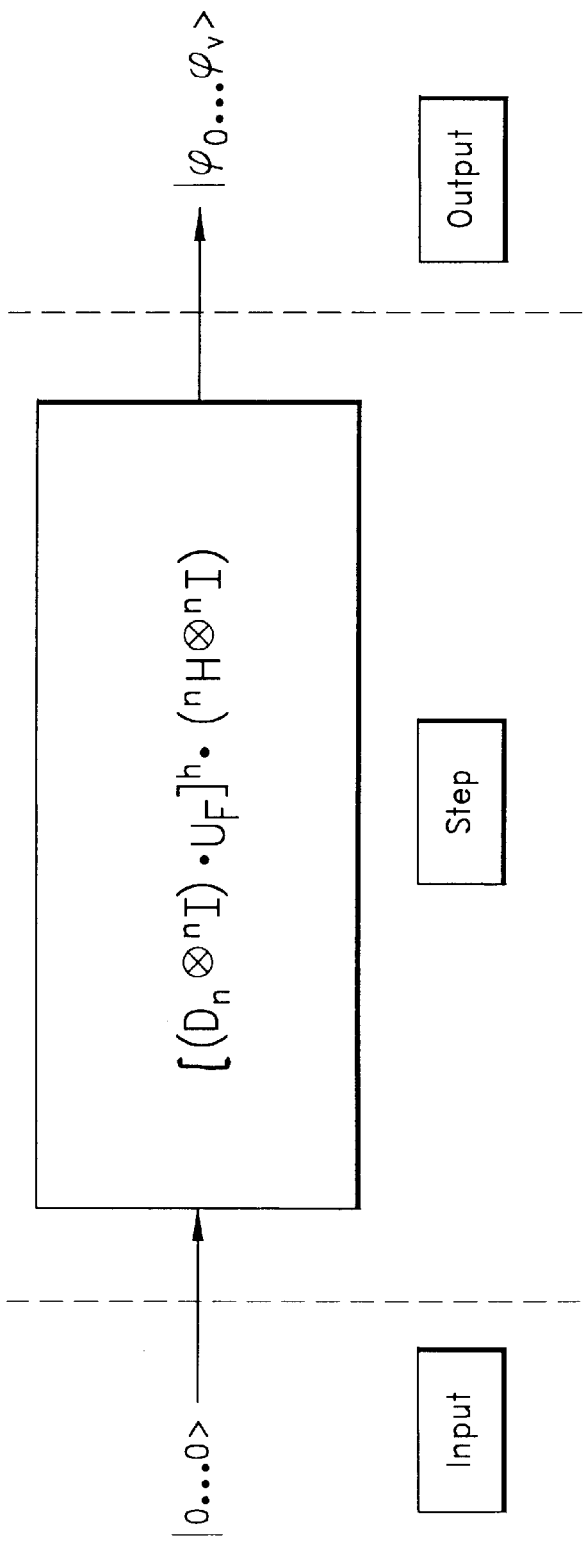
FIG. 24 illustrates the final circuit for Grover's Quantum Gate.

Using the transformation shown in FIG. 12C, the circuit of FIG. 23 is compiled into the circuit of FIG. 24.

For example, consider the case where $U_F$ has the following form:

| $U_F$ | $\|00>$ | $\|01>$ | $\|10>$ | $\|11>$ |
|---|---|---|---|---|
| $\|00>$ | I | 0 | 0 | 0 |
| $\|01>$ | 0 | C | 0 | 0 |
| $\|10>$ | 0 | 0 | I | 0 |
| $\|11>$ | 0 | 0 | 0 | I |

Then calculate the quantum gate $G=[(D_2 \otimes I) \cdot U_F]^h \cdot (^{2+1}H)$, which in this case becomes:

|  | $\|00>$ | $\|01>$ | $\|10>$ | $\|11>$ |
|---|---|---|---|---|
| $^3H$ |  |  |  |  |
| $\|00>$ | H/2 | H/2 | H/2 | H/2 |
| $\|01>$ | H/2 | −H/2 | H/2 | −H/2 |
| $\|10>$ | H/2 | H/2 | −H/2 | −H/2 |
| $\|11>$ | H/2 | −H/2 | −H/2 | H/2 |
| $D_2 \otimes I$ |  |  |  |  |
| $\|00>$ | −I/2 | I/2 | I/2 | I/2 |
| $\|01>$ | I/2 | −I/2 | I/2 | (a)/2 |
| $\|10>$ | I/2 | I/2 | −I/2 | (b)/2 |
| $\|11>$ | I/2 | I/2 | I/2 | −I/2 |
| $U_F \cdot {^3H}$ |  |  |  |  |
| $\|00>$ | H/2 | H/2 | H/2 | H/2 |
| $\|01>$ | CH/2 | −CH/2 | CH/2 | −CH/2 |
| $\|10>$ | H/2 | H/2 | −H/2 | −H/2 |
| $\|11>$ | H/2 | −H/2 | −H/2 | H/2 |

Choosing h=1, yields:

| G | $\|00>$ | $\|01>$ | $\|10>$ | $\|11>$ |
|---|---|---|---|---|
| $\|00>$ | (C+I)H/4 | (−C−I)H/4 | (C−3I)H/4 | (−C−I)H/4 |
| $\|01>$ | (−C+3I)H/4 | (C+I)H/4 | (−C−I)H/4 | (C+I)H/4 |
| $\|10>$ | (C+I)H/4 | (−C−I)H/4 | (C+I)H/4 | (−C+3I)H/4 |
| $\|11>$ | (C+I)H/4 | (−C+3I)H/4 | (C+I)H/4 | (−C−I)H/4 |

In one example, the operator $^3H$ puts an initial canonical basis vector $\|001>$ into a superposition of all basis vectors with the same (real) coefficients in modulus, but with positive sign if the last vector is $\|0>$, negative otherwise. The operator $U_F$ creates correlation: it flips the third vector if the first two vector are $\|0>$ and $\|1>$. Finally, $D_2 \otimes I$ produces interference: for every basis vector $\|x_0 x_1 y_0>$ it calculates its output probability amplitude $\alpha'_{x_0 x_1 y_0}$ by inverting its initial probability amplitude $\alpha_{x_0 x_1 y_0}$ and summing the double of the mean $\underline{a} y_0$ of the probability amplitude of all vectors in the form $\|x_0 x_1 y_0>$. In our example $\underline{\alpha}_0 = 1/(4 \cdot 2^{1/2})$, $\underline{\alpha}_1 = -1/(4 \cdot 2^{1/2})$. Take, for instance, basis vector $\|000>$. Then $\alpha'_{000} = -\alpha_{000} + 2\underline{\alpha}_0 = -1/(2 \cdot 2^{1/2}) + 2/(4 \cdot 2^{1/2}) = 0$.

In general, if n=2, $U_F$ has the following form:

| $U_F$ | $\|00>$ | $\|01>$ | $\|10>$ | $\|11>$ |
|---|---|---|---|---|
| $\|00>$ | $M_{00}$ | 0 | 0 | 0 |
| $\|01>$ | 0 | $M_{01}$ | 0 | 0 |
| $\|10>$ | 0 | 0 | $M_{10}$ | 0 |
| $\|11>$ | 0 | 0 | 0 | $M_{11}$ | where $M_{\underline{x}} = C \wedge \forall i \neq \underline{x}: M_i = I (\underline{x}, i \in \{0,1\}^n)$.

The quantum gate $G = (D_2 \otimes I) \cdot U_F \cdot (^{2+1}H)$ in this general case is:

| $U_F \cdot {^3H}$ | $\|00>$ | $\|01>$ | $\|10>$ | $\|11>$ |
|---|---|---|---|---|
| $\|00>$ | $M_{00}H/2$ | $M_{00}H/2$ | $M_{00}H/2$ | $M_{00}H/2$ |
| $\|01>$ | $M_{01}H/2$ | $-M_{01}H/2$ | $M_{01}H/2$ | $-M_{01}H/2$ |
| $\|10>$ | $M_{10}H/2$ | $M_{10}H/2$ | $-M_{10}H/2$ | $-M_{10}H/2$ |
| $\|11>$ | $M_{11}H/2$ | $-M_{11}H/2$ | $-M_{11}H/2$ | $M_{11}H/2$ |

| G | $\|00>$ | $\|01>$ | $\|10>$ | $\|11>$ |
|---|---|---|---|---|
| $\|00>$ | $(-M_{00}+M_{01}+M_{10}+M_{11})H/4$ | $(-M_{00}-M_{01}+M_{10}-M_{11})H/4$ | $(-M_{00}+M_{01}-M_{10}-M_{11})H/4$ | $(-M_{00}-M_{01}-M_{10}+M_{11})H/4$ |
| $\|01>$ | $(M_{00}-M_{01}+M_{10}+M_{11})H/4$ | $(-M_{00}+M_{01}+M_{10}-M_{11})H/4$ | $(M_{00}-M_{01}-M_{10}-M_{11})H/4$ | $(M_{00}+M_{01}-M_{10}+M_{11})H/4$ |
| $\|10>$ | $(M_{00}+M_{01}-M_{10}+M_{11})H/4$ | $(M_{00}-M_{01}-M_{10}-M_{11})H/4$ | $(-M_{00}+M_{01}+M_{10}-M_{11})H/4$ | $(M_{00}-M_{01}+M_{10}+M_{11})H/4$ |
| $\|11>$ | $(M_{00}+M_{01}+M_{10}-M_{11})H/4$ | $(M_{00}+M_{01}+M_{10}+M_{11})H/4$ | $(M_{00}-M_{01}+M_{10}+M_{11})H/4$ | $(M_{00}-M_{01}+M_{10}-M_{11})H/4$ |

Now, consider the application of G to vector $\|001>$:

$$G|001\rangle = \frac{1}{4}\left|00\right\rangle \otimes (-M_{00}+M_{01}+M_{10}+M_{11})H\left|1\right\rangle +$$

$$\frac{1}{4}\left|01\right\rangle \otimes (M_{00}-M_{01}+M_{10}+M_{11})H\left|1\right\rangle +$$

$$\frac{1}{4}\left|10\right\rangle \otimes (M_{00}+M_{01}-M_{10}+M_{11})H\left|1\right\rangle +$$

$$\frac{1}{4}\left|11\right\rangle \otimes (M_{00}+M_{01}+M_{10}-M_{11})H\left|1\right\rangle$$

$x = 00$:

$$G|001\rangle = \frac{1}{4}\left|00\right\rangle \otimes (-C+3I)H\left|1\right\rangle + \frac{1}{4}\left|01\right\rangle \otimes (C+I)H\left|1\right\rangle +$$

$$\frac{1}{4}\left|10\right\rangle \otimes (C+I)H\left|1\right\rangle + \frac{1}{4}\left|11\right\rangle \otimes (C+I)H\left|1\right\rangle = |00\rangle\left(\frac{|0\rangle - |1\rangle}{\sqrt{2}}\right)$$

$x = 01$:

$$G|001\rangle = \frac{1}{4}\Big|00\Big\rangle \otimes (C+I)H\Big|1\Big\rangle + \frac{1}{4}\Big|01\Big\rangle \otimes (-C+3I)H\Big|1\Big\rangle +$$
$$\frac{1}{4}\Big|10\Big\rangle \otimes (C+I)H\Big|1\Big\rangle + \frac{1}{4}\Big|11\Big\rangle \otimes (C+I)H\Big|1\Big\rangle = |01\rangle\left(\frac{|0\rangle - |1\rangle}{\sqrt{2}}\right)$$

$x = 10$:

$$G|001\rangle = \frac{1}{4}\Big|00\Big\rangle \otimes (C+I)H\Big|1\Big\rangle + \frac{1}{4}\Big|01\Big\rangle \otimes (C+I)H\Big|1\Big\rangle +$$
$$\frac{1}{4}\Big|10\Big\rangle \otimes (-C+3I)H\Big|1\Big\rangle + \frac{1}{4}\Big|11\Big\rangle \otimes (C+I)H\Big|1\Big\rangle = |10\rangle\left(\frac{|0\rangle - |1\rangle}{\sqrt{2}}\right)$$

$x = 11$:

$$G|001\rangle = \frac{1}{4}\Big|00\Big\rangle \otimes (C+I)H\Big|1\Big\rangle + \frac{1}{4}\Big|01\Big\rangle \otimes (C+I)H\Big|1\Big\rangle +$$
$$\frac{1}{4}\Big|10\Big\rangle \otimes (C+I)H\Big|1\Big\rangle + \frac{1}{4}\Big|11\Big\rangle \otimes (-C+3I)H\Big|1\Big\rangle = |11\rangle\left(\frac{|0\rangle - |1\rangle}{\sqrt{2}}\right)$$

This means that if one measures the output vector and encodes it back the first two basis vectors of dimension 2 in the resulting tensor product, the following results:

| $\underline{x}$ | (a) Result | (b) Probability |
|---|---|---|
| 00 | 00 | 1 |
| 01 | 01 | 1 |
| 10 | 10 | 1 |
| 11 | 11 | 1 |

In the general case where $n>0$, $U_F$ has the following form:

| $U_F$ | $|0..0\rangle$ | $|0..1\rangle$ | ... | $|1..1\rangle$ |
|---|---|---|---|---|
| $|0..0\rangle$ | $M_{0..0}$ | 0 | 0 | 0 |
| $|0..1\rangle$ | 0 | $M_{0..1}$ | 0 | 0 |
| ... | ... | ... | ... | ... |
| $|1..1\rangle$ | 0 | 0 | 0 | $M_{1..1}$ | where $M_{\underline{x}} = C \wedge \forall i \neq \underline{x} : M_i = I(\underline{x}, i \in \{0,1\}^n)$.

The quantum gate $G = (D_n \otimes I)^h \cdot U_F \cdot (^{n+1}H)$ is given by:

| $^{n+1}H$ | $|0...0\rangle$ | ... | $|j\rangle$ | ... | $|1...1\rangle$ |
|---|---|---|---|---|---|
| $|0...0\rangle$ | $H/2^{n/2}$ | ... | $H/2^{n/2}$ | ... | $H/2^{n/2}$ |
| ... | ... | ... | ... | ... | ... |
| $|i\rangle$ | $H/2^{n/2}$ | ... | $(-1)^{i \cdot j} H/2^{n/2}$ | ... | $(-1)^{i \cdot (1...1)} H/2^{n/2}$ |
| ... | ... | ... | ... | ... | ... |
| $|11\rangle$ | $H/2^{n/2}$ | ... | $(-1)^{(1...1) \cdot j} H/2^{n/2}$ | ... | $(-1)^{(1...1)\cdot(1...1)} H/2^{n/2}$ |

| $D_n \otimes I$ | $|0...0\rangle$ | $|0...1\rangle$ | ... | $|i\rangle$ | ... | $|1...0\rangle$ | $|1...1\rangle$ |
|---|---|---|---|---|---|---|---|
| $|0...0\rangle$ | $-I + I/2^{n-1}$ | $I/2^{n-1}$ | ... | $I/2^{n-1}$ | ... | $I/2^{n-1}$ | $I/2^{n-1}$ |
| $|0...1\rangle$ | $I/2^{n-1}$ | $-I + I/2^{n-1}$ | ... | $I/2^{n-1}$ | ... | $I/2^{n-1}$ | $I/2^{n-1}$ |
| ... | ... | ... | ... | ... | ... | ... | ... |
| $|i\rangle$ | $I/2^{n-1}$ | $I/2^{n-1}$ | ... | $-I + I/2^{n-1}$ | ... | $I/2^{n-1}$ | $I/2^{n-1}$ |
| ... | ... | ... | ... | ... | ... | ... | ... |
| $|1...0\rangle$ | $I/2^{n-1}$ | $I/2^{n-1}$ | ... | $I/2^{n-1}$ | ... | $-I + I/2^{n-1}$ | $I/2^{n-1}$ |
| $|1...1\rangle$ | $I/2^{n-1}$ | $I/2^{n-1}$ | ... | $I/2^{n-1}$ | ... | $I/2^{n-1}$ | $-I + I/2^{n-1}$ |

| $U_F \cdot ^{n+1}H$ | $\|0 \ldots 0\rangle$ | $\ldots$ | $\|j\rangle$ | $\ldots$ | $\|1 \ldots 1\rangle$ |
|---|---|---|---|---|---|
| $\|0 \ldots 0\rangle$ | $M_{0 \ldots 0} H / 2^{n/2}$ | $\ldots$ | $M_{0 \ldots 0} H / 2^{n/2}$ | $\ldots$ | $M_{0 \ldots 0} H / 2^{n/2}$ |
| $\ldots$ | $\ldots$ | $\ldots$ | $\ldots$ | $\ldots$ | $\ldots$ |
| $\|i\rangle$ | $M_i H / 2^{n/2}$ | $\ldots$ | $(-1)^{i \cdot j} M_i H / 2^{n/2}$ | $\ldots$ | $(-1)^{i \cdot (1 \ldots 1)} M_i H / 2^{n/2}$ |
| $\ldots$ | $\ldots$ | $\ldots$ | $\ldots$ | $\ldots$ | $\ldots$ |
| $\|1 \ldots 1\rangle$ | $M_{1 \ldots 1} H / 2^{n/2}$ | $\ldots$ | $(-1)^{(1 \ldots 1) \cdot j} M_{1 \ldots 1} H / 2^{n/2}$ | $\ldots$ | $(-1)^{(1 \ldots 1) \cdot (1 \ldots 1)} M_{1 \ldots 1} H / 2^{n/2}$ |

Assuming, for example h=1, then:

| $G$ | $\|0 \ldots 0\rangle$ | $\ldots$ |
|---|---|---|
| $\|0 \ldots 0\rangle$ | $\left(-M_{0 \ldots 0} + \sum_{j \in \{0,1\}} n M_i / 2^{n-1}\right) H / 2^{n/2}$ | $\ldots$ |
| $\ldots$ | $\ldots$ | $\ldots$ |
| $\|i\rangle$ | $\left(-M_i + \sum_{j \in \{0,1\}} n M_i / 2^{n-1}\right) H / 2^{n/2}$ | $\ldots$ |
| $\ldots$ | $\ldots$ | $\ldots$ |
| $\|1 \ldots 1\rangle$ | $\left(-M_{1 \ldots 1} + \sum_{j \in \{0,1\}} n M_i / 2^{n-1}\right) H / 2^{n/2}$ | $\ldots$ |

Being $M_{\underline{x}} = C$ and $\forall i \neq \underline{x}; M_i = I$, this column may be written as:

| $G$ | $\|0 \ldots 0\rangle$ | $\ldots$ |
|---|---|---|
| $\|0 \ldots 0\rangle$ | $\left(-I + \sum_{j \in \{0,1\}} n_{-\{\underline{x}\}} I / 2^{n-1} + C / 2^{n-1}\right) H / 2^{n/2}$ | $\ldots$ |
| $\ldots$ | $\ldots$ | $\ldots$ |
| $\|\underline{x}\rangle$ | $\left(-C + \sum_{j \in \{0,1\}} n_{-\{\underline{x}\}} I / 2^{n-1} + C / 2^{n-1}\right) H / 2^{n/2}$ | $\ldots$ |
| $\ldots$ | $\ldots$ | $\ldots$ |
| $\|1 \ldots 1\rangle$ | $\left(-I + \sum_{j \in \{0,1\}} n_{-\{\underline{x}\}} I / 2^{n-1} + C / 2^{n-1}\right) H / 2^{n/2}$ | $\ldots$ | and so:

| $G$ | $\|0 \ldots 0\rangle$ | $\ldots$ |
|---|---|---|
| $\|0 \ldots 0\rangle$ | $\{[-1 + (2^n - 1)/2^{n-1}] I + C / 2^{n-1}\} H / 2^{n/2}$ | $\ldots$ |
| $\ldots$ | $\ldots$ | $\ldots$ |
| $\|\underline{x}\rangle$ | $\{(2^n - 1)/2^{n-1} I + [-1 + 1/2^{n-1}] C\} H / 2^{n/2}$ | $\ldots$ |
| $\ldots$ | $\ldots$ | $\ldots$ |
| $\|1 \ldots 1\rangle$ | $\{[-1 + (2^n - 1)/2^{n-1}] I + C / 2^{n-1}\} H / 2^{n/2}$ | $\ldots$ |

Now, consider application of the matrix operator $\{[-1 + (2^n-1)/2^{n-1}]I + C/2^{n-1}\} H / 2^{n/2}$ and matrix operator $\{(2^n-1)/2^{n-1}I + [-1+1/2^{n-1}]C\} H / 2^{n/2}$ to the vector $|1\rangle$, then:

$$\frac{1}{2^{n/2}} \left\{ \left[-1 + \frac{2^n - 1}{2^{n-1}}\right] I + \frac{1}{2^{n-1}} C \right\} H |1\rangle = \left(-1 + \frac{2^n - 2}{2^{n-1}}\right) \frac{|0\rangle - |1\rangle}{2^{\frac{(n+1)}{2}}}$$

$$\frac{1}{2^{n/2}} \left\{ \frac{2^n - 1}{2^{n-1}} I + \left[-1 + \frac{1}{2^{n-1}}\right] C \right\} H |1\rangle = \left(+1 + \frac{2^n - 2}{2^{n-1}}\right) \frac{|0\rangle - |1\rangle}{2^{\frac{(n+1)}{2}}}$$

This means:

which can be written as a block vector:

| $G_{h=1} \|0 \ldots 01\rangle$ | |
|---|---|
| $\|0 \ldots 0\rangle$ | $[-1 + (2^n - 2)/2^{n-1}] / 2^{n/2} H \|1\rangle$ |
| $\ldots$ | $\ldots$ |
| $\|\underline{x}\rangle$ | $[+1 + (2^n - 2)/2^{n-1}] / 2^{n/2} H \|1\rangle$ |
| $\ldots$ | $\ldots$ |
| $\|1 \ldots 1\rangle$ | $[-1 + (2^n - 2)/2^{n-1}] / 2^{n/2} H \|1\rangle$ |

Now, application of the operator $(D_n \otimes I) \cdot U_F$ to a vector in this form yields:

| $\|\varphi\rangle$ | |
|---|---|
| $\|0 \ldots 0\rangle$ | $\alpha H \|1\rangle$ |
| $\ldots$ | $\ldots$ |
| $\|\underline{x}\rangle$ | $\beta H \|1\rangle$ |
| $\ldots$ | $\ldots$ |
| $\|1 \ldots 1\rangle$ | $\alpha H \|1\rangle$ | where $\alpha$ and $\beta$ are real number such that $(2^n - 1)\alpha^2 + \beta^2 = 1$. The result is:

| $U_F \cdot \|\varphi\rangle$ | |
|---|---|
| $\|0 \ldots 0\rangle$ | $\alpha H \|1\rangle$ |
| $\ldots$ | $\ldots$ |
| $\|\underline{x}\rangle$ | $\beta C H \|1\rangle$ |
| $\ldots$ | $\ldots$ |
| $\|1 \ldots 1\rangle$ | $\alpha H \|1\rangle$ |

| $(D_n \otimes I) \cdot U_F \cdot \|\varphi\rangle$ | |
|---|---|
| $\|0 \ldots 0\rangle$ | $\left(-\alpha + \sum_{j \in \{0,1\}} n_{-\{\underline{x}\}} \alpha / 2^{n-1} - \beta / 2^{n-1}\right) H \|1\rangle$ |
| $\ldots$ | $\ldots$ |
| $\|\underline{x}\rangle$ | $\left(+\beta + \sum_{j \in \{0,1\}} n_{-\{\underline{x}\}} \alpha / 2^{n-1} - \beta / 2^{n-1}\right) H \|1\rangle$ |
| $\ldots$ | $\ldots$ |
| $\|1 \ldots 1\rangle$ | $\left(-\alpha + \sum_{j \in \{0,1\}} n_{-\{\underline{x}\}} \alpha / 2^{n-1} - \beta / 2^{n-1}\right) H \|1\rangle$ |

$$G_{h=1} |0 \ldots 01\rangle = \left[\left(-1 + \frac{2^n - 2}{2^{n-1}}\right) |0 \ldots 0\rangle + \left(-1 + \frac{2^n - 2}{2^{n-1}}\right) |0 \ldots 1\rangle + \right.$$

$$\left. \ldots + \left(+1 + \frac{2^n - 2}{2^{n-1}}\right) |\underline{x}\rangle + \ldots + \left(-1 + \frac{2^n - 2}{2^{n-1}}\right) |1 \ldots 1\rangle \right] \otimes \frac{|0\rangle - |1\rangle}{2^{\frac{(n+1)}{2}}}$$

-continued

| $(D_n \otimes I) \cdot U_F \cdot \|\varphi\rangle$ | |
|---|---|
| $\|0 \ldots 0\rangle$ | $\{-\alpha + [(2^n - 1)\alpha - \beta]/2^{n-1}\}H\|1\rangle$ |
| $\ldots$ | $\ldots$ |
| $\|x\rangle$ | $\{+\beta + [(2^n - 1)\alpha - \beta]/2^{n-1}\}H\|1\rangle$ |
| $\ldots$ | |
| $\|1 \ldots 1\rangle$ | $\{-\alpha + [(2^n - 1)\alpha - \beta]/2^{n-1}\}H\|1\rangle$ |

This means that if one starts from vector $G_{h=1}|0 \ldots 01\rangle$, which is in the form considered, and applies h times operator $(D_n \otimes I) \cdot U_F$, the coefficients at time t are such that:

$$\alpha_t = 2\frac{(2^n - 1)\alpha_{t-1} - \beta_{t-1}}{2^n} - \alpha_{t-1}$$

$$\beta_t = 2\frac{(2^n - 1)\alpha_{t-1} - \beta_{t-1}}{2^n} + \beta_{t-1}$$

So, as $\beta$ increases, $\alpha$ decreases.

As in Deutsch-Jozsa's algorithm, when the output vector from the Grover quantum gate has been measured, one must interpret it in order to find $\underline{x}$. This step is relatively simple. In fact, it is sufficient to choose a large h in order to get the searched vector $|\underline{x}\rangle|0\rangle$ or $|\underline{x}\rangle|1\rangle$ with probability near to 1. After obtaining the vector, it is encoded back into binary values the first n basis vector in the resulting tensor product, obtaining the string x as final answer.

Information Theory

The evolution of a quantum algorithm from an information theory point of view is now disclosed. The complex vector entering the quantum gate is here considered as an information source both from the classical and the quantum level. The Shannon Entropy $H_{sh}$ is a measure of classical information. Consider a complex vector of modulus I in the Hilbert space $\text{Hil}_{Q1} \otimes \ldots \otimes \text{Hil}_{Qn}$, where $\text{Hil}_{Qk}$ has dimension 2 for every k, written as a complex linear combination of basis vectors:

$$|\psi\rangle = \sum_{i_1,i_2,\ldots,i_n \in \{0,1\}} \alpha_{i_1 i_2 \ldots i_n} |i_1\rangle \otimes |i_2\rangle \otimes \ldots \otimes |i_n\rangle$$

Then, the Shannon Entropy of $|\psi\rangle$ with respect to the basis $\{|i_1\rangle \otimes \ldots \otimes |i_n\rangle\}_{i_1,\ldots,i_n \in \{0,1\}}$ is defined as:

$$H_{Sh}(|\psi\rangle) = -\sum_{i_1,i_2,\ldots,i_n \in \{0,1\}} \|\alpha_{i_1 i_2 \ldots i_n}\|^2 \log(\|\alpha_{i_1 i_2 \ldots i_n}\|^2)$$

where $\|\alpha_{i_1 i_2 \ldots i_n}\|^2$ is interpreted as the probability of measuring vector $|i_1 i_2 \ldots i_n\rangle$.

The Von Neumann Entropy is used to measure the information stored in quantum correlation. Let $\rho = |\psi\rangle\langle\psi|$ be the density matrix associated to state $|\psi\rangle$ and $T \subseteq \{1, \ldots, n\}$. Then define:

$$\rho_T = \text{Tr}_{\{1,\ldots,n\}-T}\rho$$

where $\text{Tr}_{\{1,\ldots,n\}-T}(\ldots)$ is the partial trace operator. The Von Neumann Entropy of qubit j in $|\psi\rangle$ is defined as:

$$S_{|\psi pullout;zu841500.900}(T) = -tr(\rho_T \log \rho_T)$$

The following definitions are also useful:

$$I_{|\psi pullout;zu841500.900}(h;k) = S_{|\psi pullout;zu841500.900}(\{h\}) + S_{|\psi pullout;zu841500.900}(\{k\}) - S_{|\psi pullout;zu841500.900}(\{h,k\})$$

$$I_{|\psi pullout;zu841500.900}(h;k;l) = S_{|\psi pullout;zu841500.900}(\{h\}) + S_{|\psi pullout;zu841500.900}(\{k\}) + S_{|\psi pullout;zu841500.900}(\{l\}) - S_{|\psi pullout;zu841500.900}(\{h,k\}) - S_{|\psi pullout;zu841500.900}(\{h,l\}) - S_{|\psi pullout;zu841500.900}(\{k,l\}) - S_{|\psi pullout;zu841500.900}(\{h,k,l\})$$

$$S_{|\psi pullout;zu841500.900}(h|k) = S_{|\psi pullout;zu841500.900}(\{h\}) - I_{|\psi pullout;zu841500.900}(h;k)$$

$$S_{|\psi pullout;zu841500.900}(h/544\ k;l) = S_{|\psi pullout;zu841500.900}(\{h\}) - I_{|\psi pullout;zu841500.900}(h;k) - I_{|\psi pullout;zu841500.900}(h;k) + I_{|\psi pullout;zu841500.900}(h;k;l)$$

for $h,k,l \in \{1, \ldots, n\}$.

Figure 25:
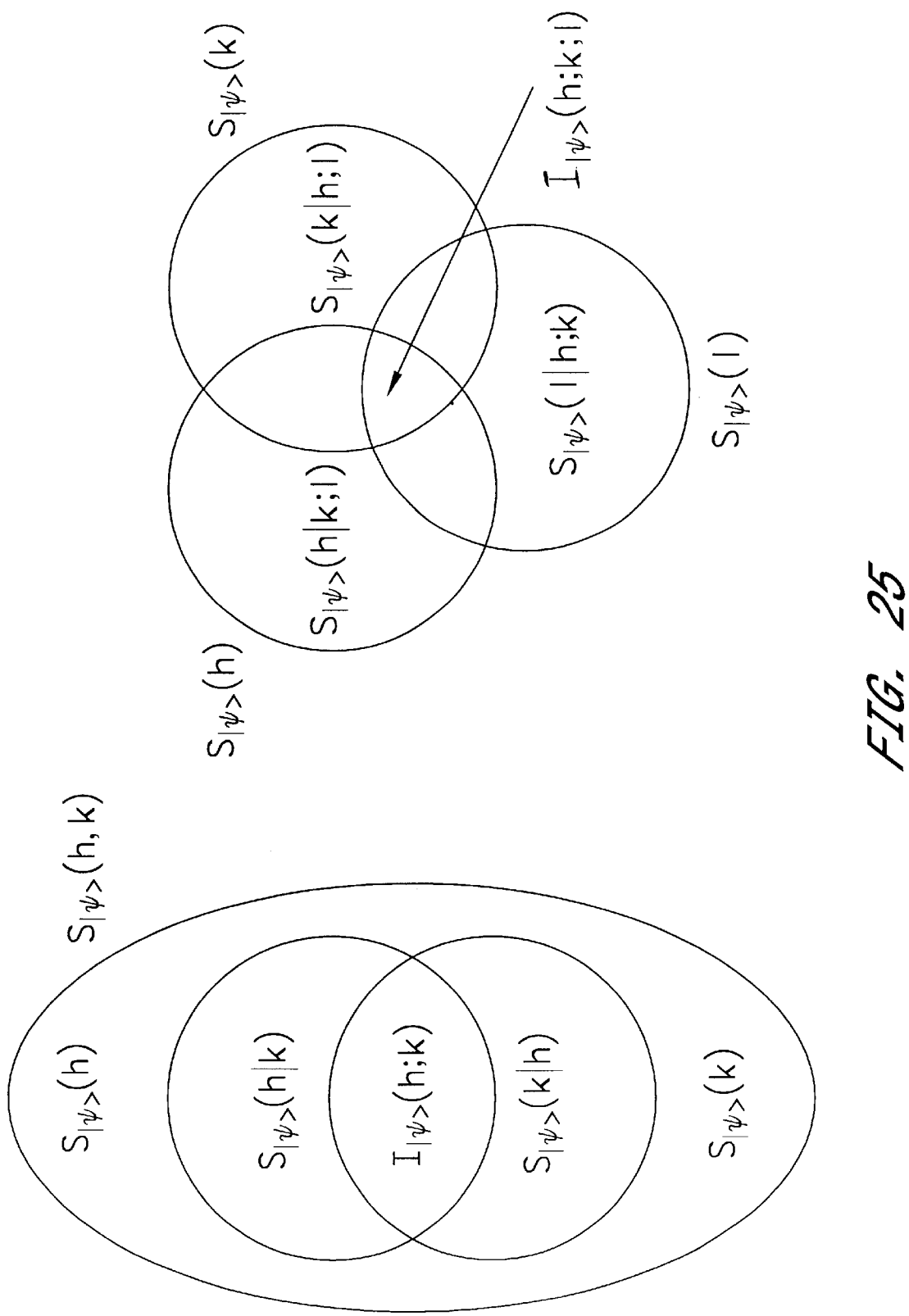
FIG. 25 is a Wenn diagram that illustrates entropy and mutual information in a quantum system.

These quantities can be represented in a Wenn diagram as shown in FIG. 25.

Measures of Entropy are different from most physical quantities. In quantum mechanics one has to distinguish between observables and states. Observables (like position, momentum, etc.) are mathematically described by self-adjoint operators in Hilbert space. States (which generally are mixed) are characterised by a density matrix $\rho \geq 0$, i.e. a Hermitian operator, with trace $\text{Tr}(\rho) = 1$. The expectation value of an observable A in the state $\rho$ is $\langle A \rangle = \text{Tr}(\rho A)$. Entropy is not an observable. Thus, there does not exist an operator with the property that its expectation value in some state would be its entropy. It is rather a function of state. Due to the Jaynes relation between the information-theoretical and physical entropy via the Boltzmann's constant, $k_B$, one can ascribe to any quantum object a certain value of its physical entropy $S_{ph}^{Cl} = k_B H_{Sh}$.

The classical limit $S_{ph}^{Cl}$ of the expression for the entropy can be justified mathematically on coherent states. The best thing one can do is to measure the probability of finding a particle in a state with minimum uncertainty centred around the classical values, i.e. in a coherent state. In the general case $S_{ph}^{Cl} \geq S$, with the observation $$z := \frac{(q + ip)}{\sqrt{2\hbar}},$$

let $|z\rangle = W(z)|0\rangle$ be a coherent state with expectation values of position, or momentum, q or p, respectively. In configuration space, $|0\rangle$ is explicitly given by the wave function $$\frac{1}{\sqrt[4]{\pi\hbar}} e^{-\frac{x^2}{2\hbar}}$$

and W(z) is the unitary operator $$W(z) = e^{\frac{1}{\hbar}(pQ - qP)}$$

with Q, P operators of position, or momentum, respectively. Now define the classical density distribution corresponding to the density matrix $\rho$ by $\rho(z) := \langle z|\rho|z \rangle$.

For every function $f(z)$ there exists at most one density matrix $\rho$ that $\rho(z) = f(z)$ and $$\text{Tr}\rho = \int \frac{dz}{\pi} \langle z|\rho|z\rangle = 1.$$

The relation $S_{ph}^{Cl} \geq S$ is true because, for $s(x):=\{-x\ln x (x>0); 0(x=0)\}$ due to concavity, $S(\langle z|\rho|z\rangle) \geq \langle z|\rho|z\rangle$, hence $$S_{ph}^{Cl} = \int \frac{dz}{\pi} s(\rho(z)) \geq \int \frac{dz}{\pi} \langle z|s(\rho)|z\rangle = Tr(s(\rho)) = S(\rho).$$

More generally, for any convex (concave) function $f$, $$Tr(f(\rho)) \leq (\geq) \int \frac{dz}{\pi} f(\rho(z)).$$

By continuity of $\rho(z)$, $S_{ph}^{Cl} = S$ would imply $S(\langle z|\rho|z\rangle) = \langle z|S(\rho)|z\rangle$ for all z, i.e. regarding the strict concavity of $S(\cdot)$, every $|z\rangle$ must be an eigenvector of $\rho$, which is impossible. Hence, $S_{ph}^{Cl} > S$.

The classical entropy is not invariant under every unitary transformation, i.e. it cannot be said that $S_{ph}^{Cl}(U^*\rho U) = S_{ph}^{Cl}(\rho)$ for every U, but, rather, this relationship holds for a restricted class only. For instance if $U = W(z_0)$, then $$S_{ph}^{Cl}(W(-z_0)\rho W(z_0)) = \int \frac{dz}{\pi} S(\langle 0|W(-z)W(z_0)W(z_0)W(z_0)|0\rangle)$$

$$= \int \frac{dz}{\pi} S(\rho(z+z_0))$$

$$= S_{ph}^{Cl}(\rho)$$

This argument also works for all unitary U such that $UW(z) = W(z')$ times a phase factor provided that $dz = dz'$ (canonical transformation). If $|\psi\rangle$ is a pure state (a unit vector), $\rho = |\psi\rangle\langle\psi|$, then $\rho(z) = |\langle\psi|z\rangle|^2$, and $$S_{ph}^{cl}(\rho) = -2\int \frac{dz}{\pi}|\langle\psi|z\rangle|^2 \ln|\langle\psi|z\rangle|^2.$$

Inserting for $|\psi\rangle = |z_0\rangle$, we obtain $$S_{ph}^{cl}(\rho) = \int \frac{dz}{\pi} e^{-|z|^2} \cdot |z|^2 = 1.$$

On the other hand, there exist pure states with arbitrary high classical entropy: it suffices to show that for every $\epsilon > 0$ one can find unit vectors $|\psi\rangle$ such that $\langle\psi|z\rangle < \epsilon$ for all z. For them a well-known inequality tells us that $S_{ph}^{cl}(\rho) \geq -\ln\epsilon^2$. We conjecture that the states with minimal classical entropy are exactly given by the density matrices $|z\rangle\langle z|$, and consequently, $S_{ph}^{cl}(\rho) \geq 1$. In order that $S_{ph}^{cl}(\rho)$ be small, $\text{Sup}|\rho(z)|$ must be close to one, otherwise the inequality mentioned before gives a value too large for classical entropy. Now if $\text{Sup}|\rho(z)|$ is exactly equal to 1, then, by continuity, there is some $z_0$ with $\rho(z_0) = 1$, i.e. $\langle z_0|\rho|z_0\rangle = 1$. Since $\|\rho\| \leq 1$ this implies $\|\rho\| = 1$ and $\rho(z_0) = |z_0\rangle$; on the other hand, $Tr(\rho) = 1$, hence $\rho = |z_0\rangle\langle z_0|$ because all other eigenvalues of $\rho$ must be 0.

The minimum-uncertainty coherent states for a harmonic-oscillator potential can be defined as those states that minimize the uncertainty relation of Heisenberg (leading to the equality in the uncertainty relations), subject to the added constraint that the ground state is a member of the set. They are considered to be as close as possible to the classical states. Beyond the harmonic-oscillator system, coherent states can be developed for quantum (Schrodinger) systems with general potentials and for general Lie symmetries.

These states are called (general) minimum-uncertainty coherent states and (general) displacement-operator coherent states. There is also a different generalization of the coherent states of the harmonic-oscillator system. This is the concept of "squeezed" states. (Squeezing is a reduction of quadrature fluctuations below the level associated with a vacuum.)

The even and odd coherent states for one-mode harmonic oscillator (Schrodinger cat states) are representatives of non-classical states. Schrodinger cat states have properties similar to those of the squeezed states, i.e. the squeezed vacuum state and the even coherent state contain Fock states with an even number of photons.

In quantum mechanics, two non-commuting observables cannot be simultaneously measured with arbitrary precision. This fact, often called the Heisenberg uncertainty principle, is a fundamental restriction that is related neither to imperfection of the existing real-life measuring devices nor to the experimental errors of observation. It is rather the intrinsic property of the quantum states itself. The uncertainty principle provides (paradoxically enough) the only way to avoid many interpretation problems. The uncertainty principle specified for given pairs of observables finds its mathematical manifestation as the uncertainty relations. The first rigorous derivation of the uncertainty relation from the basic non-commuting observables (i.e., for the position and moment, $[\hat{x},\hat{p}] = i\hbar$) is the inequality: $\Delta\hat{x}\Delta\hat{p} \geq \frac{1}{2}\hbar$. It is a consequence of the properties of the Fourier transform that connects the wave functions of the system in the position and momentum representation.

It is useful at this point to present quantum uncertainty relations (UR) in terms of entropy or information ("entropic UR" -EUR). The usual "standard UR" (for standard deviations)

$$(\Delta_\varphi A)^2 (\Delta_\varphi B)^2 \geq \frac{1}{4}|\langle[A,B]_-\rangle_\varphi|^2 + \frac{1}{4}|\langle\{A,B\}_+\rangle_\varphi - 2\langle A\rangle_\varphi\langle B\rangle_\varphi|^2$$

(note that the second term in this inequality represents the covariance, or correlation, $$cov_\varphi(A,B) := \frac{1}{2}\langle\varphi|AB+BA|\varphi\rangle - \langle\varphi|A|\varphi\rangle\langle\varphi|B|\varphi\rangle$$

between the observables A and B in the state $|\phi\rangle$) is presented as an inequality of the entropic form $S^{(A)} + S^{(B)} \geq S_{AB}$ or in information form $I_\phi(A) + I_\phi(B) \leq I_\phi(A,B)$ as more adequate expressions for the uncertainty principle. Given two non-commuting observables, one can derive an uncertainty relation for them. The states that satisfy the equality sign in the inequality are called intelligent states.

For example, consider any continuous parameter $\lambda$ and any Hermitian observable $A(\lambda)$ which is the generator of the parametric evolution, then UR gives $\langle\Delta A(\lambda)\rangle\Delta\lambda \geq \hbar/4$, where $$\langle\Delta A(\lambda)\rangle = \frac{1}{(\lambda_2 - \lambda_1)}\int_{\lambda_1}^{\lambda_2} \Delta A(x)\,dx$$

is the parameter average of the observable uncertainty and $$\Delta\lambda = \frac{\pi}{s_0}(\lambda_2 - \lambda_1)$$

is the scaled displacement in the space of the conjugate variable of A. This generalized UR would hold for position-momentum, phase-number or any combinations. For the case when initial and final states are orthogonal, one knows that all states of the form $$|\psi(\lambda)\rangle = \frac{1}{\sqrt{2}}(e^{-\frac{i}{\hbar}a_i\lambda}|\psi_i\rangle + e^{-\frac{i}{\hbar}a_j\lambda}|\psi_j\rangle),$$

$i \neq j$ are the only intelligent states that satisfy the equality $$\langle\Delta A(\lambda)\rangle\Delta\lambda = \frac{\hbar}{4}.$$

However, these states do not satisfy the equality when the initial and final states are non-orthogonal. In this case, if the generator of the parametric evolution A can be split into two parts $A_0+A_1$ such that $A_0$ has a complex basis of normalised eigenvectors $\{|\psi_i\rangle\}_{i \in I}$ which degenerate the spectrum $\{a_0\}$, with I a set of quantum numbers and $A_1$ has matrix elements $(A_1)_{ii}=0=(A_1)_{jj}$, and $(A_1)_{ij}=(A_1)_{ji}=a_1$, then all states of the form:

$$|\psi(\lambda)\rangle = e^{-\frac{i}{\hbar}a_0\lambda}\left[\cos\left(a_1\frac{\lambda}{\hbar}\right)|\psi_i\rangle - i\sin\left(a_1\frac{\lambda}{\hbar}\right)|\psi_j\rangle\right], \quad i \neq j$$

are intelligent states for non-orthogonal initial and final states.

It is useful to compare various characterisations of "maximal information" and point out their connection with "minimum uncertainty." For clarity, the following treatment is restricted, without loss of generality, mainly to "simple" observables (defined on the smallest non-trivial Boolean algebra $\Sigma=\{0, a, \neg a, 1\}$). The quantity of interest is information with respect to the single effect $E:I_\phi(E)=E_\phi \ln(E_{100})+E'_\phi \ln(E'_{100})$, $E'=I-E$. Non-commutativity or incompatibility of (unsharp) properties E and F will, in general, exclude the possibility of measuring or preparing both of them simultaneously. In particular, if $E=E^Q(X)$, $F=F^P(Y)$ are position and momentum spectral projections associated with bounded measurable sets X, Y, then $E^Q(X) \wedge E^P(Y)=0$ holds or, equivalently $$\langle\phi|E^Q(X)|\phi\rangle=1 \Rightarrow \langle\phi|E^P(Y)|\phi\rangle<1$$
$$\langle\phi|E^P(Y)|\phi\rangle=1 \Rightarrow \langle\phi|E^Q(X)|\phi\rangle<1$$

Thus "certain" position and momentum determinations exclude each other, and the question arises as to what "degree of uncertainty" they can be "known" simultaneously. One can take any reasonable characterisation of maximal joint knowledge, or joint information. In this case the above-mentioned statement can be put into the following equivalent form:

$$\left.\begin{array}{l}\langle\varphi|E^Q(X)|\varphi\rangle = 1\\ \langle\varphi|E^P(Y)|\varphi\rangle = 1\end{array}\right\} \Rightarrow E_\varphi + F_\varphi < 2; E_\varphi \cdot F_\varphi < 1$$

The "state of maximal information" can be defined through three values. The first expression $E_\phi+F_\phi$ can be maximised and an explicit construction procedure for the corresponding "state of maximal information" is given below. The question of maxima for this quantity as well as for $E_\phi \cdot F_\phi$ and for $I_\phi(E)+I_\phi(F)$ for an arbitrary pair of effects, E and F is studied here. In particular, it is shown that each quantity can be maximal only if there exist states which lead to minimal uncertainty product in UR. Furthermore, projections the maxima of $I_\phi(E)+I_\phi(F)$ (if they exist) coincide with those of one of the quantities $E_\phi^v+F_\phi^\eta$ and $E_\phi^v \cdot F_\phi^\eta (E^v \in \{E, E'\}, F^\eta \in \{F, F'\})$.

For maximal $E_\phi+F_\phi$ the variation of $\langle\phi|E|\phi\rangle + \langle\phi|F|\phi\rangle - \lambda\langle\phi|\phi\rangle$ must vanish which implies the following equations: $(E+F)|\phi\rangle = (E_\phi+F_\phi)|\phi\rangle$. Multiplying with E or with F and taking the expectations yields:

$$(\Delta_\phi E)^2 = (\Delta_\phi F)^2 = -(\langle\phi|EF|\phi\rangle - E_\phi \cdot F_\phi) = -\text{cov}_\phi(E,F),$$

which leads to a minimal UR: $(\Delta_\phi E)^2 \cdot (\Delta_\phi F)^2 = [\text{cov}_\phi(E,F)]^2$.

Similarly, maximising the product $E_{100} \cdot F_\phi$ gives $(F_\phi E+E_\phi F)|\phi\rangle = 2E_\phi \cdot F_\phi|\phi\rangle$ and $(\Delta_\phi E)^2 F_\phi^2 = (\Delta_\phi F)^2 E_\phi^2 = -E_\phi \cdot F_\phi \text{cov}_\phi(E,F)$ which leads again to a minimal UR, $E_\phi \neq 0 \neq F_\phi$.

Finally, maximal information sum $I_\phi(E)+I_\phi(F)$ will be realised in states satisfying $(\ln E_\phi - \ln E'_\phi)(E-E'_\phi)|\phi\rangle + (\ln F_\phi - \ln F'_\phi)(F-F'_\phi)|\phi\rangle = 0$. Generally this equation contains all stationary points, e.g. the minimum $E_\phi = E'_\phi = F_\phi = F'_\phi = \frac{1}{2}$, or the joint eigenstates. Since one of the objects here is to find states of maximal information with respect to positive outcomes for E, F assume $E_\phi > \frac{1}{2}$ and $F_\phi > \frac{1}{2}$. Then this equality implies:

$$(\alpha E + F)|\varphi\rangle = (\alpha F_\varphi + F_\varphi)|\varphi\rangle, \quad \alpha = \frac{\ln\left(\frac{E_\varphi}{E'_\varphi}\right)}{\ln\left(\frac{F_\varphi}{F'_\varphi}\right)} \geq 0$$

and $\alpha(\Delta_\phi E)^2 = 1/\alpha(\Delta_\phi F)^2 = -\text{cov}(E,F)$ which again gives rise to the minimal uncertainty product in UR.

The three notions of maximal information are consistent in so far as they imply minimal uncertainty product. For example, let E,F denote position and momentum spectral projections, respectively: $E=E^Q(X)$, $F=F^P(Y)$. The sum of probabilities $E_\phi+F_\phi$ has been shown to be maximal in the state $\phi=\phi_{min}$ with $$|\varphi_{min}\rangle = \left(\frac{1+a_0}{2a_0^2}\right)^{1/2} E|g_0\rangle + \left(\frac{1-a_0}{2(1-a_0^2)}\right)^{1/2} E'|g_0\rangle$$

provided that X, Y are bounded measurable sets. Here $a_0^2$ is the maximal eigenvalue of the compact operator (FEF) and $g_0$ is the corresponding eigenvector satisfying $FEF|g_0\rangle = a_0^2|g_0\rangle, F|g_0\rangle = |g_0\rangle, \||g_0\rangle\|_2^2 = 1$. It is clear from above description that $\phi_{min}$ must be an eigenstate of (E+F). This can also be seen directly in the following way. Introduce $|f_0\rangle = a_0^{-1} E|g_0\rangle, \|f_0\|_2^2 = a_0^{-2}\langle g_0|FEF|g_0\rangle = 1, E|f_0\rangle = |f_0\rangle$. Then:

$$EFE|f_0\rangle = a_0^2|f_0\rangle, |g_0\rangle = a_0^{-1} F|f_0\rangle$$

and $\phi_{min}$ can be written in the symmetric form $$|\varphi_{min}\rangle = \frac{1}{\sqrt{2(1+a_0)}}[|f_0\rangle + |g_0\rangle]$$

The value $\phi_{min}$ maximises all the three quantities $(E_\phi \cdot F_\phi)$, $(E_\phi+F_\phi)$ and $(I_\phi(E)+I_\phi(F))$, and it minimises the uncertainty product $\Delta_\phi E \cdot \Delta_\phi F$. Thus maximal information (minimal entropy) and minimal uncertainty can be achieved on intelligent coherent states and will again coincide.

The following disclosure new describes the role of entropy changing in a quantum algorithm as information data flow processing and how the classical and quantum information amount changes in the dynamics of some quantum algorithms. The following qualitative axiomatic descriptions of dynamic evolution of information flow in a quantum algorithm are provided:

(1) The information amount (information content) of a successful result increases while the quantum algorithm is in execution.

(2) The quantity of information becomes the fitness function for recognition of successful results and introduces a measure of accuracy for successful results. In this case the principle of minimum of Classical/Quantum Entropy corresponds to recognition of successful results on intelligent output states of the quantum algorithm computation (3) If the classical entropy of the output vector is small, the degree of order for this output state is relatively larger, and the output of measurement process on intelligent states of a quantum algorithm gives the necessary information to solve the initial problem with success.

These three information axioms mean that the algorithms can automatically guarantee convergence of information amount to a desired precision. This is used to provide robust and stable results for fault-tolerant computation.

Figure 27:
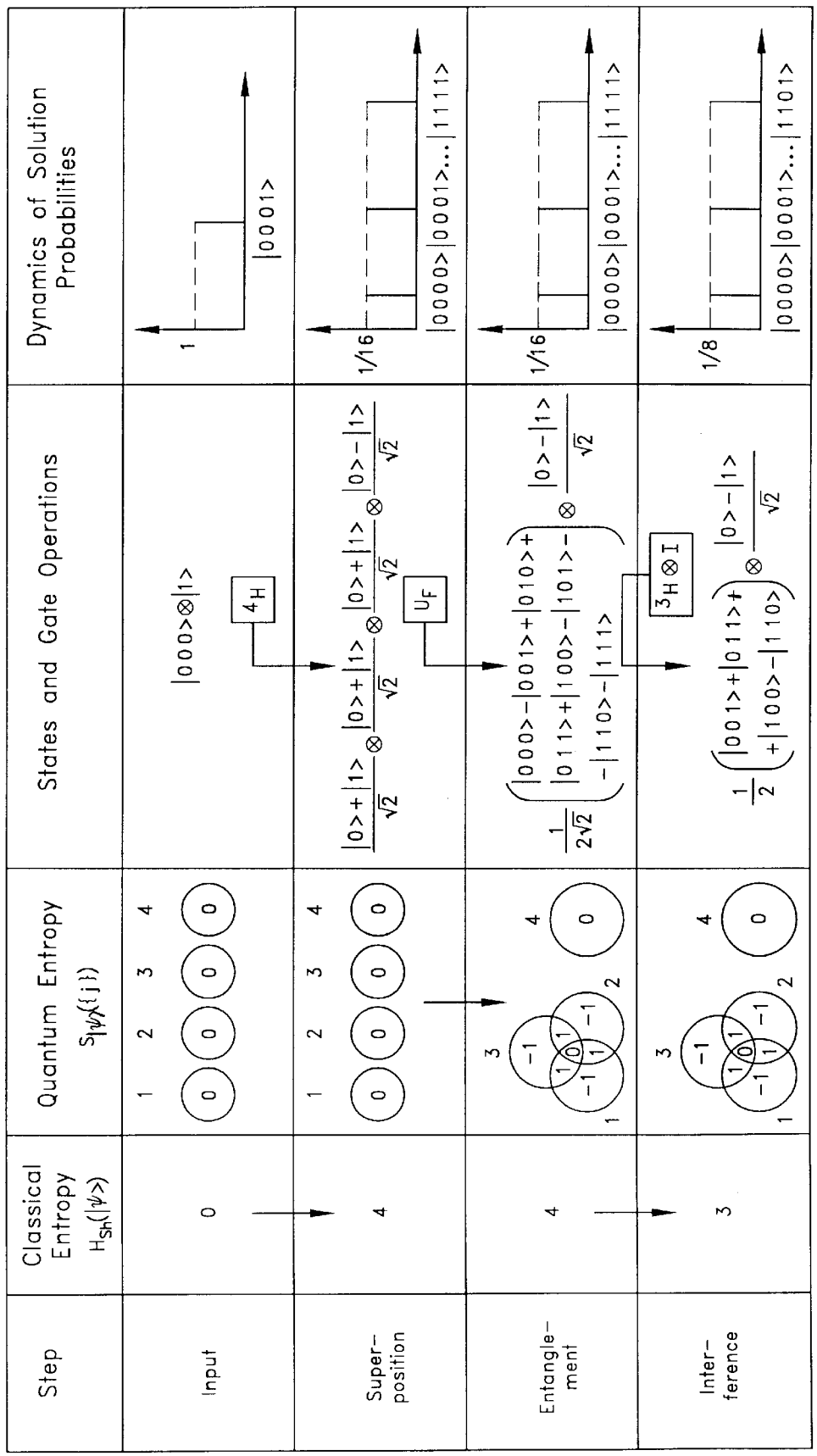
FIG. 27 illustrates information analysis of the Deutsch-Jozsa algorithm for a first operator $U_F$.
Figure 28:
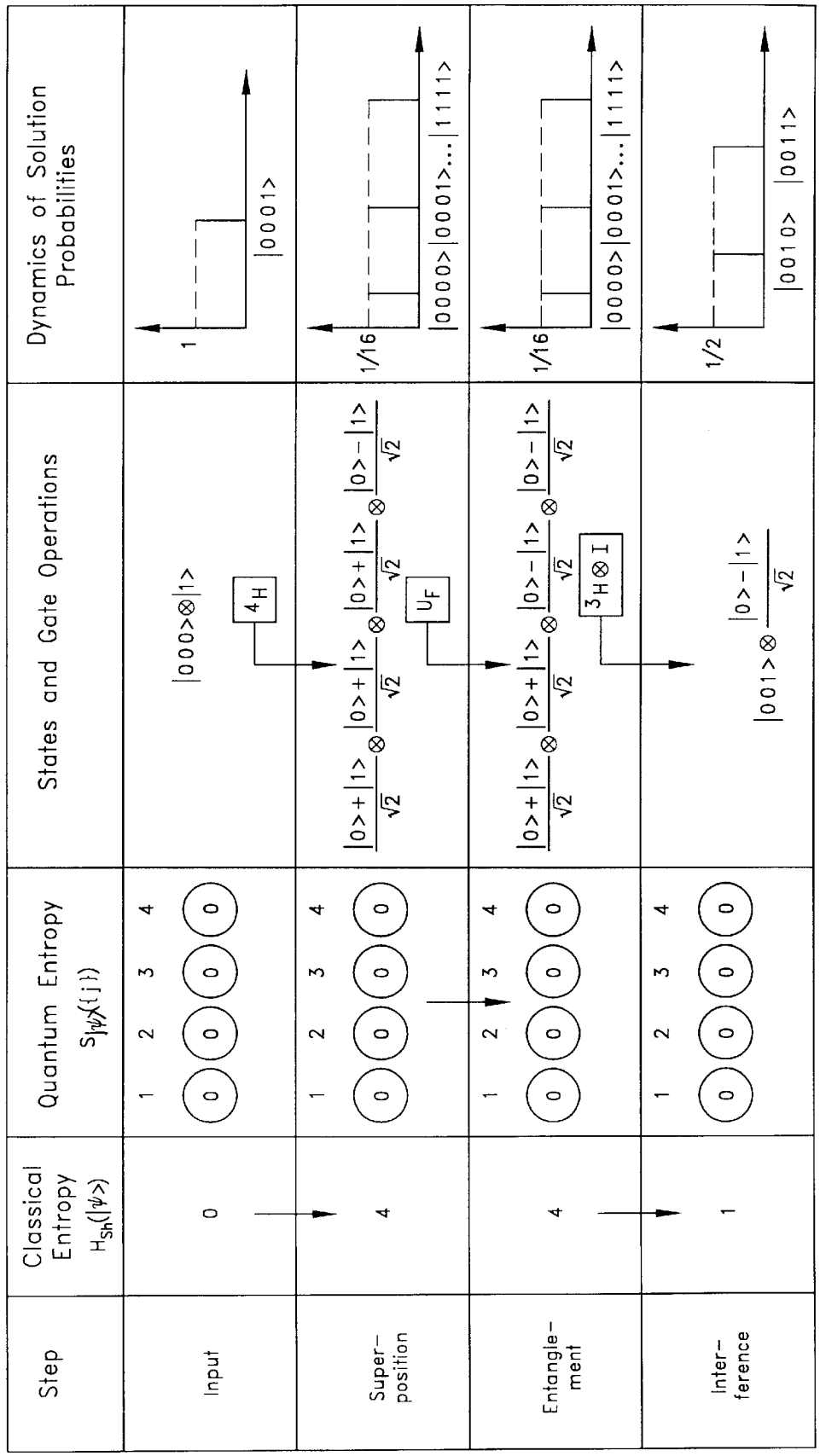
FIG. 28 illustrates information analysis of the Deutsch-Jozsa algorithm for a second operator $U_F$.
Figure 29:
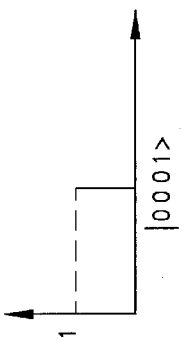
FIG. 29 illustrates information analysis of the Deutsch-Jozsa algorithm for a third operator $U_F$.

As an example of the use of entropy with quantum algorithms, consider the following examples from the Deutsch-Jozsa (DJ) algorithm with n=3. FIGS. 27, 28, and 29 illustrate three input functions encoded into the following operators, respectively:

The operator used in connection with FIG. 27 is:

$$U_F = \begin{bmatrix} I & 0 & 0 & 0 & 0 & 0 & 0 & 0 \\ 0 & C & 0 & 0 & 0 & 0 & 0 & 0 \\ 0 & 0 & I & 0 & 0 & 0 & 0 & 0 \\ 0 & 0 & 0 & I & 0 & 0 & 0 & 0 \\ 0 & 0 & 0 & 0 & I & 0 & 0 & 0 \\ 0 & 0 & 0 & 0 & 0 & C & 0 & 0 \\ 0 & 0 & 0 & 0 & 0 & 0 & C & 0 \\ 0 & 0 & 0 & 0 & 0 & 0 & 0 & C \end{bmatrix}$$

The operator used in connection with FIG. 28 is:

$$U_F = {}^2I \otimes \begin{bmatrix} I & 0 \\ 0 & C \end{bmatrix}$$

The operator used in connection with FIG. 29 is:

$$U_F = {}^4I$$

Figure 26:
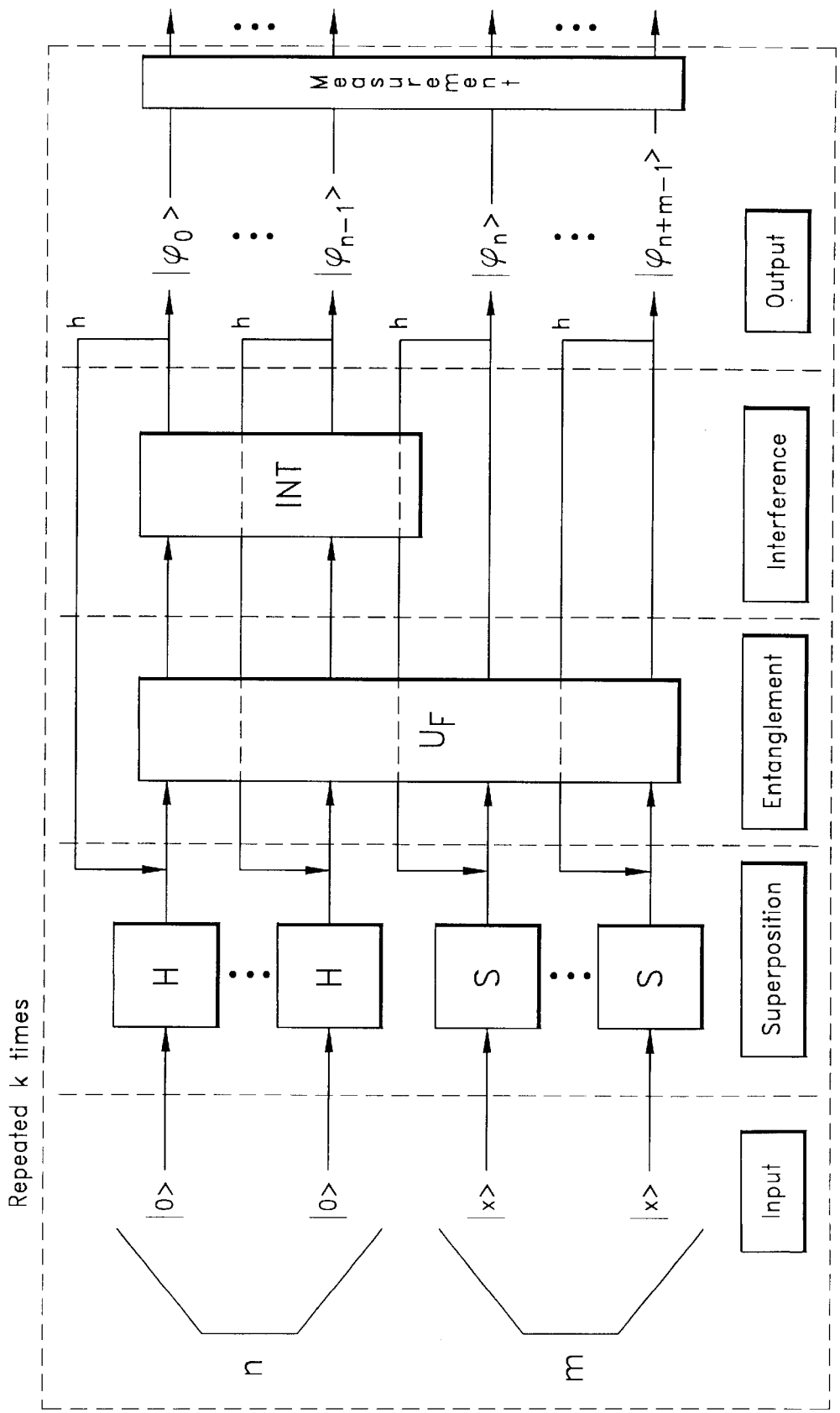
FIG. 26 is a general circuit diagram for a quantum block.

FIGS. 28–29 show the dynamics of the DJ algorithm, by monitoring the values for Shannon and Von Neumann Entropy at each step. Every step corresponds to the application of a quantum operator according to the general circuit diagram of FIG. 26. Examination of FIGS. 28–29 leads to the following conclusions about classical and quantum entropy changing after superposition, entanglement and interference have occurred.

The input vector is a basis vector: the classical information of this state is 0. It is the tensor product of n basis vectors of dimension 2, so the Von Neumann entropy of every qubits composing it is also 0.

The superposition operator $^4H$ increases the classical Shannon Entropy from its minimum value 0 to its maximum value 4, but does not change the entropy from the quantum Von Neumann Entropy point of view.

The entanglement operator is a classical unitary operator, therefore it maps different basis vectors into different basis vectors leaving the classical information of the system unchanged. However, it can create correlation among the different binary vectors in the tensor product describing the system state; this correlation is described by the Von Neumann Entropy of the different subparts of the system. The quantum information of the whole system is always 0, even when the entanglement operator creates correlation, since the vector describing it is a pure state, whereas inner values for mutual information and conditional entropy can be positive or negative: they encode the quantum information necessary to decode the property being sought for the operator $U_F$. The states of the system before and after the entanglement operator takes place cannot be distinguished from a classical information point of view, because the Shannon Entropy does not change. Only with a quantum information approach the difference between these two states can be revealed.

The interference operator leaves the quantum information picture unchanged, maintaining encoded the information used to identify $U_F$ as a constant or balanced operator. On the contrary, it decreases the classical entropy making the quantum information accessible; through the action of interference the vector acquires the minimum of classical entropy: such a vector, according to the definition, is an intelligent state, because it represents a coherent output state of QA computation with minimum entropy uncertainty relation (EUR) as success result.

Comparing FIGS. 27 and 28 shows that the entanglement operator in FIG. 27 effectively creates quantum correlation among different parts of the system, whereas in FIG. 28 the general state is written as the tensor product of binary basis vectors and so no quantum correlation is involved. The interference operator in FIG. 27 reduces the classical entropy of 1 bit, whereas in FIG. 28 it reduces the classical entropy of 3 bits.

The presence of quantum correlation appears as the degree of resistance (immunity) of the system to change its classical entropy, and defines the internal degree of intelligent possibility of the quantum algorithm.

Figure 30:
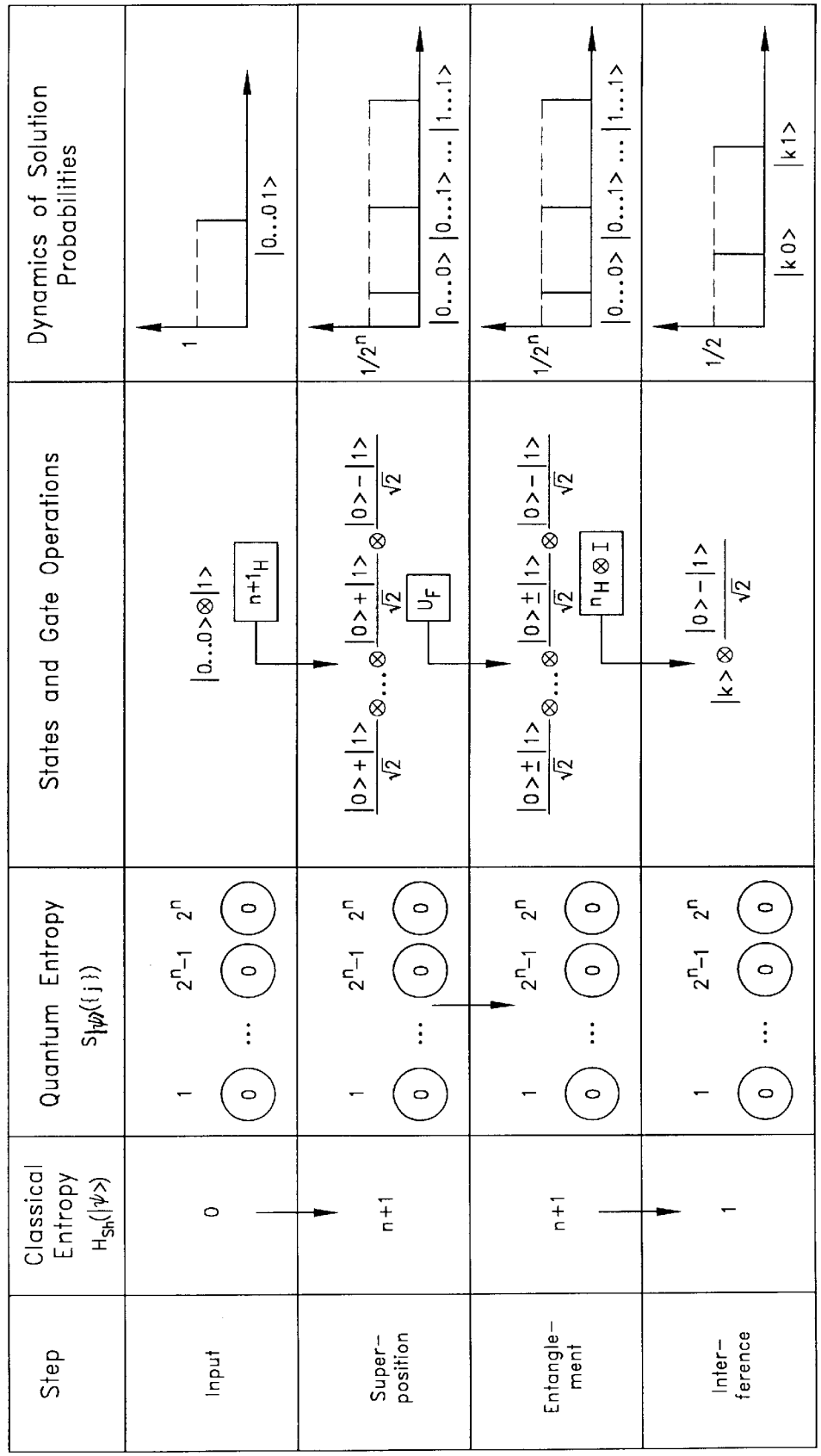
FIG. 30 illustrates information analysis of the Deutsch-Jozsa algorithm for linear functions.

The results in FIG. 29 are similar to the results obtained in FIG. 28. In FIG. 29 the entanglement operator creates no correlation. This is a common characteristic to all linear operators $U_F$ implementing a function $f: \{0,1\}^n \rightarrow \{0,1\}^m$ such that $f(x)=k \cdot x$ or $f(x)=\neg(k \cdot x)$ for some binary constant k, as shown in FIG. 30. These functions, among the input set of balanced and constant functions, minimise to 0 the "gap" between the highest and lowest information values appearing in the Wenn Diagram of FIGS. 27–31.

Figure 31:
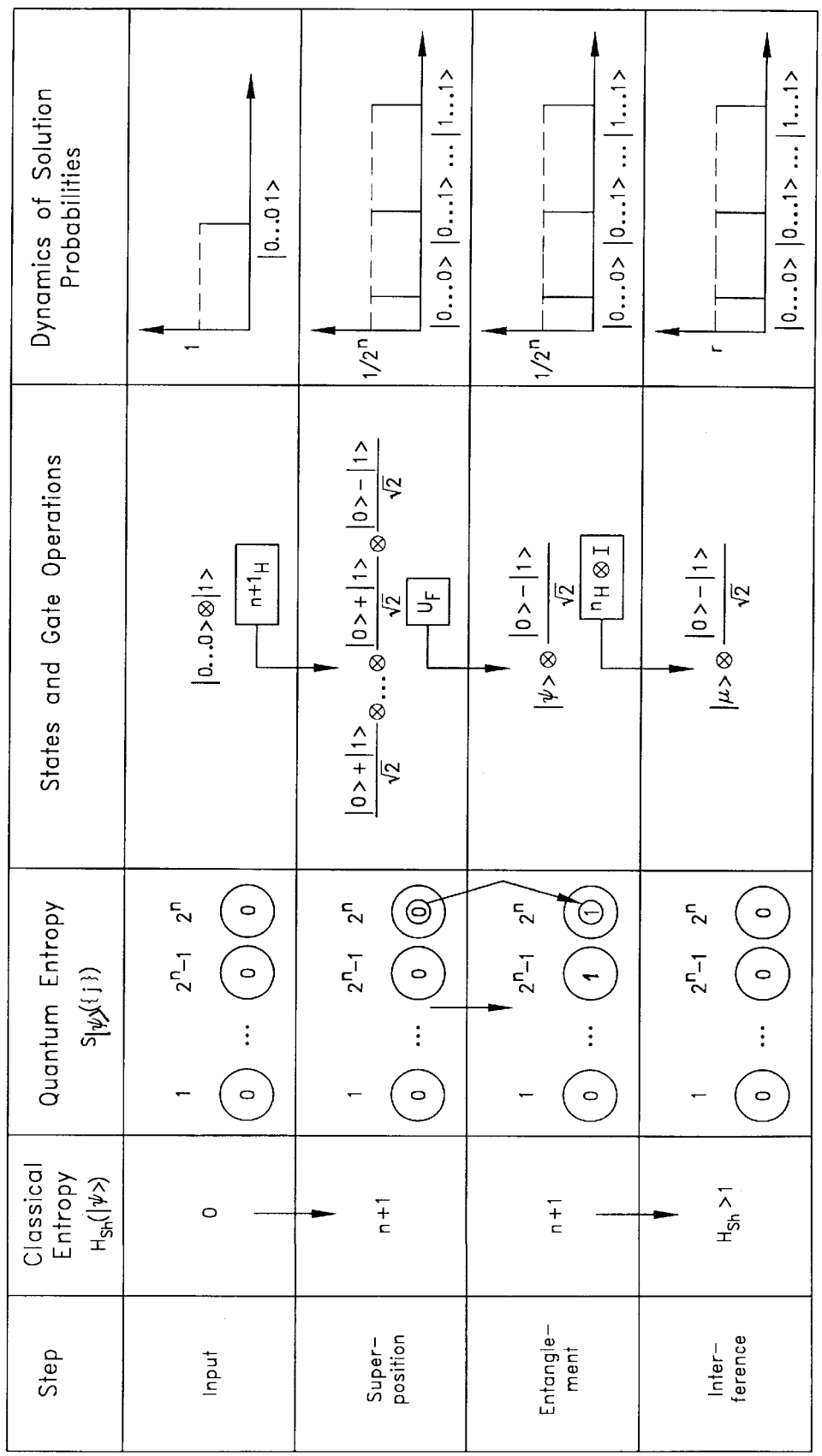
FIG. 31 illustrates information analysis of the Deutsch-Jozsa algorithm for non-linear balanced functions.
Figure 32:
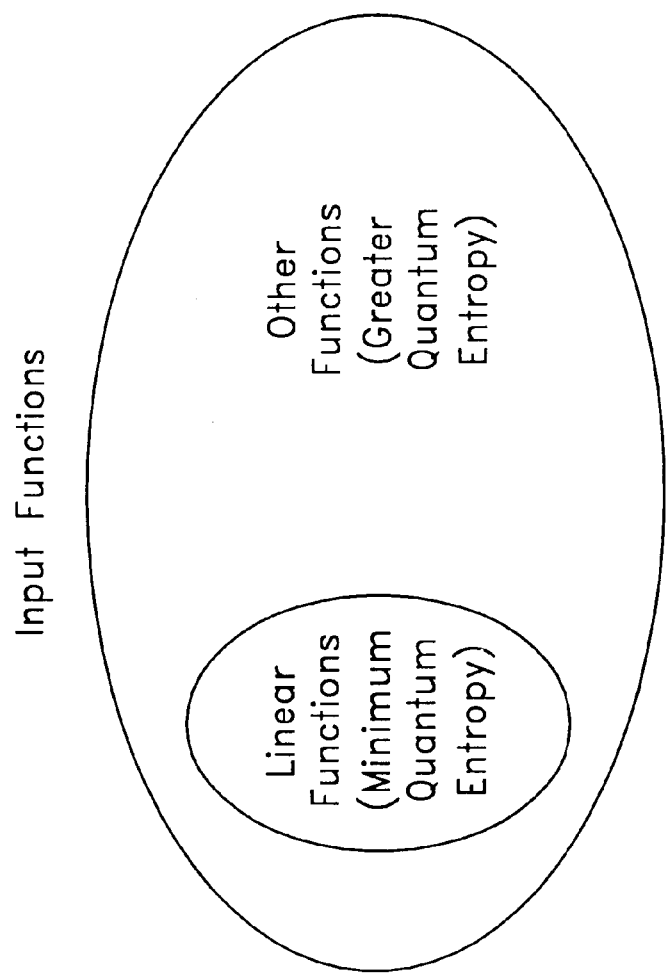
FIG. 32 illustrates the quantum information structure of the Deutsch-Jozsa input space.

The action of interference undergoes this property mapping of $U_F$ into an intelligent state revealing it. By contrast, other balanced functions are mapped into less intelligent states, that are higher classical entropy vectors. This means that it is a non-success result as it is shown in FIG. 31. The Deutsch-Jozsa's algorithm undergoes the special structure of its input set of functions from quantum information theory point of view. This structure is illustrated in FIG. 32.

Figure 34:
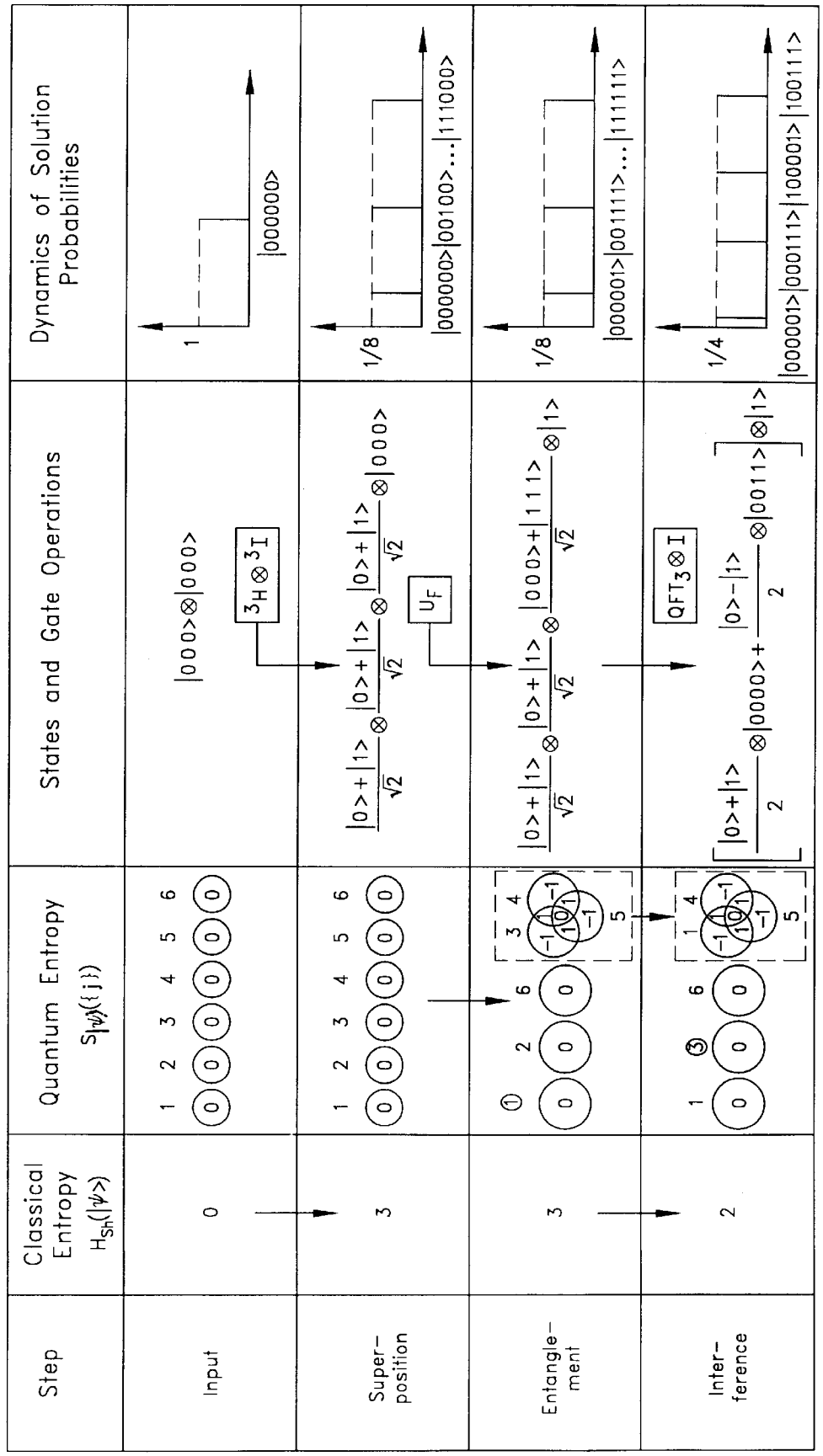
FIG. 34 illustrates information analysis of the Shor algorithm for a first operator $U_F$.

As a further example, Shor's algorithm is now considered from information theory viewpoint. The following operators implementing two input functions of period 2 and 4 respectively:

The operator used in connection with FIG. 34 is (n=3):

$$U_F = {}^2I \otimes \begin{bmatrix} I \otimes I \otimes C & 0 \\ 0 & C \otimes C \otimes C \end{bmatrix}$$

Figure 35:
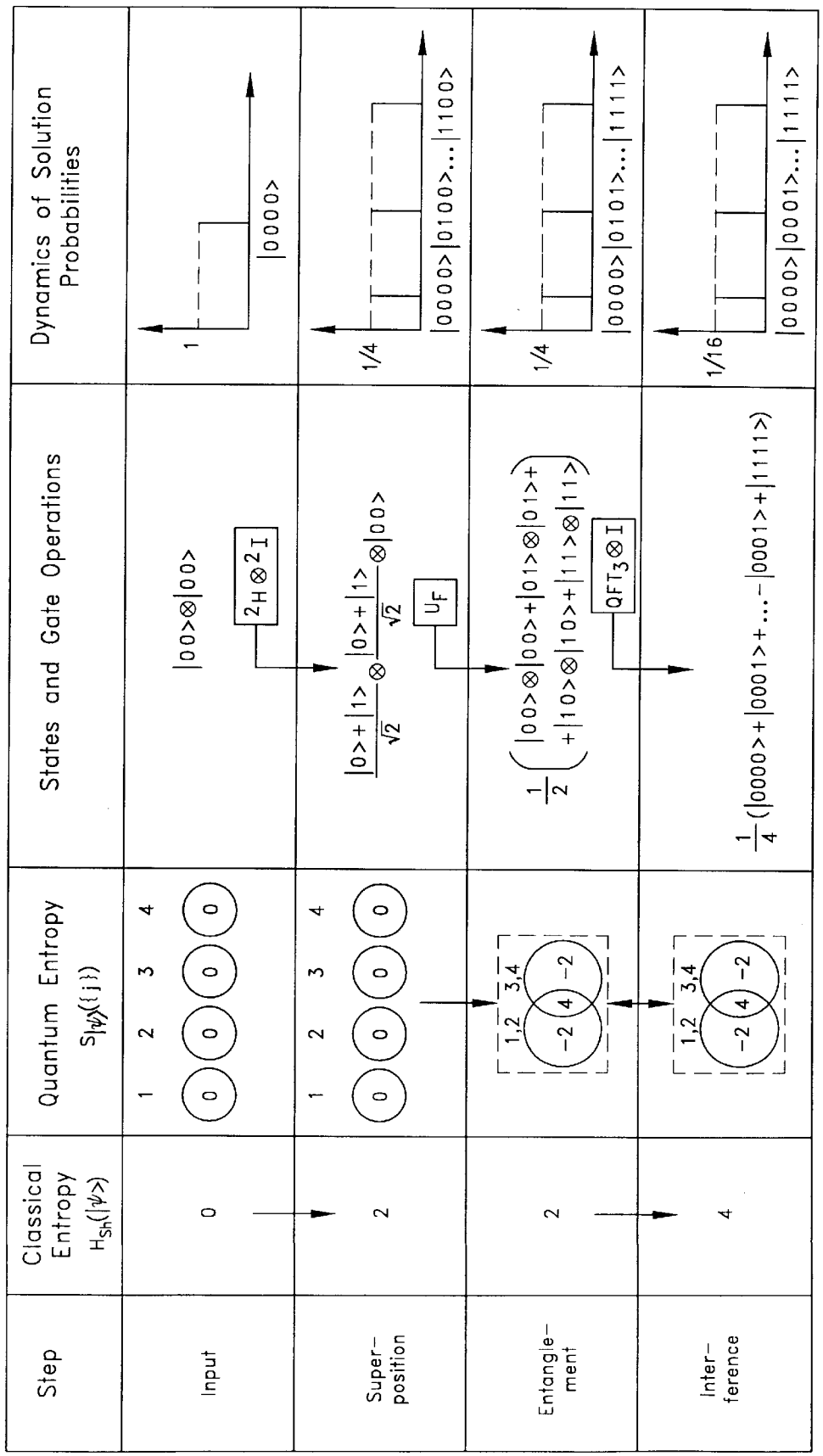
FIG. 35 illustrates information analysis of the Shor algorithm for a second operator $U_F$.

The operator used in connection with FIG. 35 is (n=2):

$$U_F = \begin{bmatrix} I \otimes I & 0 & 0 & 0 \\ 0 & I \otimes C & 0 & 0 \\ 0 & 0 & C \otimes I & 0 \\ 0 & 0 & 0 & C \otimes C \end{bmatrix}$$

FIGS. 34 and 35 illustrate the evolution of the quantum algorithm when applied with these operators.

In FIG. 34, the entanglement operator creates quantum correlation among vectors 3, 4 and 5: this correlation identifies the period of the input function. The interference operator preserves quantum correlation, but transposes it from vectors (3, 4, 5) to vectors (1, 4, 5). This transposing maintains the period of the input function encoded. But, it reduces the classical entropy from 3 bits to 2 bits, making it possible to access the period information generating an intelligent state, namely a state containing all the required quantum information but with minimum classical entropy as a qualitative measure of free energy.

In FIG. 35, the entanglement operator creates strong correlation among vectors 1, 2, 3 and 4: this correlation identifies the input function that has maximal period (and so maximal entanglement). The interference operator preserves the correlation but does not decrease the classical entropy because entanglement is too great (the degree of resistance is too high).

Figure 33:
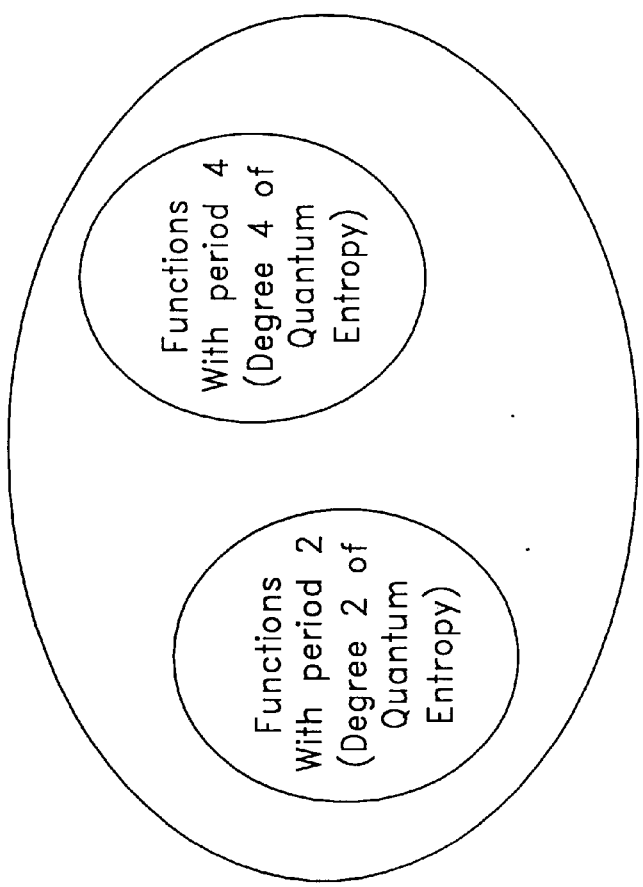
FIG. 33 shows the quantum information structure of the Shor input space.

As shown in FIG. 33, Shor's algorithm undergoes the special structure of its input space: periodical functions. Every function is characterised by its capacity to create quantum entanglement, which depends on its period. This structure is shown in FIG. 33.

Figures 37, 37A, 37B:
FIG. 37, consisting of FIGS. 37A and 37B, illustrates information analysis of the Grover algorithm for a first iteration.
Figure 37B:
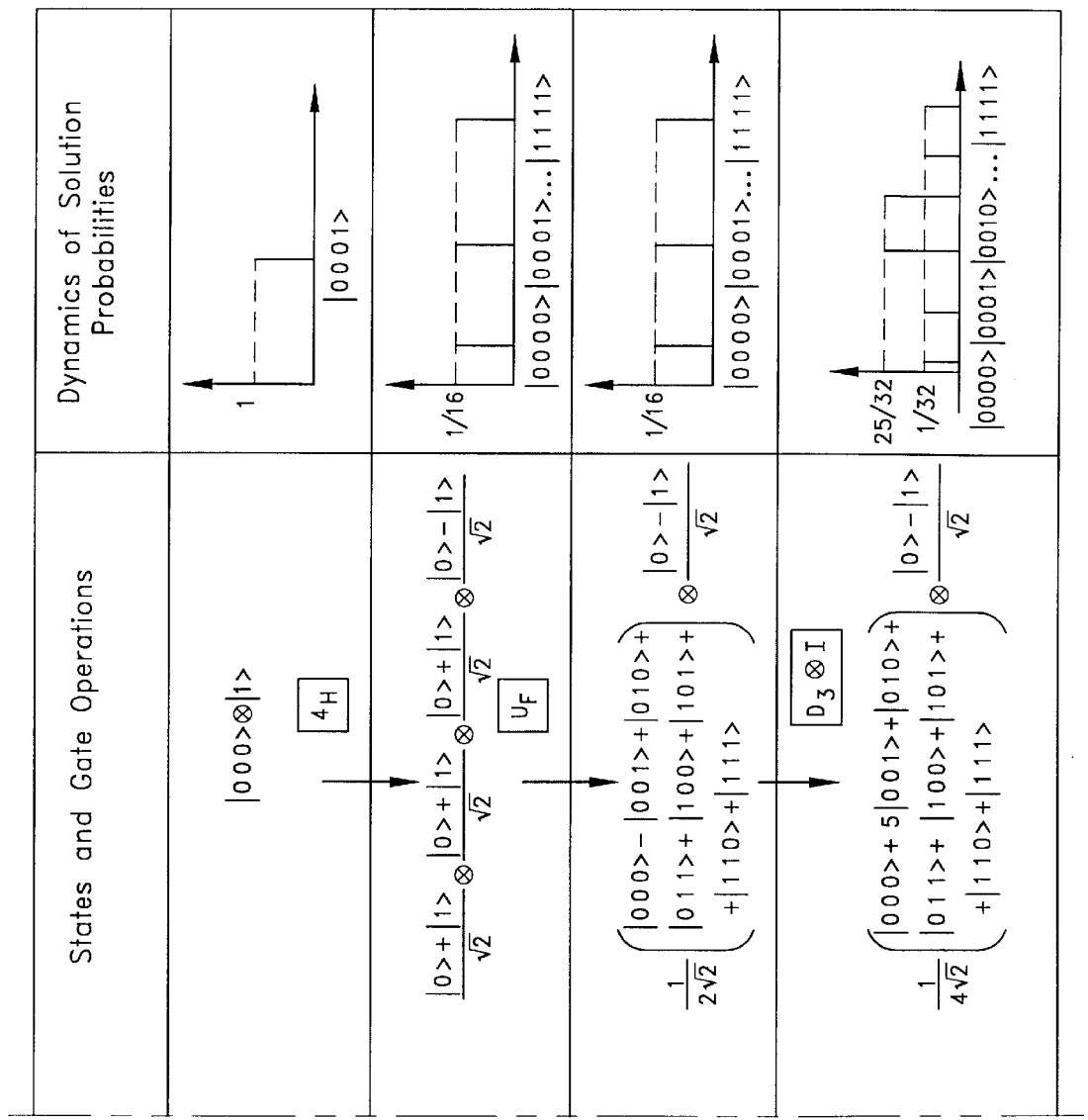
Figure 38B:
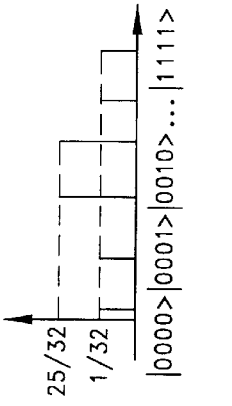
FIG. 38, consisting of FIGS. 38A and 38B, illustrates information analysis of the Grover algorithm for a second iteration.

FIGS. 36–38 illustrate information analysis for Grover's algorithm. The operator encoding the input function is:

$$U_F = \begin{bmatrix} I & 0 & 0 & 0 & 0 & 0 & 0 & 0 \\ 0 & C & 0 & 0 & 0 & 0 & 0 & 0 \\ 0 & 0 & I & 0 & 0 & 0 & 0 & 0 \\ 0 & 0 & 0 & I & 0 & 0 & 0 & 0 \\ 0 & 0 & 0 & 0 & I & 0 & 0 & 0 \\ 0 & 0 & 0 & 0 & 0 & I & 0 & 0 \\ 0 & 0 & 0 & 0 & 0 & 0 & I & 0 \\ 0 & 0 & 0 & 0 & 0 & 0 & 0 & I \end{bmatrix}$$

FIG. 36 shows a general iteration algorithm for information analysis of Grover's algorithm. FIGS. 37 and 38 show two iterations of this algorithm. As shown in FIGS. 37 and 38, the entanglement operator in each iteration increases correlation among the different qubits. The interference operator in each iteration reduces the classical entropy but, as a side effect, it destroys part of the quantum correlation measured by the Von Neumann entropy.

Grover's algorithm builds intelligent states in several iterations. Since every iteration first encodes the searched function by entanglement, but then partly destroys the encoded information by the interference operator, several iterations are needed in order to conceal both the need to have encoded information and the need to access it.

A methodology and an algorithm for programming a quantum logic algorithm is described. The quantum logic program can be run on a quantum computer. The algorithm can also be run on a non-quantum computer by using the non-quantum computer to simulate the quantum computer. This allows the concepts, features, and principles of quantum computing, such a s superposition, entanglement, quantum interference, and the like (and the massive parallelism enabled by these principles) to be used to advantage in non-quantum computers without the need to develop quantum computer hardware. In one embodiment, a quantum search algorithm is used to improve a genetic optimizer. While the above detailed description has shown, described, enabled, and pointed out the various features of the invention, it will be understood that various omissions, substitutions, and changes in the form and details of the disclosure may be made by those skilled in the art, without departing from the spirit of the invention. Therefore, the invention should be limited in its scope only by the following claims.

The algorithms of Deutsch and Deutsch-Jozsa decision-making algorithms. The algorithms of Simon, Shor and Grover are searching algorithms. The principle of minimum classical (quantum) entropy in output of a quantum algorithm means successful result are provided by intelligent output states. Decision-making algorithms provide recognition of intelligent output states with smaller or larger classical entropy than in the corresponding states of searching quantum algorithms. The searching quantum algorithms are based on a co-ordinated comparison of the minimum classical entropy and the quantum entropy amount. The ability to co-ordinate these values characterises the intelligence of searching quantum algorithms.

What is claimed is:

1. A computer implemented method stored on a recordable media for quantum algorithm design for quantum soft computing, comprising the steps of: encoding an input function $f$ into a unitary matrix operator $U_F$; embedding the operator $U_F$ into a quantum gate G, said G being a unitary matrix; applying said quantum gate G to an initial vector to produce a basis vector; measuring said basis vector; repeating said steps of applying and measuring k times, where 0<k; and decoding said basis vectors, said decoding including translating said basis vectors into an output vector.

2. The method of claim 1, wherein said step of encoding comprises the steps of: transforming a map table of $f$ into an injective function F; transforming said function F into a map table for said operator $U_F$; and transforming said map table for $U_F$ into said operator $U_F$.

3. The method of claim 1, further configured to minimize a Shannon entropy of said basis vectors.

4. An computer implemented intelligent control system stored on a recordable media comprising a quantum search algorithm configured to minimize Shannon entropy comprising: a genetic optimizer configured to construct one or more local solutions using a fitness function configured to minimize a rate of entropy production of a controlled plant; and a quantum search algorithm configured to search said local solutions to find a global solution using a fitness function configured to minimize Shannon entropy.

5. The intelligent control system of claim 4 wherein said global solution comprises weights for a fuzzy neural network.

6. The intelligent control system of claim 4 wherein said fuzzy neural network is configured to train a fuzzy controller, said fuzzy controller configured to provide control weights to a proportional-integral-differential controller, said proportional-integral-differential controller configured to control said controlled plant.

7. A computer implemented method stored on a recordable media for evolving a quantum search algorithm comprising the step of selecting a fitness function configured to minimize Shannon entropy.

8. A computer implemented method stored on a recordable media for evolving a quantum search algorithm comprising the steps of: minimizing Heisenberg uncertainty; and minimizing Shannon entropy.

9. A computer implemented method stored on a recordable media for evolving a quantum algorithm comprising the steps of: applying an entanglement operator to create a plurality of correlated state vectors from a plurality of input state vectors; and applying an interference operator to said correlated state vectors to generate an intelligent state vector, said intelligent state vector having less classical entropy than said correlated state vectors.

10. A computer implemented method stored on a recordable media for global optimization to improve a quality of a sub-optimal solution comprising the steps of: applying a first transformation to an initial state to produce a coherent superposition of basis states; applying a second transformation to said coherent superposition using a reversible transformation to produce coherent output states; applying a third transformation to said coherent output states to produce an interference of output states; and selecting a global solution from said interference of output states.

11. The method of claim 10, wherein said first transformation is a Hadamard rotation.

12. The method of claim 10, wherein each of said basis states is represented using qubits.

13. The method of claim 10, wherein said second transformation is a solution to Shrodinger's equation.

14. The method of claim 10, wherein said third transformation is a quantum fast Fourier transform.

15. The method of claim 10, wherein said step of selecting comprises finding a maximum probability.

16. The method of claim 10, wherein said superposition of input states comprises a collection of local solutions to a global fitness function.

17. An apparatus for quantum soft computing, comprising: an encoder module configured to encode an input function into a unitary matrix operator; an embed module configured to embed said unitary matrix operator into a quantum gate; a processing module configured to apply said quantum gate to an initial vector to produce a basis vector; a measurement module configured to measure said basis vector; and a decoder configured to decode said basis vector and translate said basis vector into an output vector.

18. The apparatus of claim 17, wherein said encoder comprises: a first transform module for transforming a map table of said input function into an injective function; a second transform module for transforming said injective function into a map table for said unitary matrix operator; and a third transform module for transforming said map table for said unitary matrix operator into said unitary matrix operator.

19. The apparatus of claim 17, further comprising a module to minimize a Shannon entropy of said basis vector.

20. A computer implemented method stored on a recordable media for intelligent control comprising a quantum search algorithm configured to minimize Shannon entropy comprising: optimizing one or more local solutions using a fitness function configured to minimize a rate of entropy production of a controlled plant; and searching, using a quantum search algorithm to search said local solutions to find a global solution using a fitness function to minimize Shannon entropy.

21. The method of claim 20 wherein said global solution comprises weights for a fuzzy neural network.

22. The method of claim 21 further comprising: training a fuzzy controller; providing control weights from said fuzzy controller to a proportional-integral-differential controller; and using said proportional-integral-differential controller to control said controlled plant.

23. An apparatus for evolving a quantum search algorithm comprising: a module for calculating quantum entropy; a module for calculating classical entropy; and a module for searching a solution space for a solution that reduces both quantum entropy and classical entropy.

24. An apparatus for evolving a quantum algorithm comprising: a first module for applying an entanglement operator to create a plurality of correlated state vectors from a plurality of input state vectors; and a second module for applying an interference operator to said correlated state vectors to generate an intelligent state vector, said intelligent state vector having less classical entropy than said correlated state vectors.

25. A computer implemented global optimizer stored on a recordable media to improve a quality of a sub-optimal solution, said optimizer comprising a computer software loaded into a memory, said software comprising: a first module for applying a first transformation to an initial state to produce a coherent superposition of basis states; a second module for applying a second transformation to said coherent superposition using a reversible transformation to produce one or more coherent output states; a third module for applying a third transformation to said one or more coherent output states to produce an interference of output states; and a fourth module for selecting a global solution from said interference of output states.

26. The optimizer of claim 25, wherein said first transformation is a Hadamard rotation.

27. The optimizer of claim 25, wherein each of said basis states is represented using qubits.

28. The optimizer of claim 25, wherein said second transformation is based on a solution to Shrodinger's equation.

29. The optimizer of claim 25, wherein said third transformation is a quantum fast Fourier transform.

30. The optimizer of claim 25, wherein said fourth module is configured to find a maximum probability.

31. The optimizer of claim 25, wherein said superposition of input states comprises a collection of local solutions to a global fitness function.

32. An apparatus for quantum soft computing, comprising: means for encoding an input function $f$ into a unitary matrix operator $U_F$; means for embedding the operator $U_F$ into a quantum gate G; means for applying said quantum gate G to one or more initial vectors to produce one or more basis vector and measuring said basis vectors to produce measured vectors; and decoding said measured vectors into an output vector.

33. The apparatus of claim 32, wherein said means for encoding transforms a map table of $f$ into an injective function F, transforms said function F into a map table for said operator $U_F$, and transforms said map table for $U_F$ into said operator $U_F$.

34. The apparatus of claim 32, further comprising means for minimizing an entropy of said basis vectors.

35. An computer implemented intelligent control system stored on a recordable media comprising a quantum search algorithm configured to minimize Shannon entropy comprising: means for optimizing one or more local solutions using a fitness function configured to minimize a rate of entropy production of a controlled plant; and means for quantum searching said local solutions to find a global solution using a fitness function configured to minimize Shannon entropy.

36. The intelligent control system of claim 35 wherein said global solution comprises weights for a fuzzy neural network.

37. The intelligent control system of claim 35 further comprising means for training a fuzzy controller using said global solution, said fzzzy controller providing weights for a proportional-integral-differential controller.

38. An apparatus for evolving a quantum search algorithm comprising: a genetic optimizer based on a fitness function; and means for selecting said fitness function to minimize classical entropy and quantum entropy.

39. An apparatus for evolving a quantum search algorithm comprising: means for minimizing a quantum entropy; and means for minimizing a classical entropy.

40. An apparatus for evolving a quantum algorithm comprising: means for applying an entanglement operator to create a plurality of correlated state vectors from a plurality of input state vectors; and means for applying an interference operator to said correlated state vectors to generate an intelligent state vector, said intelligent state vector having less classical entropy than said correlated state vectors.

41. An apparatus for global optimization to improve a quality of a sub-optimal solution comprising: means for applying a first transformation to an initial state to produce a coherent superposition of basis states; means for applying a second transformation to said coherent superposition using a reversible transformation to produce coherent output states; means for applying a third transformation to said coherent output states to produce an interference of output states; and means for selecting a global solution from said interference of output states.

42. The apparatus of claim 41, wherein said second transformation is a solution to Shrodinger's equation.

43. The apparatus of claim 41, wherein said third transformation is a quantum fast Fourier transform.

44. The apparatus of claim 41, wherein said means for selecting finds a maximum probability.

45. The apparatus of claim 41, wherein said superposition of input states comprises a collection of local solutions to a global fitness function.

* * * * *